US011716630B2

(12) United States Patent
Lim et al.

(10) Patent No.: US 11,716,630 B2
(45) Date of Patent: *Aug. 1, 2023

(54) BIOMETRIC VERIFICATION FOR ACCESS CONTROL USING MOBILE IDENTIFICATION CREDENTIAL

(71) Applicant: The Government of the United States of America, as represented by the Secretary of Homeland Security, Washington, DC (US)

(72) Inventors: Jason Lim, Alexandria, VA (US); Daniel Boyd, Arlington, VA (US); Chang Ellison, Arlington, VA (US); William Washington, North Potomac, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,091

(22) Filed: Oct. 6, 2022

(65) Prior Publication Data

US 2023/0044085 A1 Feb. 9, 2023

Related U.S. Application Data

(63) Continuation of application No. 17/584,223, filed on Jan. 25, 2022, which is a continuation-in-part of
(Continued)

(51) Int. Cl.
*H04W 12/71* (2021.01)
*H04W 12/06* (2021.01)
*H04W 12/08* (2021.01)

(52) U.S. Cl.
CPC ........... *H04W 12/71* (2021.01); *H04W 12/06* (2013.01); *H04W 12/08* (2013.01)

(58) Field of Classification Search
None
See application file for complete search history.

(56) References Cited

U.S. PATENT DOCUMENTS 7,849,501 B2 12/2010 Vishik et al.
8,353,016 B1 1/2013 Pravetz et al.
(Continued)

OTHER PUBLICATIONS

Carnley, P. Renee, et al., "Trusted Digital Identities for Mobile Devices", 2020 IEEE Intl Conf on Dependable, Autonomic and Secure Computing, Intl Conf on Pervasive Intelligence and Computing,Intl Conf on Cloud and Big Data Computing, Intl Conf on Cyber Science and Technology Congress, (DASC/PiCom/CBDCom/CyberSciTech) (pp. 483-490), Aug. 1, 2020.

*Primary Examiner* — Thu N Nguyen
(74) *Attorney, Agent, or Firm* — Lavanya Ratnam; Robert W. Busby; Kelly G. Hyndman

(57) ABSTRACT

A provider system is connected to readers disposed at distances from the provider system. A secure local connection is established between the client device and the provider system via one of the readers. Before the client reaches an access touchpoint, the provider system receives from the client device a request for client access, the provider system sends to the client device a request for identification information of the client, and the client device sends client information associated with a first mobile identification credential (MIC) which the client device received from an authorizing party system (APS), the client having consented to release the client information to the provider system, and the client information having been verified. The provider system performs a liveness check of the client using live-captured biometric information at the access touchpoint,
(Continued)

determines whether the liveness check is valid, and grants the request if the liveness check is valid.

29 Claims, 25 Drawing Sheets

Related U.S. Application Data application No. 17/167,874, filed on Feb. 4, 2021, now Pat. No. 11,521,720.

(60) Provisional application No. 63/208,342, filed on Jun. 8, 2021, provisional application No. 63/009,175, filed on Apr. 13, 2020.

(56) References Cited

U.S. PATENT DOCUMENTS

| | | | |
|---|---|---|---|
| 9,147,117 B1 | 9/2015 | Madhu et al. | |
| 10,503,912 B1 | 12/2019 | Kerr | |
| 2007/0079136 A1 | 4/2007 | Vishik et al. | |
| 2010/0063830 A1 | 3/2010 | Kenedy et al. | |
| 2012/0144461 A1 | 6/2012 | Rathbun | |
| 2013/0097047 A1 | 4/2013 | Kim | |
| 2014/0020073 A1 | 1/2014 | Ronda et al. | |
| 2014/0129255 A1 | 5/2014 | Woodson et al. | |
| 2014/0207537 A1 | 7/2014 | Joyce et al. | |
| 2016/0055322 A1 | 2/2016 | Thomas | |
| 2016/0078581 A1 | 3/2016 | Maher | |
| 2017/0032485 A1 | 2/2017 | Vemury | |
| 2017/0069151 A1 | 3/2017 | Saravanan | |
| 2017/0094514 A1 | 3/2017 | Kelts et al. | |
| 2018/0012324 A1 | 1/2018 | Kelts | |
| 2018/0165655 A1 | 6/2018 | Marcelle et al. | |
| 2018/0166160 A1 | 6/2018 | Walton, III | |
| 2019/0036688 A1 | 1/2019 | Wasily et al. | |
| 2019/0043148 A1 | 2/2019 | Vemury | |
| 2019/0057412 A1 | 2/2019 | Bhattacharjee et al. | |
| 2019/0057763 A1 | 2/2019 | Stockert et al. | |
| 2019/0163876 A1 | 5/2019 | Remme et al. | |
| 2019/0164165 A1 | 5/2019 | Ithabathula | |
| 2019/0287111 A1 | 9/2019 | Cvetkovich et al. | |
| 2020/0043579 A1 | 2/2020 | McEwing | |
| 2020/0168306 A1 | 5/2020 | Chen et al. | |
| 2020/0236116 A1* | 7/2020 | Bower | G06K 19/0723 |
| 2020/0351089 A1 | 11/2020 | Wentz | |

\* cited by examiner

```
                              ┌─ 180
                              ▼

┌─ 182
   ▼
┌─────────────────────────────────────────────┐
│ Establish communication between the UMD and │
│ the touchpoint RPS at the reception or      │
│ security checkpoint with an at-distance     │
│ reader via a local network based on (i) the │
│ user's express permission on the UMD, (ii)  │
│ automatic connection for the pre-opted in   │
│ UMD by the user's pre-registering the UMD   │
│ with the RPS, or (iii) a mutual             │
│ authentication consent procedure using      │
│ digital certificates or keys between the    │
│ UMD and the RPS.                            │
└─────────────────────────────────────────────┘
                      │
                      ▼
   ┌─ 184
┌─────────────────────────────────────────────┐
│ Perform identity verification pre-staging   │
│ of the user by the touchpoint RPS based on  │
│ MIC user information received by the        │
│ touchpoint RPS, at least partly, before the │
│ user arrives at the reception or security   │
│ checkpoint.                                 │
└─────────────────────────────────────────────┘
                      │
                      ▼
   ┌─ 186
┌─────────────────────────────────────────────┐
│ Compare live-captured user information or   │
│ verified MIC user information with          │
│ pre-staged user information by the          │
│ touchpoint RPS to determine whether there   │
│ is a match.                                 │
└─────────────────────────────────────────────┘
                      │
                      ▼
   ┌─ 188
┌─────────────────────────────────────────────┐
│ Grant client access to user when the        │
│ touchpoint RPS determines there is a match  │
│ with the pre-staged user information.       │
└─────────────────────────────────────────────┘
```

FIG. 1C

BIOMETRIC VERIFICATION FOR ACCESS CONTROL USING MOBILE IDENTIFICATION CREDENTIAL

CROSS-REFERENCE TO RELATED APPLICATIONS

The application is a continuation of U.S. patent application Ser. No. 17/584,223, filed on Jan. 25, 2022, entitled PERMISSION-BASED SYSTEM AND NETWORK FOR ACCESS CONTROL USING MOBILE IDENTIFICATION CREDENTIAL, which is a nonprovisional of and claims the benefit of priority from U.S. Provisional Patent Application No. 63/208,342, filed on Jun. 8, 2021, entitled PERMISSION-BASED SYSTEM AND NETWORK FOR ACCESS CONTROL USING MOBILE IDENTIFICATION CREDENTIAL, the entire disclosures of which are incorporated herein by reference. The application is a continuation-in-part of U.S. patent application Ser. No. 17/167,874, filed on Feb. 4, 2021, entitled USER MEDICAL RECORD TRANSPORT USING MOBILE IDENTIFICATION CREDENTIAL, which is a nonprovisional of and claims the benefit of priority from U.S. Provisional Patent Application No. 63/009,175, filed on Apr. 13, 2020, entitled USER MEDICAL RECORD TRANSPORT USING MOBILE IDENTIFICATION CREDENTIAL, the entire disclosures of which are incorporated herein by reference.

STATEMENT OF GOVERNMENT INTEREST

The present invention was made by employees of the United States Department of Homeland Security in the performance of their official duties. The U.S. Government has certain rights in this invention.

FIELD

The discussion below relates generally to systems and methods of verifying the identity of an individual/client before providing a form of access to the client and, more specifically, to verifications that make use of mobile identification credentials in a permission-based system and network with distributed readers.

BACKGROUND

Typically, an individual's identity is confirmed before allowing access to medical services and medical products, some commercial products, confidential information, files, commercial venues such as parking facilities or private recreational facilities, and the like. This process begins with some form of verifying an individual's identity. As an example in the medical context, before an individual is allowed access to medical information, services, or products, the patient's identity is confirmed. This is of the utmost importance because it ensures that medical services and products, for example, are provided to the correct patient. In addition, medical records will be controlled, accessed, or released pursuant to proper protocol designed to protect a patient's privacy and maintain the confidentiality of the patient's medical records.

In an example of accessing medical records, the patient may wish to obtain his or her medical records from a medical office for any of a variety of reasons. Doing so in person typically requires showing or using one or two forms of identification, e.g., with a picture of the person on a government issued ID card (or with a prepaid parking garage control card in a commercial context). That process has been conventionally considered a reliable method for protecting an individual's privacy and confidentiality. Identity verification performed in person is not foolproof, however. False verification can occur due to human error or carelessness or fraud. More recently, a medical office may allow a patient to sign in electronically to a password-protected account and obtain the medical record. The drawback of that process is that the account can be hacked, or it can be accessed by another person using a stolen password or by taking advantage of any mistakes by the patient. In a commercial context, an individual who has not been properly identified may receive goods or services that he or she did not pay for, e.g., a parking garage.

SUMMARY

Embodiments of the present disclosure are directed to apparatuses and methods for providing at-distance communication of a user mobile-identification-credential device with a secure network using mobile identification credential for identity verification pre-staging by a relying party prior to allowing access (e.g., physical access of the user to an area or access to service, product, item, data, or information). The term "client access" or "user access" is used herein to denote access to a physical area or access to records, services, products, items, data, or information. The term "medical access" is a type of client access that is medical in nature. It is used herein to encompass access to a physical area in a medical facility or access to medical records, procedures, services, products, items, data, or information. It may further allow the user to submit electronic files or data by a user mobile-identification-credential device (UMD) to a Relying Party System (RPS), for instance, via access to a portal to the RPS or a website supported directly or indirectly by the RPS.

The present disclosure is directed to a robust and secure way for an establishment or entity (e.g., hospital, medical office, medical facility, or the like in the medical use context) to verify the identity of a client by leveraging a mobile identification credential (MIC) before granting the client the client access such as releasing the client's medical record to the client's device for transport. An example enables convenient downloading of the medical record by the patient making the request in person according to an embodiment, or electronically from a remote location according to another embodiment. In some embodiments, the risk of a breach of the confidentiality of the patient's medical record is reduced by virtue of the trust that accompanies the use of the MIC. These embodiments establish trust that the medical record is provided to the proper person. The experience of the patient is enhanced, and specific embodiments support easier download or transfer of his or her medical record from one medical entity, transport of the medical record, and upload or transfer of it to another medical entity (e.g., another hospital or medical office, prospective or current employer, insurance company, an opposing party or the court in a litigation, etc.). As used herein, medical record encompasses all healthcare-related information (including dental care, vision care, physical therapy, psychological care, etc.). Here, the example of medical records and medical entities illuminates the discussion but is not intended to limit the scope; other, regulated situations that involve providing services, products, items, data, or information to a user or involve accepting the same from a user are included. In this disclosure, "user" and "client" and "patient" are used interchangeably to refer to the MIC user as a patient in the medical access context.

In one embodiment, the patient makes a request for medical access in person at a medical office. The patient presents a user mobile-identification-credential device (UMD) that includes MIC such as a mobile driver's license (mDL) as part of an environment that supports MICs. In such an environment, the MIC is issued by an Authorizing Party (AP), such as a state department of motor vehicles (DMV) or some other issuing authority, using an Authorizing Party System (APS). The UMD interacts with another device to share some or all of the content of the MIC. The device that receives the MIC information is held by the medical office, which is a relying party (RP) that will rely on the information yielded via the MIC. The device of the relying party is referred to as a Relying Party System (RPS). Upon verifying the identity of the patient, the requested medical access is granted by the RPS to the patient. In another embodiment, the request for medical records may be made from a remote location via a network. In that case, an additional liveness check may be typically used to ensure the request is made by the patient matching the MIC.

In another embodiment, the patient releases medical record, information, or data to a third party. For example, the patient may be an employee of an employer. The employer requires verification that the employee has a medical condition requiring accommodation. The patient/employee, in one embodiment, obtains his or her medical record from a medical office and releases it to the employer. In another embodiment, the patient/employee authorizes release of the medical record directly from the medical office to the employer.

In another embodiment, the patient releases a medical record, linked to a MIC, to a government entity. For example, the patient may be seeking an employment position. The government requires verification from the patient's medical records that the patient has an immunity to a contagion, or has received a specific vaccine necessary for a posting in another country, or has not used prohibited substances, in order to allow the individual to obtain the position. The individual, in one embodiment, obtains his or her medical record from a medical office after the medical record is released to the requestor based on the identity asserted from a provided MIC, and may release both the MIC (as verification of identity) and the requisite medical record (as verification of infection status) to the government. In another embodiment, the individual authorizes the release of the medical record directly from the medical record holder to the government after using the MIC to assert ownership (through identity) of the medical record.

In other embodiments, an individual's identity is confirmed before commercial goods, privileges or services are accessible by an individual as may be required for a commercial venue, a VIP parking area, or a room within a building containing records or products.

In another embodiment, an individual's identity is seamlessly confirmed before the individual is granted access to a controlled queue, e.g., an express, pre-screened or VIP line, allowing efficient access to a venue.

In another embodiment, an individual's identify is confirmed prior to arrival at a controlled facility or area, expediting access and improving security.

An aspect of the present disclosure is directed to a method for a client having a client device to request client access from a provider having a provider system. The method comprises: connecting the provider system to a plurality of readers disposed at distances from an access touchpoint and from each other; establishing a secure local connection between the client device and the provider system via a reader of the plurality of readers, before the client and the client device reach the access touchpoint; receiving, by the provider system from the client device, a request for client access before the client and the client device reach the access touchpoint; sending, by the provider system to the client device, a request for identification information of the client before the client and the client device reach the access touchpoint; receiving, by the provider system before the client and the client device reach the access touchpoint, part or all of client information associated with a first mobile identification credential (MIC) which the client device received from a first authorizing party system (APS), the client having consented to release the part or all of client information to the provider system, and the part or all of client information having been verified by the first APS before the provider system sends the request for identification information of the client; using, by the provider system, the verified part or all of client information associated with the first MIC to verify or not verify an identity of the client; and verifying the identity of the client, by the provider system, before granting to the client the requested client access.

Another aspect of the disclosure is directed to a provider system for processing a request for client access at an access touchpoint from a client device of a client, the provider system connected with a plurality of readers disposed at distances from the access touchpoint and from each other. The provider system comprises a computer programmed to: establish a secure local connection between the client device and the provider system via a reader of the plurality of readers, before the client and the client device reach the access touchpoint; receive, from the client device, a request for client access before the client and the client device reach the access touchpoint; send, to the client device, a request for identification information of the client before the client and the client device reach the access touchpoint; receive, before the client and the client device reach the access touchpoint, part or all of client information associated with a first mobile identification credential (MIC) which the client device received from a first authorizing party system (APS), the client having consented to release the part or all of client information to the provider system, and the part or all of client information having been verified by the first APS before the provider system sends the request for identification information of the client; use the verified part or all of client information associated with the first MIC to verify or not verify an identity of the client; and verify the identity of the client before granting to the client the requested client access.

Another aspect of this disclosure is directed to an access touchpoint operations method for a user having a user device to request user access at an access touchpoint. The method comprises: connecting an access touchpoint device at the access touchpoint to a plurality of readers disposed at distances from the access touchpoint and from each other; establishing, by the access touchpoint device serving as a Relying Party System (RPS), a secure local connection between the RPS and a User Mobile-Identification-Credential Device (UMD) via a reader of the plurality of readers, before the user and the UMD reach the access touchpoint; sending, by the RPS, a user information request to the UMD, via the secure local connection, seeking release of Mobile Identification Credential (MIC) user information; obtaining, by the RPS before the user and the UMD reach the access touchpoint, authentication of the MIC user information received in response to the user information request; retrieving, by the RPS, user registration information based on the MIC user information, the user registration information having been provided by the user to the RPS before the RPS sends the user information request to the UMD; determining, by the RPS, whether the user registration information matches the MIC user information or not; and when the user registration information matches the MIC user information, providing, by the RPS, approval for the user to proceed past the access touchpoint.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The drawing figures illustrate one or more implementations in with the teachings and disclosures herein and are by way of example, not by way of limitation. In the figures, like reference numbers refer to the same or similar elements. It will be understood that the drawings are not necessarily to scale.

FIG. 1C is a flow diagram illustrating an embodiment of a process for pre-staging user information.

DETAILED DESCRIPTION

System Embodiments

Figure 1A:
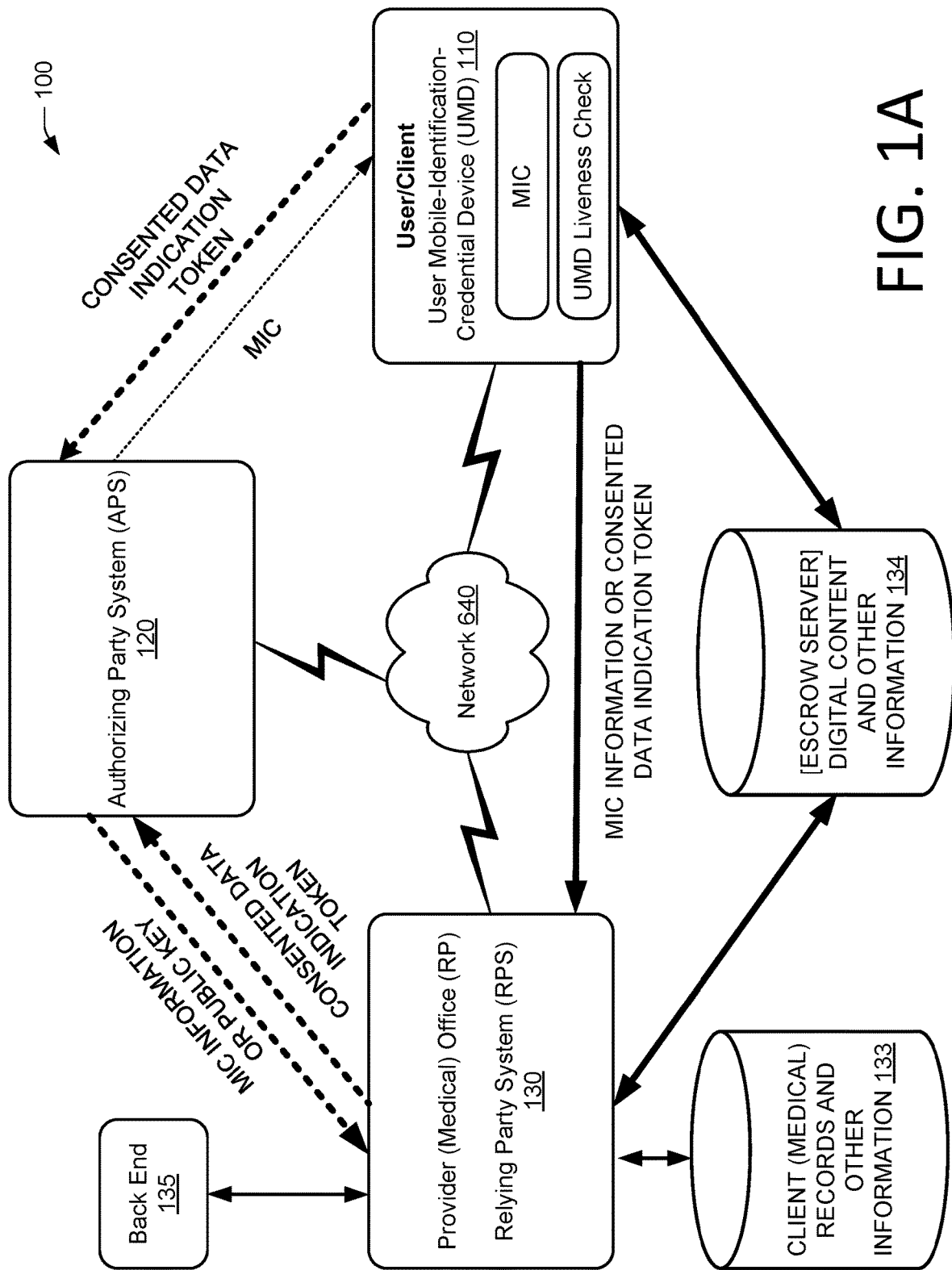
FIG. 1A shows an example of an overall system employing mobile identification credentials in processing a request to gain access.

FIG. 1A shows an example of an overall system 100 employing mobile identification credentials to verify information of a user requesting access. The requested access may be access to a restricted commercial area, service, product, item, data, information or the like. In an environment that supports its use, a Mobile Identification Credential (MIC) can enable a user to conveniently prove the user's identity. One embodiment of a MIC is a mobile driver's license (mDL) issued by an official agency such as a state Department of Motor Vehicles (DMV). Another embodiment of a MIC is a mobile passport. A mobile passport may, for example, be issued by the U.S. Department of State or a foreign ministry of another nation. The MIC can include various information, such as information relating to identity or privileges pertaining to the user.

The MIC itself may be portable and can be provisioned to devices. Below, the device to which the MIC is provisioned is referred to hereinafter as a User Mobile-Identification-Credential Device (UMD) 110. The term UMD pertains to any device to which a MIC can be provisioned including, without limitation, smart watches, smart fitness bands, smart objects, smart phones, e-readers, tablet computers, smart televisions and displays, smart cameras, laptop computers, desktop computers, servers, kiosks, chips, flash drives, and USB drives.

In an embodiment, the issuer of the MIC (the MIC Issuer) may provision and issue the valid, authentic MIC to the UMD. The MIC issuer may work with a MIC provider to facilitate the provisioning of the MIC to the UMD. The MIC Issuer also may work with a third party to provision the MIC to the UMD. In another embodiment, the user may provision the MIC from one device of the user to another device of the user (e.g., from the desktop computer to the smart fitness band).

A MIC may be validated by an Authorizing Party (AP). In one embodiment, the AP may be an official agency such as a state DMV. In another embodiment, the AP may be a third party empowered by an official agency to perform such verification operations. The AP employs an Authorizing Party System (APS) 120. The APS may provision the MIC to the UMD. In another embodiment the APS may be a commercial entity allowing access to controlled goods or services after validating the MIC and provisioning the MIC to a user's UMD.

The environment addresses various considerations, including: ID enrollment and proofing, regarding how the user's identity is proofed upon initial enrollment; security, regarding how data is encrypted at rest or in-transit (various encryption algorithms); privacy, regarding how client/user data is kept from being exposed before encryption, and how notice and consent are provided or received before digital identity information is passed to the RPS; integrity, regarding how an encrypted message is authenticated, knowing that data has not been tampered with, or preventing intercepts or replay attacks; and trust, regarding determining that messages or data are sent by a known RPS or device, determining that the identity information received is that of the user as enrolled by the RPS or APS. Embodiments of the environment described herein also address: technical requirements, standards, security policies, and procedures for transmission of digital identity information to RPS readers; and identity verification procedures, including appropriate and relevant requirements or standard operating procedures regarding the interface between systems and individuals through the ID verification or screening experience.

MIC Transactions

MIC transactions can be online or offline. Generally, the UMD 110 may interact or transact with other devices to share some or all of the content of the MIC. The device through which the UMD 110 shares the MIC user information is referred to as a Relying Party System (RPS) 130. The RPS is a system operated by or for a Relying Party (RP). The RPS may obtain MIC user information according to an online mode or an offline mode, based on the RPS's being able to trust the MIC user information and perform verification of the MIC user information, as enabled by the environment in which the MIC is used. In an online mode embodiment, the RPS 130 interacts with the APS 120 to verify the released MIC user information. In an offline mode, the RPS 130 may use a public key from the APS 120 to verify the released MIC user information. Generally, data transfers may be digitally signed, via electronic certificates, to verify authenticity of the data transferred. In addition to or instead of the use of digital signatures, data transfers may be encrypted via public-key cryptography to ensure integrity of the data transfers. Furthermore, data transfers can utilize tokenization to safeguard the online data transfers. Other embodiments rely on combinations of multiple such data protection procedures, as well as other data security best practices. One example of the RPS is an access touchpoint RPS at a reception or security checkpoint of a hospital, a venue, a building, a business, or the like.

In some embodiments, secure local or remote connections may be established by using session keys, e.g., based on establishing session-specific encryption protocols. A session key is an encryption and decryption key that is randomly generated to ensure the security of a communications session between parties. A session key can be symmetric, used for encryption and decryption. A session key can be public or private. A session key can be ephemeral. As an example, usage of ephemeral public and private keys is described as follows. At initial engagement, a first device (Device 1) will pass its session public key to a second device (Device 2). Device 2 will use its private key and Device 1's public key to generate Device 2's public key. Device 2's public key is shared with Device 1. These ephemeral key pairs are used to encrypt and to decrypt messages sent between Device 1 and Device 2. A session begins when the two devices acknowledge each other and open a virtual connection, and ends when the two devices have obtained the information they request from one another and send "finished" messages, terminating the connection. Embodiments may make use of such session keys or other practices for establishing secure local or remote connections.

Online MIC Transactions

Online MIC transactions can involve trust and verification. An online MIC transaction may involve a UMD transferring MIC user information in response to a request from an RPS. The RPS verifies whether the received MIC user information is valid based on an online connection between the RPS and the APS. In an embodiment, the RPS may access an electronic certificate from the APS to verify the authenticity of the MIC user information received from the UMD. The UMD digitally signs the MIC user information using the electronic certificate from the APS. The UMD can retrieve the electronic certificate at the time of the transaction, either from the APS or from a certificate repository. In other embodiments, when something other than a public key is used to verify the MIC user information, the RPS may submit an electronic document or a digital file or the like to the APS in exchange for a key that may be referred to as an authentication key that is not public. The authentication key may be a public key that refreshes after a very short time, such that the RPS reaches out to the APS when it is time to verify the information and uses the public key with a short lifespan before it expires. In other embodiments, cryptography may be based on public-private key pairs.

The RPS or the UMD may perform a liveness check, e.g., by comparing collected biometric information to verified credentials. In an embodiment, an RPS may include a biometric sensor to capture biometric information of the user presenting at the RPS, such as a photograph, a video, a retina scan, a fingerprint, and the like. In another embodiment, the RPS may be configured to request a liveness check from the UMD. Due to the nature of the secure local connection as established through the handshake, the trustworthiness of information from the UMD responsive to the request is preserved. Accordingly, in an embodiment, the UMD may collect and transfer information that the RPS uses to perform the liveness check. For example, the UMD may collect a photograph, fingerprint, and accelerometer information that the RPS uses to determine whether the user's hand motions and/or walking gait are consistent with liveness check information known for the user. In another embodiment, the RPS determines that the UMD is deemed trustworthy for performing its own liveness check, and such UMD liveness determination performed by the UMD is accepted by the RPS. For example, the UMD may be a smartphone performing a facial recognition verification of the user, whose valid result the RPS accepts as verification that the proper user is legitimately in possession of the UMD and presenting the UMD at the RPS.

The interaction between the UMD and the RPS may be in-person, where a user is physically located at the RPS to present the UMD to the RPS. The interaction may be attended, where an attendant or other agent attending the RPS witnesses the transaction, to physically compare the appearance of the user, presenting the UMD at the RPS, against the MIC user information contained on the presented UMD. The interaction between the UMD and the RPS also may be remote, where a user is not physically located at or otherwise physically attending the interaction with RPS. For example, the user may be performing an online transaction using the UMD at home, which remotely transmits MIC user information over a remote connection from the UMD to the RPS located remote from the UMD, e.g., at an online web host.

Online MIC Transactions—Trust

The RPS needs to know, or trust, that the MIC user information obtained from the UMD is unchanged and matches official records. Part of this trustworthiness may be based on how the MIC was securely provisioned or placed onto the UMD, e.g., according to International Organization for Standardization (ISO) standards. Such secure provisioning enables the RPS to trust the MIC and its MIC user information, and also perform verification that such information matches official records pertaining to the person represented in the MIC user information. Trust also may be based on the reputation of the MIC issuer or the APS that provisioned the MIC onto the UMD. Trust further may be based on the trustworthiness of the connection between the RPS and the APS, e.g., based on a connection that is secured by encryption or other technological protections. In an embodiment, trust may be also based on the RPS reputation or other information about the RPS, such as Global Positioning System (GPS) coordinates, as detected by the UMD at the location of the transaction between the UMD and the RPS, matching known coordinates for that RPS.

Tokens can be used to establish trust, by exchanging tokens between the UMD, RPS, and APS. In an embodiment, a token or file may not actually contain requested MIC user information. Rather, the token or file may include a consented data indication to indicate which of the user's MIC user information is authorized for release. The APS can exchange the token or file for the MIC user information that is consented to be released by the APS to the RPS. When a user releases MIC user information from the UMD, the UMD passes an RPS token to the RPS and passes an APS token to the APS. The RPS may communicate via an online connection with the APS, which compares the APS token received from the UMD to the RPS token received from the RPS. Upon verifying a match, the APS provides a copy of the MIC user information to the RPS. Thus, the matching of tokens over an online connection enables the APS to trust the transaction and release the requested information, via an online connection, to the RPS. Tokens similarly enable the UMD or RPS to trust the transaction. In another embodiment, the UMD sends an RPS token to the RPS and sends an APS token to the APS; then, the APS releases the MIC user information only if both the RPS token and the APS token are received and only if within a given timeframe.

Online MIC Transactions—Verification

The RPS can verify that the MIC user information is trustworthy. The MIC, as provisioned onto the UMD including the MIC user information, may be electronically signed in an embodiment, to enable the RPS to verify that the MIC is provisioned to the proper UMD belonging to the proper user. Embodiments may use other or multiple data protection procedures, as well as other data security best practices to verify information, connections, transaction participants, or the like. In the online context, the RPS has an online connection to the APS. The online connection enables the RPS to request and receive information or verification directly from the APS. Accordingly, the RPS can perform online verification of MIC user information received locally from the UMD, by comparing the local information against information at the APS. The RPS also can perform a local verification of MIC user information received remotely from the APS, e.g., using data protection or verification procedures, or other data verification best practices.

Offline MIC Transactions

Trust and verification also play a role in offline, or disconnected, MIC transactions. The offline context refers to a condition when one or all parties in a transaction do not have an online connection to each other or to the Internet. For example, the RPS may be in an isolated location, or may be suffering from a communications failure, and therefore lack an online connection for communicating with the APS. Transactions may still proceed, by virtue of the ability of the RPS and UMD to establish a local connection with each other based on trust and verification. An offline MIC transaction may involve the RPS's verifying whether the received MIC user information is valid, without the RPS's having an online connection, e.g., without communicating to an external system such as the APS that can verify whether MIC user information received by the RPS is trustworthy. In an embodiment, the RPS verifies a cryptographic signature on the individual data elements of the MIC user information using, e.g., signer certificates. This ensures the data is genuine and unchanged, based on the RPS's performing a local verification based on cryptographic operations. In another embodiment, the RPS accesses a copy of an electronic certificate stored locally at the UMD, and periodically refreshes locally stored electronic certificates independently of a given transaction. In some instances, the RPS does not have to submit anything to the APS to obtain a public key for that APS, because the RPS keeps a locally stored copy of that APS key. In an embodiment, the RPS periodically checks with the APS to refresh the locally stored public keys. In some cases, there may be a public key distributor (PKD). The distributor would be an agent acting on behalf of several trusted entities. This agent would hold the most up-to-date public keys and distribute to trusted relying parties such as the RPS. Offline MIC transactions may be in-person, attended, or remote, as explained above in the context of online MIC transactions.

Offline MIC Transactions—Trust

Similar to the online context, the RPS can establish trustworthiness in a MIC and MIC user information for offline MIC transactions. As explained above, the RPS can verify that the MIC was securely provisioned or placed onto the UMD, and therefore trust the MIC and its MIC user information, based on cryptographic operations. Trust also may be based on reputations of systems that provisioned the MIC onto the UMD, and the trustworthiness of connections or the technological protections used between systems involved in transactions.

Offline MIC Transactions—Verification

The RPS can perform a local, offline verification that the MIC user information is trustworthy, without an online connection. For example, the RPS may perform local cryptographic operations to confirm electronic signatures of the MIC and MIC user information obtained from the UMD. In an embodiment, the RPS may use digital signatures or encryption to obtain, locally, verification of MIC user information. Such verification is possible when the RPS receives the MIC user information directly from the UMD instead of the APS, e.g., when the RPS is operating in an offline mode. Thus, the RPS does not contact the APS, but instead uses an offline stored public key of the APS to verify that the MIC user information is trustworthy as received from the UMD.

In the MIC environment presented in FIG. 1A, a person presents a UMD 110 that includes MIC as part of an environment that supports MICs. The APS 120 electronically provisions the valid, authentic MIC onto the UMD 110, to ensure confidentiality, integrity, and authenticity of the MIC, or may have a third-party facilitate provisioning of the MIC to the UMD 110. The MIC may be associated with MIC information including biographics, biometrics, and other (such as privileges). The MIC may have a compartmentalized structure to enable the user to selectively control and release the information to relying parties. The provisioning of the MIC is done before the request for client access and is thus indicated by a more lightly weighted arrow in FIG. 1A.

Embodiments of the MIC environment may be compatible with multiple, different forms of identification (ID) and corresponding authorizing parties. The MIC may be capable of storing multiple different forms of ID simultaneously. For example, the MIC environment supports non-governmental forms of ID, including those from private companies, such as digital identification providers, third-party security service providers, and the like. Embodiments may be compatible with forms of ID and their providers that are authorized by a governmental authority (or a non-governmental authority agreed upon by the relevant parties to the transaction) to provide and/or authorize credentials. For example, embodiments may be compatible with forms of employee IDs or other membership IDs such as real estate licenses, used to prove employment or other membership status (e.g., by including a verifiable employee ID number or other membership ID number).

Figure 2:
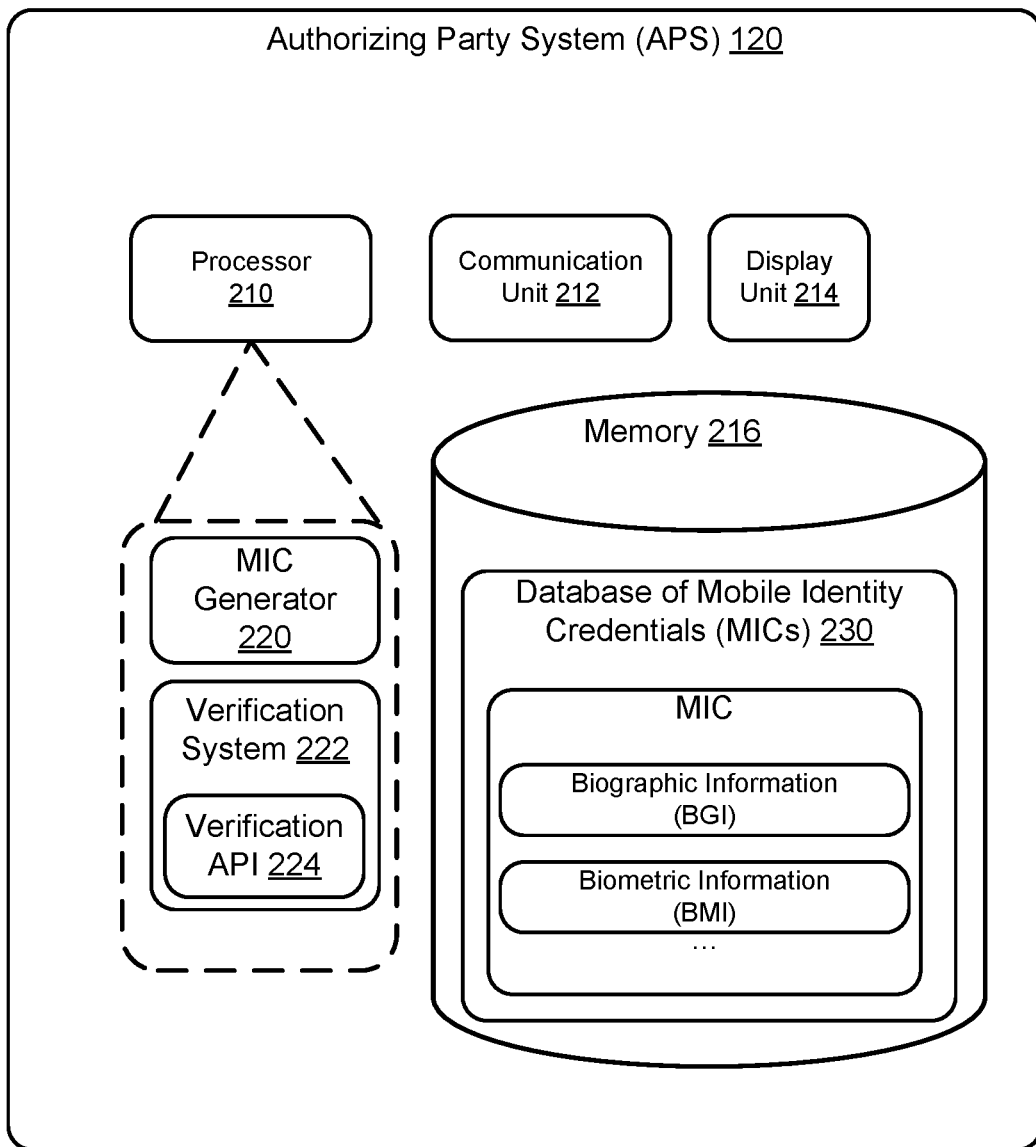
FIG. 2 illustrates an Authorizing Party System (APS) according to an embodiment.
Figure 3:
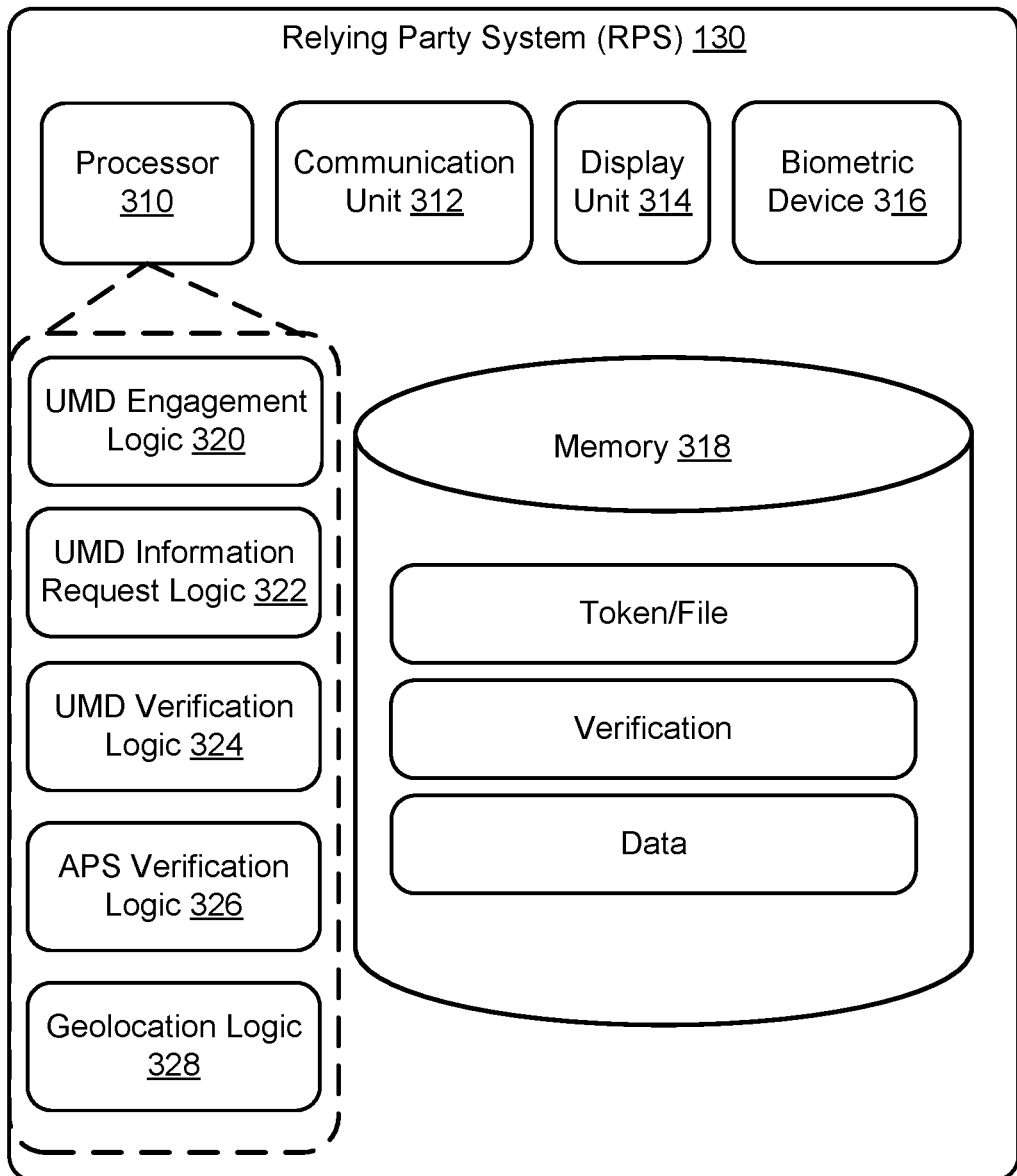
FIG. 3 illustrates a Relying Party System (RPS) according to an embodiment.
Figure 4:
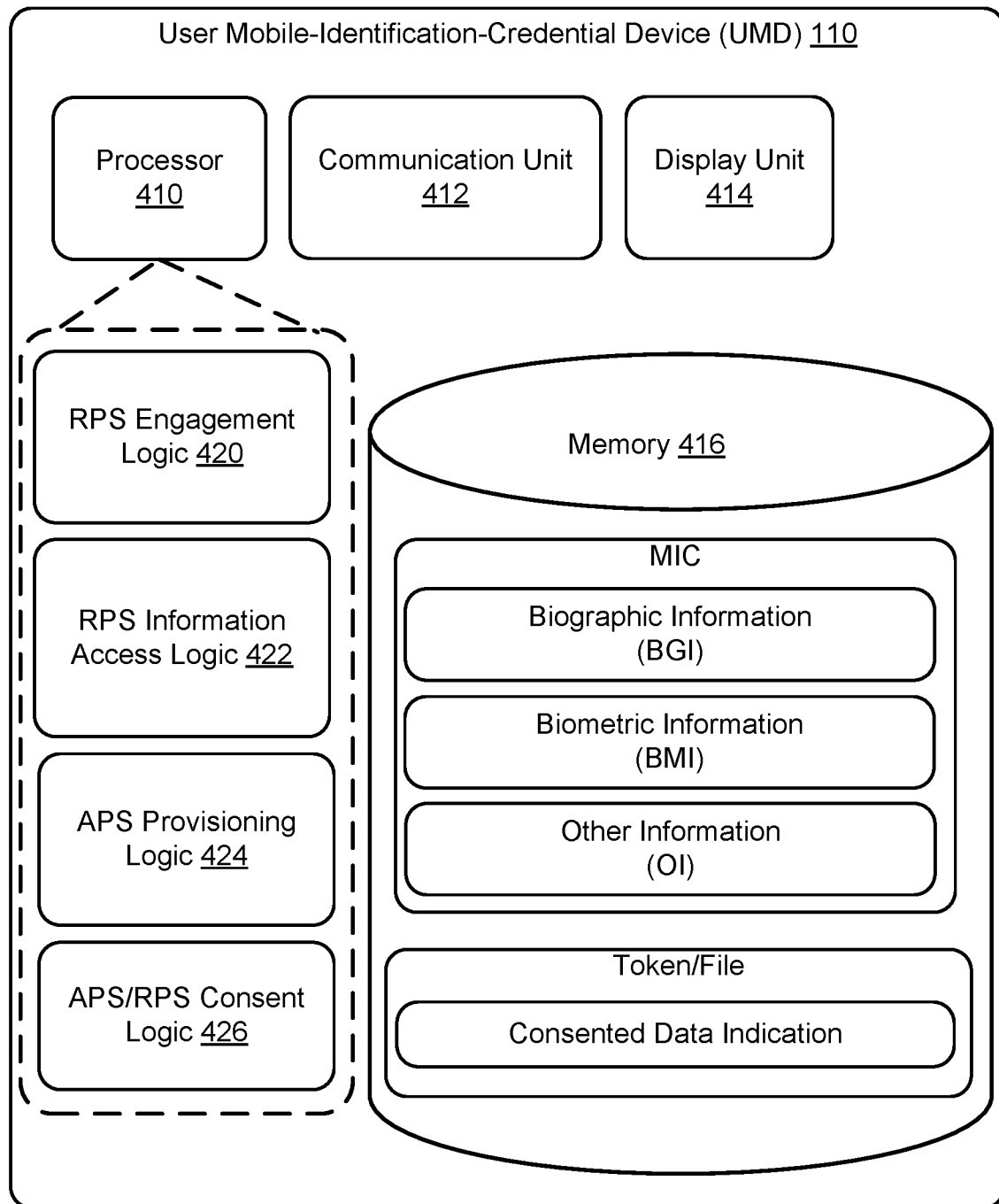
FIG. 4 illustrates a User Mobile-Identification-Credential Device (UMD) according to an embodiment.

As seen in FIG. 1A, the UMD 110 interacts with another device to share some or all of the content of the MIC. The device that is to receive the MIC information is held by a provider such as a medical office or some other medical or healthcare entity in the medical use context, which is a relying party that will rely on the information yielded via the MIC. The device of the relying party is the RPS 130. In some embodiments, the relying party has a database 133 of client records of clients (e.g., medical records of patients or transaction records) and other information; such other information may include biographic information (e.g., age, gender, address, social security number, driver's license number, etc.) and/or biometric information (e.g., photograph, fingerprint, iris or retina scan, etc.). Such information can be used to conduct user verification independent of the use of the MIC information and/or can be updated for purposes of keeping the provider records of the clients current (e.g., keeping the medical records of patients current). Some embodiments involve an escrow server (escrow provider system) containing digital content and other information 134; such other information may include agreements, contracts, ledger, or the like, as well as biographic/biometric data of the parties (e.g., provider and client) involved in escrow. In specific embodiments, such information may be used to verify the identity of the party making a request to release something from escrow (requesting party) and may be optionally used to verify that the requesting party has met his or her obligations. The network 640 facilitates communication between the UMD 110, APS 120, and RPS 130. Examples of the network 640 may include the Internet and a variety of different wired and wireless networks. Examples of the APS 120, RPS 130, and UMD 110 are illustrated in FIGS. 2-4.

Medical Use Cases

The medical use cases may involve requests for medical access to a facility with other controlled access requirements, or, for example, a portal with records, approvals for prescriptions, or location information. In one embodiment, a client may be a patient seeking to receive his/her medical records from the medical office or hospital. In another embodiment, the client may seek performance of a medical procedure which may be a diagnostic or a treatment procedure. In yet another embodiment, the client may seek medical examination such as a routine physical or medical screening such as screening for drugs or other substances or for illness including cancer and other illnesses or disorders. For some of the procedures, the client will need to pass through a checkpoint to access a restricted area subject to access control.

In some embodiments, the medical transaction involves transfer of payment by and/or transfer of information to and from a third party. In one example, the third party may be a health insurance company responsible for medical reimbursement and entitled to certain information relating to the nature and cost of medical services performed by the medical provider. In another example, the third party may be a prospective employer that is paying for the medical screening of the client for employment purposes and will receive the results of the medical screening from the hospital. In yet another example, the third party may be another entity such as an insurance company or another medical office or a government entity which is authorized by the client to receive the results of the medical services from the hospital. In these examples, the client can provide MIC information to the third party and provide consent to the hospital to disclose certain medical records to the third party.

At the time of the medical appointment, the client or user presents the MIC at a reception or security checkpoint RPS 130. The touchpoint RPS 130 has a dialog with the user via the UMD 110 of the user which is locally and securely linked, in an example, via Bluetooth, RFID, near-field communication, or the like. In an embodiment, the user hovers the UMD 110 against a reader (e.g., a near-field reader) at an access touchpoint serving as the RPS 130. Such a transaction is envisioned to be constrained by proximity (e.g., two inches or less) between the UMD 110 and a reader of the RPS 130. The reader of the RPS 130 can include a smart antenna to receive and process the transmission in a specific way so as to address confidentiality, integrity, and availability of the transmission, e.g., based on an emerging ISO18013-5 standard. In an embodiment, the access touchpoint reader serving as the RPS 130 may include a camera and be equipped with a "smart reader" to ingest digital identity information (MIC user information) from the UMD. The reader-camera system serving as the RPS 130 can treat the MIC user information the same way it would treat physical identification information, to enable backend processes. The reader-camera system serving as the RPS 130 can also match the digital photo, transmitted with the MIC user information, against a live capture of the user's face as captured by the reader-camera, as part of verifying the user's identity.

In another embodiment, an automatic gate equipped with the reader-camera at the access touchpoint serves as the RPS 130. This allows a client/user to self-navigate the presentation, transmission, verification, and vetting processes via the automatic reader-camera gate, by presenting to the reader-camera the digital identity on the user's UMD 110. Verifications performed by the automatic reader-camera gate may be agent-attended or not. Depending on access control or security lane configurations, an agent need not attend the automatic reader-camera gate on a 1:1 basis. Rather, an agent may monitor user flows at multiple lanes, and resolve issues in cases of identity non-match, mismatch, or anomalies that necessitate manual intervention and resolution. Upon verification, the automatic reader-camera gate may trigger the opening of the gate to allow the user to proceed past the gate.

In another embodiment, the RPS 130 may be a kiosk in electronic communication with a remote reader system. The kiosk enables the UMD 110 to transmit MIC user information remotely to the remote reader system over a distance, without having to bring the UMD 110 in close proximity to the remote reader system. Such distance is envisioned to be an at-distance transmission protocol in which proximity (e.g., two inches or less) is not a constraint. In an embodiment, at-distance is envisioned to be roughly an area serviced by Bluetooth Low Energy (BLE). After the UMD 110 transmits the MIC user information, the remote reader system (i) performs identity verification or vetting for the user associated with the transmitted MIC user information, and (ii) stages or prepares a previously stored digital photograph, to be matched against the user's live face when appearing before the remote reader system. Before the user arrives at the remote reader system, the remote reader system uses the MIC user information to perform verification or vetting securely, and to stage a transmitted digital photo in a 1:1 matching solution or a 1:k gallery at the edge, to be matched against an imminent encounter with the user. To recap, for the remote reader system, the user transmits MIC user information to the remote reader. The remote reader stages the transmitted MIC user information, including a digital photograph. The user then eventually passes in front of the remote reader (e.g., after progressing through the reception or security queue), which then proceeds to capture a live photograph or video of the user, to perform facial matching with the staged digital photograph. No additional interactions are needed when passing in front of the remote reader, enhancing user experience and processing efficiency. The user may merely pause in front of the remote reader equipped with a camera for pre-staged facial matching, and then proceed. Any gate associated with the remote reader may automatically open.

In yet another embodiment, the RPS 130 may be a remote automatic reader-camera gate system, which may include a kiosk. Initially, the remote automatic reader-camera gate system performs a biometric check or liveness check of the user, via the kiosk or a mobile platform operating on the user's UMD 110. The kiosk establishes a secure connection (e.g., via a secure network, a https secure portal, a virtual private network or the like) to the remote system, which is located in the same checkpoint area. The UMD 110 then performs a secure and authenticated transmission of the MIC user information at distance to the remote system. The remote automatic reader-camera gate system stages the transmitted MIC user information, in preparation of imminent user encounter (e.g., as the user progresses from the kiosk through the reception or security queue to the remote system). As described above, before the user arrives, the remote system uses the MIC user information to perform verification or vetting securely, and to stage a transmitted digital photo (part of the MIC user information) in a 1:1 matching solution or 1:k gallery at the edge to be matched against an imminent encounter with the user. The user then merely pauses before the remote system as the encounter for facial matching as described above, and upon matching, proceeds past the remote system. Thus, the remote system allows the user to self-navigate the presentation, transmission, verification, and vetting processes via the remote system, by presenting the MIC user information on his or her mobile device to the remote system at distance without having to be close to the remote system to initiate the transmission.

A QR code may be used to establish the dialog between the UMD 110 and the RPS 130. In an embodiment, the reception or security checkpoint RPS 130 presents a QR code which the UMD 110 scans. In another embodiment, the UMD 110 displays a QR code which the reception or security checkpoint RPS 130 scans. The scanning establishes a secure local (close-proximity) connection, between the UMD 110 and the reception or security checkpoint RPS 130, using respective local connection circuitry. In another example, UMD engagement logic establishes a key exchange protocol usable by the UMD 110, via radio frequency or visual communications. UMD engagement logic encodes a public key in an optically readable QR code and displays the QR code to the UMD 110. Upon reading the QR code, the UMD 110 responds to the RPS 130 with a key exchange to secure a local connection between the RPS 130 and the UMD 110. In embodiments, the secure local connection utilizes other protocols, such as secure Near Field Communication (NFC), secure Bluetooth, secure Wi-Fi, or the like.

In another embodiment, the UMD 110 wirelessly transmits identity information to the RPS 130, after the user has authorized the release of the identity information through a biometric verification of the user's identity performed by the RPS 130, or by personnel attending the transaction with the RPS 130. This wireless transmission of identity information to the RPS 130 may alleviate the need for a client/user to present a physical identity document, such as a driver's license. The UMD 110 and the RPS 130 may use a digital handshake to establish a secure local device-to-device wireless communication connection for such transmissions of identity information.

In yet another embodiment, the user interacts with the RPS 130 by using the UMD 110 to perform an initiation with the RPS 130. The UMD 110 and RPS 130 perform a handshake establishing a secure local connection between the UMD 110 and RPS 130. The handshake and secure local connection are implemented according to various embodiments and are initiated by either device. In an embodiment the handshake is based on OpenID Connect. In an embodiment, the RPS 130 includes a Radio-Frequency Identification (RFID) reader and the initiation is based on RFID. The user places the UMD 110 on the RFID reader of the RPS 130, and the RFID reader detects the UMD 110. Such detection is treated as user-initiation of the handshake and proximal consent from the user to the RPS 130, to allow the RPS 130 to perform the handshake with the UMD 110. During the handshake, the UMD 110 and the RPS 130 establish a secure local connection, enabling the RPS 130 and UMD 110 to exchange information securely. In another embodiment, the handshake and connection are based on Wi-Fi Aware.

In an embodiment, the secure local connection is established via, or based on, Bluetooth Low Energy (BLE). The RPS and UMD establish their modes, whether BLE central mode (scanning) or BLE peripheral mode (advertising), and exchange connection information such as transmitter signal strength, media access control (MAC) addresses, universally unique identifiers (UUIDs), device names, and the like. Such information, corresponding to BLE, enables the RPS and UMD to establish the local secure connection. In embodiments, the BLE connection provides BLE-specific security measures. In other embodiments, the RPS and UMD apply security at the application layer of the secure local connection, e.g., via cryptography implemented at the RPS and UMD. The secure local connection is established, and data transfers are allowed to begin by the RPS and/or UMD setting a connection state to 'start.'

The user is prompted by the UMD 110 to consent to the release of their MIC user information to the reception or security checkpoint RPS 130. The MIC user information is releasable directly from the UMD 110 or indirectly from the APS 120, based on the transaction proceeding according to an online mode or offline mode as explained above. The reception or security checkpoint RPS 130, or the UMD 110, performs a liveness check. For example, the touchpoint RPS 130 compares collected biometric information to verified credentials. In an embodiment, a reader at an access touchpoint serving as the RPS 130 touchlessly verifies the MIC user information against stored data, and facially matches the user (e.g., by performing a live camera capture) against a previously stored digital photograph of the user. Such verifications may be agent-attended, to ensure the user proceeds to an appropriate lane based on an outcome of the user verification. The access touchpoint reader can include a camera and reader, enabling the reader to capture user photographs or video and ingest digital MIC user information securely to perform verifications, and also to perform matching of stored digital photographic data against live photographic data. In another embodiment, the reception or security checkpoint RPS 130 also compares collected biographic information and/or biometric information against information received from a third party such as a prospective employer or insurance company or government entity. In an embodiment, such comparison may be made via a back end, which contains a staged copy of the user's insurance information, prospective employment information, or the like.

In another embodiment, the reception or security checkpoint RPS 130 or a back end 135 uses the verified photograph of the user to stage a gallery of users expected to arrive for a medical appointment in a given timeframe. Such a gallery conserves resources by using the staged gallery of photographs to perform a 1:n comparison when processing clients at touchpoint RPSs. Furthermore, the staged gallery enables prompt and efficient availability of verified client photographs, e.g., as performed at the back end 135. The gallery can be used for medical staff users expected to arrive at the RPS 130 in a given timeframe (e.g., during the beginning of an expected employment shift or the like). In an embodiment, such photographs stored at the back end 135 are readily available via touchpoint RPSs that are in network communication with the back end 135. In another embodiment, one or more of the photographs in the staged gallery are transferred to, and stored at, the touchpoint RPSs. In an embodiment, such storage and/or transfers at and/or between the back end 135 and the touchpoint RPSs are controlled and purged, based on time windows corresponding to the appointment times for the client-users or shift change times of the employee-users depicted in the photos, and/or a total time limit corresponding to how long the gallery and/or copies have been stored.

The MIC environment 10 also enables photographic galleries for more efficient staging and other operations. A user may have provided verified user information to the third party such as an insurance company or prospective employer or government entity via a digital ID or mobile ID such as the MIC stored on the user's UMD 110. In another example, the third party may be a ticket sales/issuing or reservations entity that sells tickets to clients for musical, sports, or other events. The client purchases a ticket and becomes a ticket holder that entitles the client entry to the event. The third party hence possesses verified user information, such as the user's photograph and other biometric and/or biographic information. Such information can be staged at the back end 135 for more efficient operation of the MIC environment. For example, the back end 135 stages a photographic gallery for 1:n vetting of clients or users or ticket holders. In another embodiment, such information is also propagated to the edge of the MIC system, e.g., at the touchpoint RPS 130, enabling the 1:n matching of photographs to be performed at the RPS 130. In embodiments, such comparisons involve a biometric matching between staged information and live-captured user information or verified MIC user information. Furthermore, staging the 1:n gallery with user photographs or other information enables the RPS 130 and/or back end 135 to reference and access such staged information efficiently. For example, the RPS 130 merely handshakes with the UMD 110 to access the locally stored copies of corresponding MIC user information, without needing to devote computing resources to transferring potentially large data files such as photographs, because such photographs are already pre-staged. In embodiments, the RPS 130 presents a QR code or RFID scan/tap to access the stored or staged record corresponding to the staged gallery of user information. Thus, in such embodiments, at the point of transaction, the entity operating the RPS 130 already has the user data pre-loaded and ready to use. Such readiness is facilitated by the back end 135 or RPS 130 accessing or staging information being kept particularly fresh or relevant based on expected arrival times of users, without needing to clutter the staged information with users who are not expected to arrive within a given timeframe. In embodiments, the back end 135 is provided by the hospital or by a third-party security service provider. In other embodiments, the RPS 130 and/or back end 135 are configured to vet users that do not have appointments or event tickets (e.g., walk-ins, uninsured patients, or the like), but otherwise have a legitimate reason to pass through the touchpoint kiosk or touchpoint device. Accordingly, the status vetting by the RPS 130 is achieved without a need for the user to present any paperwork at the reception or security checkpoint RPS 130.

Another benefit provided by the MIC environment is for preparing a user so that his/her UMD is ready ahead of time, before arriving at the touchpoint RPS 130. For example, a QR code greets the user upon entering a first queue leading up to the touchpoint RPS 130. The user scans the QR code using the UMD, and the UMD sets itself to operate in UMD mode (e.g., launching the UMD app for interacting with the touchpoint RPS 130), or presents the user with instructions for readying the UMD device for interacting with the touchpoint RPS 130. Accordingly, the touchpoint RPS 130 efficiently processes users, who are already prepared in advance to interact with the touchpoint RPS 130 using their UMDs. In another embodiment, the UMD automatically detects a beacon, geolocation information, or other local signal indicating the user is entering the queue prior to the touchpoint RPS 130. The UMD then automatically launches the UMD app and alerts the user to be ready for interacting with the touchpoint RPS 130. The user's UMD then proceeds to establish the secure local connection and carry out identity verification with the APS or RPS as described above.

Figure 1B:
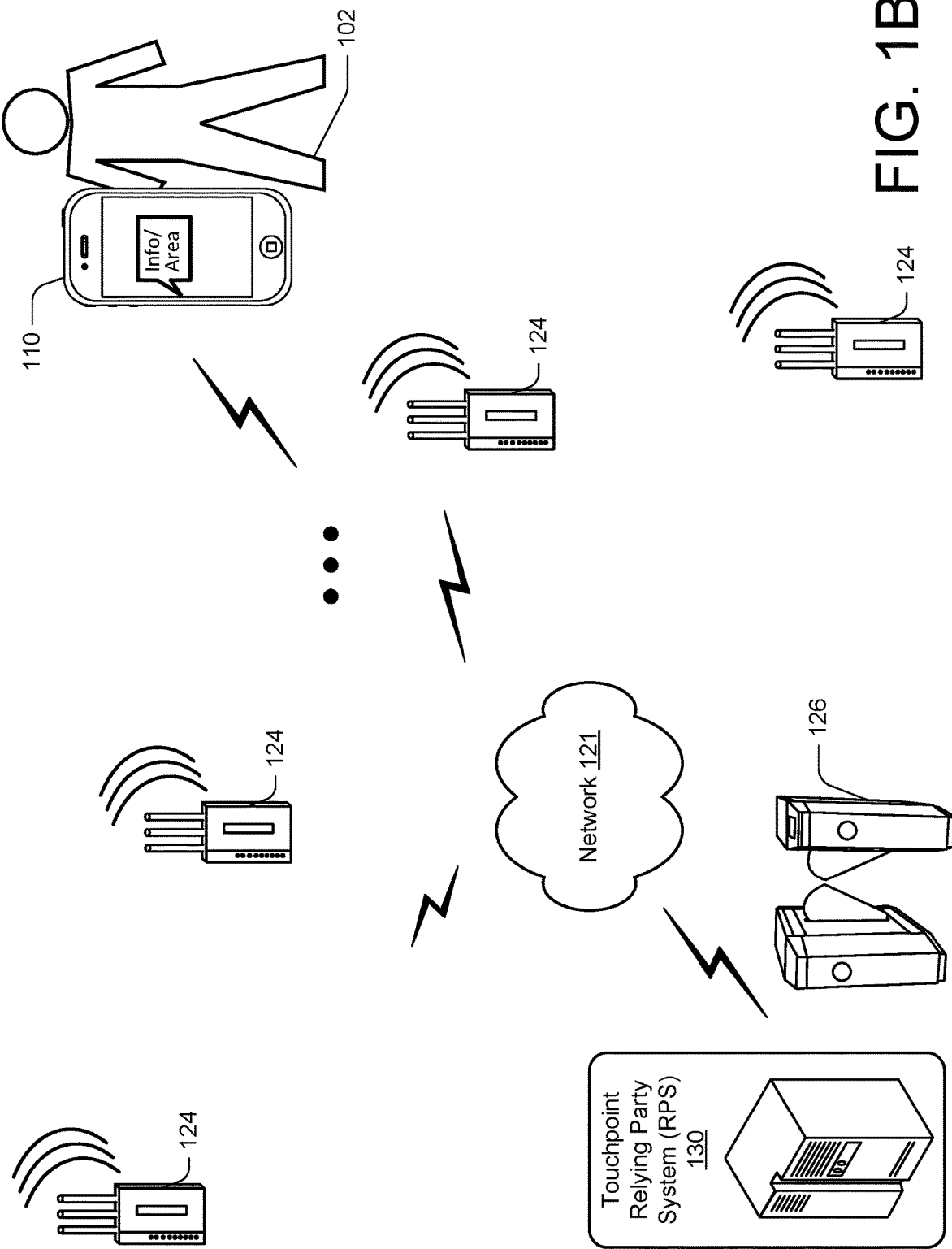
FIG. 1B illustrates an example MIC environment including a plurality of distributed readers at distances from a reception or security checkpoint according to an embodiment.

FIG. 1B illustrates an example MIC environment including a plurality of distributed readers at distances from a reception or security checkpoint 126 according to an embodiment. The distributed readers 124 are in connection with a touchpoint RPS 130 at the checkpoint 126. The readers may be wireless beacons 124 (e.g., wireless routers with beacon capability) that detect the arrival of a client/user 102 via his/her UMD 110. The readers 124 may be distributed at various locations of the hospital or medical office in the context of a medical application. In one example, the readers 124 are distributed along or near a perimeter of the hospital or medical office.

As disclosed herein other embodiments include using an MIC environment for other commercial applications using distributed readers 124 to differentiate and pre-stage individuals. For example, the disclosed MIC environment may be used in order to efficiently direct individuals to secure access points at a facility with multiple secure access points. Another example is pre-staging individuals for the correct queue line to a secure facility. Another example is identifying individuals in vehicles while approaching a controlled location and allowing access to only the individual's corresponding secured checkpoint.

FIG. 1C is a flow diagram illustrating an embodiment of a process 180 for pre-staging user information. In step 182, the UMD 110 establishes communication (e.g., via a local secure connection) with the touchpoint RPS 130 at the reception or security checkpoint 126 which is connected with an at-distance reader 124 via a local network 121, based on (i) the user's express permission on the UMD, (ii) automatic connection for the pre-opted-in UMD, or (iii) a mutual authentication consent procedure using digital certificates or keys between the UMD 110 and the RPS 130. The UMD 110 may electronically communicate MIC information with the reader 124 by performing a handshake procedure with the remote RPS 130 (e.g., Remote-CAT system) at the checkpoint 126 via the local network 121 that is secure. In one embodiment, the client is prompted to give permission to transmit the MIC information to the RPS 130 (e.g., in response to a prompt resulting from a ping from the reader 124 which is triggered by proximity between the reader 124 and the UMD 110). In another embodiment, the client has pre-registered the UMD 110 with the RPS 130 in advance with user/client registration information and may have downloaded an application software of the RPS. The pre-opted-in UMD 110 automatically transmits the MIC information to the RPS 130 by performing a handshake procedure with a local network 121 via the beacon. The permission-based approach protects the client's MIC information. In yet another embodiment, the UMD 110 and the RPS 130 perform a mutual authentication consent procedure using digital certificates or keys before transmission of the MIC information.

In specific embodiments, a terminal authentication protocol is used to determine whether the reader 124 is allowed to read sensitive data from the digital identity on the UMD 110. Sensitive data can only be read when the terminal authentication protocol is successfully executed This protocol ensures that the individual's information is not shared with unauthorized systems.

In one example, a reader 124 may only access certain data on the UMD when an RF chip grants access if the reader 124 provides an explicit access permission for data. During terminal authentication, the reader 124 may transmit access permission to the RF chip in the form of a terminal certificate (reading device certificate) and the RF chip can verify the authenticity and integrity of the terminal certificate. If the authenticity and integrity of the terminal certificate sent by the reader is verified, then the RF chip next ensures that this certificate has really been issued for this reader 124. Therefore, the RF chip sends a random number, for example, to the reader 124, which the UMD signs with a secret key that corresponds to the terminal certificate. The verified reader 124 then sends the signed random number back to the RF chip. By using the public key of the reader that is included in the terminal certificate, the RF chip can verify the signature of the random number and determine if the reader 124 possesses the correct certificate private key.

In another example, a reader 124 transmits first information based on secret information that is unique for each reader and a client certificate including a hash value of the secret information that is derived from the secret information to the UMD. The UMD receives the first information and the client certificate, derives a hash value from the secret information based on the first information using a unidirectional function, and authenticates the correct reader 124 on the basis of the derived hash value and the hash value of the secret information included in the client certificate.

In another example, the UMD 110 pings a backend server system directly to make sure the reader 124 it is encountering is a valid reader. In one specific case, the UMD sends the media access control (MAC) address of a reader 124 to an authentication server, for example, to authenticate the MAC address by comparing the MAC address to a preset MAC address list. If the authentication result reveals the reader 124 is not on the preset MAC address list, a security gateway detects, according to a data stream of the reader, whether the 124 reader is a trusted reader. If the reader is a trusted reader, the authentication server is instructed to update the preset MAC address list. The update triggers the UMD to re-authenticate the reader.

In step 184, the RPS 130 performs identity verification pre-staging of the user based on MIC user information received by the touchpoint RPS, before the user 102 arrives at the reception or security checkpoint 126. In step 186, the RPS 130 compares live-captured user/client information (e.g., using a biometric reader or a camera at the reception or security checkpoint 126) or verified MIC user information with pre-staged user information, to determine whether there is a match. In step 188, the RPS 130 grants the user 102 the user access when the RPS determines there is a match with the pre-staged user information. During the pre-staging phase, the user may optionally submit documents or data via the UMD to the RPS, such as registration forms containing user/client registration information, medical history forms, consent forms, and insurance forms. This further improves the efficiency of the check-in process at the reception or security checkpoint 126.

Benefits of MIC transaction include providing an increase in the efficiency of access control operations, such as access to medical information, access to medical testing/screening or service, or access to an area for a medical procedure. It is achieved by enabling an individual (referred to alternatively as user or client or patient) to prove his/her identity using a MIC. In one embodiment, the client uses the MIC when making an appointment. In another embodiment, the client uses the MIC at a hospital reception or security checkpoint using a touchpoint RPS or the like, as explained herein in the context of medical use cases. Using the MIC in these ways improves the system's overall function by avoiding potential mismatches between client medical and/or health insurance information and actual client information. In addition, the MIC provides readily accessible official biographic and biometric information, which reduces the need for network traffic and facilitates cross-checking with records supplied by the client's other medical service providers and/or health insurance provider. Furthermore, the MIC supports automated verification of the client at the hospital reception or security checkpoint via touchpoint RPS, and hence improves utilization of staffing resources. In yet another embodiment, use of the MIC enhances the client experience by verifying payment authorization by a third party and/or verifying client authorization to send medical records to a third party. For example, the touchpoint RPS 130 may complete verification of the client's identity and direct the UMD 110 to prompt the user with a reminder to authorize transmission of medical records to a prospective employer, a government entity, or another medical office. In another embodiment, there is no need for the client to present a medical testing/ screening or some other procedure authorization form at the hospital reception or security checkpoint, because the checkpoint RPS 130 can check with the entity that authorizes the procedure to verify the authorization. The MIC environment further enables the checkpoint to identify clients whose medical procedure authorization is fraudulent or outdated.

These advantages are further enhanced by providing distributed readers or beacons 124 to start transmission of the MIC information from the UMD 110 to the RPS 130 before the client reaches the reception or security checkpoint 126. In this way, the identity verification pre-staging can be completed prior to the client's arrival at the reception or security checkpoint. The use of the at-distance readers 124 further enhances the client experience and operational efficiency. For example, the RPS 130 may transmit geolocation wayfinding instructions to the UMD 110 to allow the user to self-navigate to the proper lane or queue. Wayfinding mechanisms may include position location devices (e.g., wireless beacons) that detect and track the geolocation of the UMD 110 or native positioning technologies (e.g., GPS). The RPS 130 may monitor the number of users arriving and provide wayfinding instructions to direct the users to minimize queue lengths and reduce wait time. The RPS 130 may also adjust staffing at one or more reception or security checkpoints to improve operational efficiency.

The client eventually passes in front of the Remote-CAT (e.g., after progressing through the reception or security queue), which may then proceed to capture a live photograph or video of the user, to perform facial matching with the staged digital photograph. No additional interactions are needed when passing in front of the Remote-CAT, enhancing user experience and processing efficiency. The user may merely pause in front of the Remote-CAT camera for pre-staged facial matching, and then proceed.

Figure 1D:
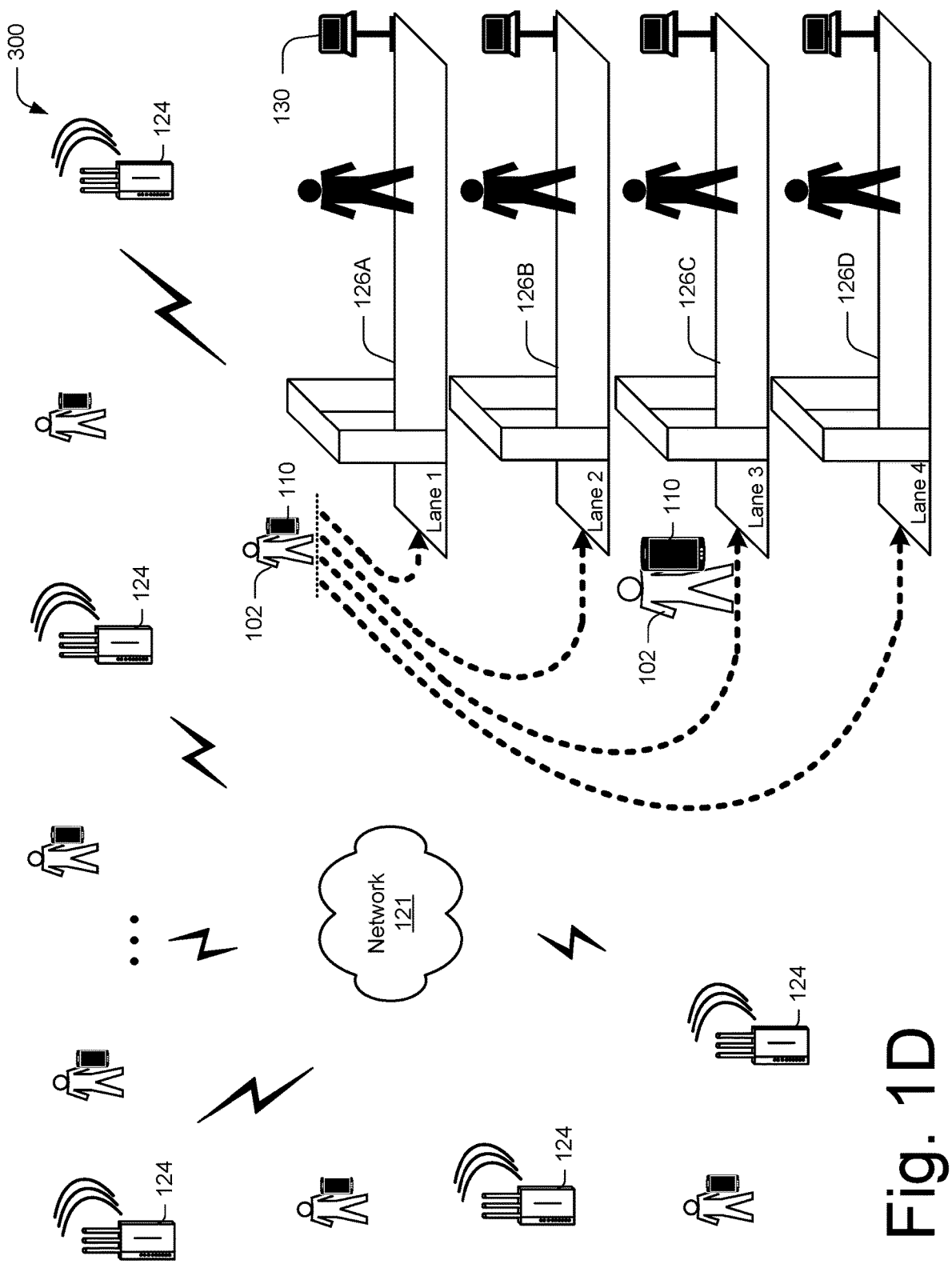
FIG. 1D illustrates an example MIC environment including a plurality of distributed readers at distances from a plurality of reception or security checkpoints according to an embodiment.

FIG. 1D illustrates an example MIC environment including a plurality of distributed readers at distances from a plurality of reception or security checkpoints according to an embodiment. The distributed readers 124 are in connection with a plurality of touchpoint RPSs 130 at a plurality of access touchpoints or checkpoints 126. This example shows four checkpoints 126A-126D in Lanes 1-4. The checkpoints 126 shown are each attended by an attendant. They may be unattended in another embodiment. The readers may be wireless beacons 124 that detect the arrival of a client/user 102 via his/her UMD 110. The readers 124 may be distributed at various locations of a venue such as a stadium, an arena, a parking structure, a building, a casino, a store, a hotel, a restaurant, a voting or polling precinct, a hospital, or the like. Identity verification pre-staging occurs based on communications between the UMD 110 and the RPS 130 via one or more of the readers or beacons 124 prior to the client's arrival at the reception or security checkpoint.

As discussed above, the system may use Wi-Fi beacons or routers 124 as the basis of location information to direct a user to a suitable access touchpoint (wayfinding), in this case, among the four lanes (Lanes 1-4). FIG. 1D shows the user 102 and UMD 110 being directed to Lane 3 with checkpoint 126C. The lane may be selected based on, for instance, queue wait time, membership or reservation categories for the users, ticket levels for users as ticket holders (e.g., corresponding to different seating areas), patient care types for different users as patients, appointment time, or identity verification issues that need to be resolved (to be directed to a dedicated lane for resolving such issues).

Figure 1E:
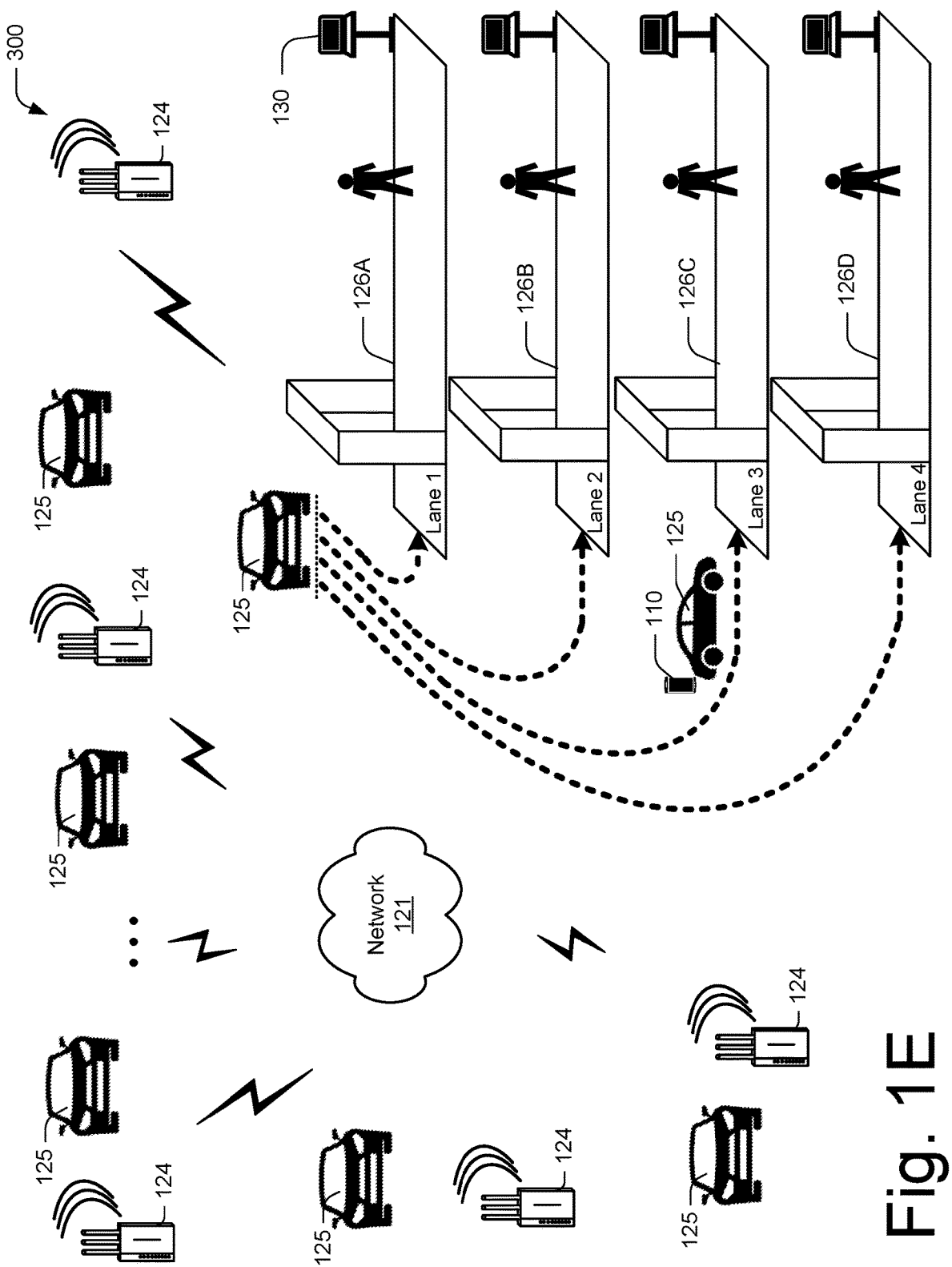
FIG. 1E illustrates an example MIC environment including a plurality of distributed readers at distances from a plurality of vehicle checkpoints according to another embodiment.

FIG. 1E illustrates an example MIC environment including a plurality of distributed readers at distances from a plurality of vehicle checkpoints according to another embodiment. The distributed readers 124 are in connection with a plurality of touchpoint RPSs 130 at a plurality of vehicle access touchpoints or checkpoints 126. This example shows four checkpoints 126A-126D in Lanes 1-4. The checkpoints 126 shown are each attended by an attendant. They may be unattended in another embodiment. The readers may be wireless beacons 124 that detect the arrival of a user vehicle 125 via a UMD 110 of the user. The readers 124 may be distributed at various entry locations of a venue such as a stadium, an arena, a parking structure, a building, a store, a hotel, a resort a restaurant, a hospital, or the like. Identity verification pre-staging occurs based on communications between the UMD 110 and the RPS 130 via one or more of the readers or beacons 124 prior to the client's arrival at the vehicle access checkpoint. As discussed above, the system may use Wi-Fi beacons or routers 124 as the basis of location information to direct a user to a suitable access touchpoint (wayfinding), in this case, among the four lanes (Lanes 1-4). FIG. 1E shows the user vehicle 125 and UMD 110 being directed to Lane 3 with checkpoint 126C.

FIG. 2 illustrates an Authorizing Party System (APS) 120 according to an embodiment. The APS 120 includes a processor 210, a communication unit 212, a display unit 214, and a memory 216. The processor may be associated with logic or modules to process information, including a MIC generator 220 and a verification system 222 with a verification Application Programming Interface (API) 224.

The MIC generator 220 enables the APS to generate a MIC for a given user. For example, the MIC generator receives unique information about the user, such as a social security number. The APS can reside in a local DMV office staffed with agents to verify physical documents in person, who traditionally verify that the social security number belongs to that user. The MIC generator creates a framework to build the MIC for the user and populates the MIC with corresponding biographic and biometric information, e.g., as available locally at the DMV office. In some embodiments, the MIC generator 220 may populate the MIC with other information corresponding to the user, such as driving privileges or special access. For example, the MIC can be issued or provisioned by the Federal Government, and may include special access, privileges, or MIC user information corresponding to positions at Federal Government agencies. In an example, the APS may be located at the DMV, and an agent of the DMV collects and manually verifies proof of identity that the user provides to the agent in person. In an embodiment, a kiosk at the DMV may perform a liveness check of the user and/or otherwise performs unattended verification of the proof of identity that the user provides to the kiosk.

In another embodiment, the MIC generator 220 facilitates verification of the user's identity attributes against official records available to the DMV and/or physically presented by the user. Facilitated verification can be attended by an agent in person, or unattended and self-performed by the user at a kiosk or other automated system. In an embodiment, such facilitated verification may involve the use of a system such as a kiosk or electronic device with audio or video playback and recording, visual scanning, or other telepresence capabilities, which the user accesses to interact remotely with an agent from the DMV or other APS that is to provision the MIC. Such a system can be located remote from the DMV or other APS facility, at which the agent is located, and can be separate from the UMD. In an embodiment, the system to interact with the agent may be the UMD that is to receive the MIC. Such system allows an agent at the DMV, through telepresence or other audio or visual interfaces of the system, to visually access, inspect, and verify information submitted as proof of identity (e.g., by scanning or photographing a birth certificate or the like). In another embodiment, such facilitated verification may involve the user's accessing a remote kiosk or smartphone app to virtually interact with an agent that facilitates the identity verification, or to interact with a self-guided verification user interface, such as a website or smartphone app.

In yet another embodiment, the MIC generator 220 obtains proof of identity for the user whose MIC is to be generated. Such proof is provided via collected and verified information about the user, such as a birth certificate, social security card, proof of residency, or other identity-related documents for proving or otherwise verifying identity, as explained above. The MIC generator 220 collects MIC information related to the MIC that is to be generated. For example, the MIC generator collects, from the APS 120, verified user biographic information such as name and address, and biometric information such as photograph and fingerprints, which will be part of the MIC. The APS provides such biometric information to the MIC generator as needed, e.g., by collecting the user's fingerprints or iris scan, taking the user's photograph, or the like. Additionally, the MIC generator collects from the APS other information, such as driving privileges, that relate to the MIC that is to be provisioned onto the UMD 110.

The MIC generator 220 compiles the collected MIC information into a MIC that is stored in the memory of the APS 120. In an embodiment, the MIC is one of multiple MICs comprising a database of MICs stored in the memory of the APS 120. In embodiments, the stored MIC is available for provisioning onto the UMD 110 and is available to satisfy verification requests from RPS requesting MIC information from the APS according to an online mode.

Next, the MIC generator 220 verifies suitability of the UMD 110 on which the MIC will be provisioned. In an embodiment, the APS 120 performs device identification and verification by interfacing with the UMD to retrieve device-specific identity information from the UMD, such as the manufacturer and model of the user's UMD. The APS checks whether the UMD manufacturer and model information are on a list of acceptable UMDs. In embodiments, such interfacing is carried out via secure wired or wireless local connections between the APS 120 and the UMD 110. In another embodiment, the MIC generator 220 of the APS interfaces with the UMD to identify and verify the UMD in a secure fashion facilitated by an electronically readable and cryptographically protected chip embedded in the UMD. In another embodiment, the APS 120 performs a multi-factor verification of the UMD 110 to identify and verify the UMD. Verifying or identifying the UMD enables the MIC generator to verify that the UMD is compatible with and approved for use with the MIC environment, including provisioning a MIC onto the UMD.

Next, the MIC generator 220 copies the MIC from APS memory to the UMD. In an embodiment, the MIC is copied via the secure wired or wireless local connection between the UMD 110 and the APS 120 used to verify the UMD. In another embodiment, the MIC is remotely provisioned onto the UMD over a remote secure connection, such as via the Internet. Such connections and/or transferred data are secured by encryption or other technological protections as explained above. The MIC generator 220 can read the copied MIC from the 110 UMD and compare the UMD copy of the MIC to the APS copy of the MIC, to verify successful data transfer.

Generated MICs may be stored in the memory of the APS and available for provisioning onto the UMD of the user. In an embodiment, a given APS provisions multiple different MICs onto the UMD, e.g., at an APS that provides a mDL and some other ID or proof. Examples include proof of residency and/or citizenship in cases where residency and/or citizenship confers some benefits.

Different types of MICs may be associated with corresponding different levels of assurance (such as multi-factor verification) needed to facilitate verification of the user's identity, whether in-person or remote, attended or unattended, or other aspects of the identity verification. Furthermore, in some embodiments, a given MIC environment may be associated with a corresponding trust framework, such as the transactions field (or the medical or healthcare field or the voting field) and a related set of rules pertinent to maintaining security of the transactions information (or the medical or healthcare information or the voting information). The level of assurance for a given MIC environment corresponds to the trust framework. Additionally, in an embodiment, communications with the MIC generator (and other aspects of the MIC environment including the APS, UMD, and RPS and their various modules or logic) may be facilitated and secured by cryptographic modules, e.g., as outlined in the National Institute of Standards and Technology (NIST) requirements and standards for cryptographic modules, the Federal Information Processing Standard (FIPS) publication 201 regarding Personal Identity Verification (PIV) requirements, and the like.

The verification system 222 of the APS 120 may be configured to interact with an RPS, such as when handling requests for user information received from an RPS. In the illustrated embodiment, the verification system uses a verification API to handle interactions in a standardized computing format.

The verification system 222 of the APS 120 also may be configured to interact with other systems, such as UMDs (to send or receive tokens), back ends, and the like. In an embodiment, the verification system may be configured to receive a token from the UMD, and a token from the RPS. The verification system then compares the tokens to determine whether the tokens match within an acceptable timeframe. In an embodiment, matching or otherwise verifying the two tokens indicates that the RPS is trustworthy regarding UMD consent and user information.

Generally, the APS verification system 222 verifies various aspects relating to MIC information. For example, the APS verification system may verify whether a request to release user MIC information is legitimate, and if so, authorize the release of such information. In an embodiment, the APS verification system authorizes release of MIC user information to the requesting RPS. In another embodiment, the APS verification system releases MIC user information to the UMD 110, e.g., when provisioning the MIC onto the UMD. In the illustrated example, the verification system uses a verification application programming interface (API) 224 to communicate with other systems requesting verification and/or MIC information, including RPSs and/or UMDs. In some embodiments, the verification system 222 of the APS 120 may be configured to communicate with other systems, such as other APSs including government entities, trusted certificate holders, open ID providers, back ends, and the like. The APS verification system enables such communications to be secure, ensuring the integrity of such communications.

The memory 216 may be associated with a database of MICs 230. A given MIC may include Biographic Information (BGI) and Biometric Information (BMI), which can be selectively requested and provided, e.g., as MIC user information, when the MIC is provisioned onto a UMD. The MIC also can include other information, such as privileges pertaining to the user.

The MIC generally may be structured to securely and discretely store various fields comprising the BGI, BMI, or other information. For example, the BGI may include first name, last name, date of birth, gender, address, identifier number, organ donor status, and the like. In an example, the BMI may include a digital photograph, a digital image representing a QR code containing the BGI, a digital fingerprint representation, a digital retina representation, and the like.

The structure of the MIC enables the other information to be added, such as when provisioning the MIC from the APS to a UMD, or after provisioning the MIC to the UMD, such as when the user enters information into the MIC via the UMD. For example, a user enters supplemental information into the MIC via the UMD, e.g., emergency contact information. Information on the MIC may be compartmentalized and separately accessible.

FIG. 3 illustrates a Relying Party System (RPS) 130 according to an embodiment. The RPS 130 includes a processor 310, a communication unit 312, a display unit 314, a biometric device 316, and a memory 318. The processor may be associated with logic or modules to process information, including UMD engagement logic 320, UMD information request logic 322, UMD verification logic 324, APS verification logic 326, and geolocation logic 328. Embodiments of the RPS may include hardware (biometric device 316) to collect information to perform a liveness check of the user who is present at the location of the RPS, such as a camera, fingerprint reader, retina reader, and the like.

The biometric device 316 may include one or more biometric readers for obtaining biometric information from the user in person at the RPS 130, to be used to match authenticated biometric information in the MIC or otherwise stored in the APS 120 or the RPS 130. Examples include a fingerprint reader for fingerprint matching or recognition, a retina scanner for retina matching or recognition, a facial imaging device or camera for facial matching or recognition, and a voice recording device for voice matching or recognition.

The UMD engagement logic 320 may be configured to enable the RPS to establish a secure local connection with the user's UMD. For example, the UMD engagement logic establishes a key exchange protocol usable by the UMD, via radio frequency or visual communications. In an example, the UMD engagement logic encodes a public key in a QR code and displays the QR code to the UMD. Upon reading the QR code, the UMD responds to the RPS with a key exchange to secure a local connection between the RPS and the UMD. In some embodiments, the secure local connection utilizes protocols such as secure near-field, secure Bluetooth, secure Wi-Fi, or the like.

The RPS's UMD information request logic 322 may be configured to enable the RPS to structure a request for consent from the UMD and transmit that request to the UMD via a secure local connection. The request for consent includes a request for the types of user information which the relying party is requesting by way of the RPS. For example, the request for consent may include a request for the user's date of birth. The request for consent, in some embodiments, may include a dialog in which the user is prompted to answer specific questions, via a user interface, regarding whether the user releases the specific information fields, or a set of fields, to the RPS. In specific embodiments, this dialog is referred to as a release dialog.

The UMD verification logic 324 may be configured to enable the RPS to verify whether user information received from the UMD is valid, as set forth above in connection with online and offline MIC transactions.

The APS verification logic 326 may be configured to enable the RPS to verify whether user information received from the APS is valid. Similar to the online and offline approaches described above, the RPS can access an electronic certificate authorized by the APS, whether stored locally or remotely, to digitally verify information received from the APS that is digitally signed by the certificate used by the APS.

The geolocation logic 328 represents hardware/software constructed to provide location services. For example, the geolocation logic 328 includes software, implemented by hardware, configured to geolocate a smartphone by calculating a device location (or receiving a calculated location from, for example, a beacon) and electronically comparing a reported or determined location to, for example, a lookup table registry of geolocations that are predefined to geographically identify whether the smartphone is within a predefined area, such as a checkpoint, a queue line, a room, an area associated with a device such as a medical screening device, a testing station, an area defined by electronic "fencing" (such as defined by coordinates), and the like as understood by one of skill in the art. Although Wi-Fi based geolocation and systems are referenced, those of skill in the art will appreciate that various positioning systems can be used; these include, but are not limited to, GPS, cellular positioning, Galileo global navigation satellite system (GNSS), magnetic based positioning system, inertia based positioning systems, near field communication (NFC) positioning systems, and combinations thereof.

In other examples, the geolocation logic 328 performs this location identification based on whether or not the mobile device is in electronic communication with one or more wireless type communication transceivers, such as Wi-Fi router with a predefined "limited" distance communication capability. They include but are not limited to BLUETOOTH or NFC with a one-hundred-foot operable range, or a low power cellular transceiver with an effective range that corresponds to the area to be "fenced." In this way, the computer resource associated with the wireless communication devices does not calculate an actual location (e.g., a precise or semi-precise location based on operating parameters), such as through triangulation, of the mobile device, but it is "presumed" due to the device's effective range, e.g., received signal strength indication (RSSI) and the mobile device being in communicative contact with one or more transceivers. For example, the computing resource for the RPS 130 determines that a mobile device is within ten meters or thirty-two feet of a BLUETOOTH transceiver as this is the pre-established effective range of the transceiver and it is in communication with the mobile device. In embodiments, the geolocation functionality described in relation to the computing resource is provided in a distributed fashion (e.g., round robin, localized hand-off, first in first out) with, for example, a computing resource for a checkpoint lane (under control of the cloud resource/computing resource) making the location determination using a geolocation logic as described to make a decision based on wireless sensor/beacons/etc. for that lane, area, or physical screening device such as a MMW scanner.

In some instances, a reported location is a location reported by a mobile device, such as a smartphone, a smartwatch, or the like, e.g., "self-reported." In this instance, the mobile device calculates its position and reports it to, for instance, a cloud service. In other instances, the system obtains location information from a device other than the device being located. For example, one or more Wi-Fi beacons report a location associated with a smartphone in communication with one or more of the beacons, e.g., three beacons to triangulate the device's position. This communication may be for establishing the smartphone's location or may be an ancillary to, for example, communicating information with the system. In another embodiment consistent with this disclosure, computing resources associated with the beacon or a location subsystem of the system determine that a mobile device is within an area (e.g., a predetermined area) and electronically communicate the status of the mobile device to the computing resource of the RPS 130, e.g., present or not present.

The foregoing Wi-Fi (WPS) triangulation can be done in place of or in addition to permitting the smart (mobile) device to self-report its position with, in some instances, the geolocation logic 328 electronically determining the mobile device's position. For example, the geolocation logic 328 is configured to permit the smartphone to initially self-report its location (e.g., arrival in a general location), while system components and the geolocation logic 328 make a location determination of the smartphone or, in predetermined other instances, e.g., an electronic determination as to what threshold the computing resource of the RPS 130 instructs a magnetometer to use. The foregoing can be done when, for instance, increased accuracy or security is a factor. An example of the latter is when an individual or an item is directed to a particular location for physical screening or identification. In an instance such as this, the system uses Wi-Fi beacons or routers as the basis of location information to promote security (e.g., avoid location spoofing), increase accuracy (e.g., in comparison to GPS geolocation), assist an individual (wayfinding), due to technological limitations (e.g., a cellular dead zone), or the like. For example, the system includes an RFID reader constructed to determine the presence or absence of a tag (and therefore an object to which the tag is connected) in an effective area for the reader. Those of skill in the art will appreciate that computing resources associated with the Wi-Fi beacon or router can preprocess or handle some of the processing tasks described in conjunction with the geolocation logic 328 in some embodiments in accordance with this disclosure.

Moreover, the geolocation logic 328 can provide location information on a periodic basis (e.g., every minute), in response to a request, or upon occurrence of an event, e.g., a person/smartphone leaving a test center check-in area, a mobile device moving more than ten feet from a currently calculated position, or the mobile device or a beacon reporting a velocity change greater than a pre-established threshold. An example is a beacon updating a table or registry in response to a mobile device moving more than five feet from a previously calculated position within a minute.

The memory 318 may be associated with a token/file, a verification, and data. The RPS makes use of tokens/files for trust and verification. The RPS receives the token/file from the UMD, and the RPS may be configured to pass the token/file to the APS. Thus, the RPS exchanges the token/file at the APS to receive user information. The verification represents a positive confirmation, via the use of electronic signatures or cryptography, that received information (whether from the APS or the UMD), is valid. The data represents the received user information.

FIG. 4 illustrates a UMD 110 according to an embodiment. The UMD includes a processor 410, a communication unit 412, a display unit 414, and a memory 416. The processor may be associated with logic or modules to process information, including RPS engagement logic 420, RPS information access logic 422, APS provisioning logic 424, and APS/RPS consent logic 426.

In an alternate embodiment, the UMD 110 may include removable memory, such as a Universal Serial Bus (USB) flash memory unit or micro Secure Digital (SD) flash memory card. In such embodiments, the memory of the UMD, which contains a provisioned MIC, may be separable from the UMD and/or combinable with a different UMD. In another embodiment, a memory itself serves as the UMD. In such embodiments, a user carries a portable memory UMD containing the user's MIC and/or user consent tokens/files. Such a portable memory UMD, in embodiments, may be a portable USB flash drive. To conduct a transaction or otherwise provide identification, the user inserts the portable memory into an RPS 130, which interprets the insertion as proximal consent to read the MIC user information (whether directly from the portable memory to the RPS in an offline mode, or indirectly by retrieving a user consent token from the portable memory and forwarding that token to an APS 120 from which the RPS receives MIC user information). In yet another embodiment, the UMD comprises a code, such as an electrically readable code via magnet, RFID, and the like, or an optically readable code such as barcode, QR code, and the like. In such embodiments, the user conducts a transaction or otherwise provides identification by presenting the code to an RPS including a reader compatible with the code's format. In an embodiment, the RPS may include a keyboard that the user uses to manually type the code. In another embodiment, the RPS may include a card reader to read the code contained in or on a card-format UMD, whether electronically, magnetically, or optically encoded on the card. The RPS reader can verify such identities by using those forms of identity to retrieve biometric information from the APS and performing a comparison with the user to verify that the MIC belongs to that user. In yet another embodiment, the UMD may be a personal identity verification (PIV) card.

The RPS engagement logic 420 may be configured to enable the UMD to establish the secure local connection with the RPS, as set forth above with respect to the description of FIG. 3.

The RPS information access logic 422 may be configured to enable the UMD to allow the RPS to access the MIC user information associated with the MIC (whether stored at the UMD for offline mode access or stored at the APS for online mode access). In the context of allowing access to MIC user information stored on the UMD, passive access involves the UMD enabling the RPS to read data from the UMD. Active access involves the UMD transmitting data to the RPS. Allowing access furthermore may include the UMD authorizing release of MIC user information from the APS to the RPS, which similarly involves passive or active access between the RPS and the APS. The RPS information access logic 422 may be responsive to the UMD information request logic, as set forth above with respect to the description of FIG. 3.

The APS provisioning logic 424 may be configured to enable the UMD to receive a MIC from the APS and store the received MIC securely on the UMD. The APS provisioning logic may be responsive to the MIC generator as set forth above and as described in connection with FIG. 2. In an embodiment, the APS provisioning logic communicates with the APS to indicate readiness for provisioning the MIC from the APS onto the UMD. In some embodiments, the APS provisioning logic may be configured to provision multiple MICs onto the UMD. For example, the APS provisioning logic provisions a first MIC corresponding to a mobile Driver's License (mDL), and a second MIC corresponding to some other ID or proof such as, e.g., proof of residency and/or citizenship in cases where residency and/or citizenship confers some benefits. The UMD stores the MIC in the memory as illustrated, including the various information of the MIC such as the BGI, BMI, and OI.

The APS/RPS consent logic 426 may be configured to enable the UMD to receive requests for the consent and release of MIC information. The APS/RPS consent logic may be configured to generate, responsive to received requests, corresponding compartmentalized and/or discrete prompts for the user's consent to selectively indicate approval to release such MIC information. In an example, the APS/RPS consent logic may be configured to interact with the UMD information request logic, as set forth above and described in connection with FIG. 3. In an embodiment, the APS/RPS consent logic receives the user's selective consent and sends the consent to the APS whereby the APS acts in accordance with the consent. In another embodiment, the APS/RPS consent logic receives the user's selective consent and directs the UMD to selectively release the MIC user information in accordance with the consent.

The memory 416 may be associated with at least one MIC and a Token/File. The MIC may include MIC user information such as Biographic Information (BGI), Biometric Information (BMI), and Other Information (OI) such as privileges. The Token/File may include a consented data indication. In an offline embodiment, the APS/RPS consent logic obtains consent and transmits the requested BGI, BMI, and/or OI (e.g., using a secure communication link and a verification protocol to digitally sign the requested information) from the UMD to the RPS. In an online embodiment, the APS/RPS consent logic obtains consent and transmits, to the APS, the token/file (as stored in the memory) which contains a consented data indication. The token/file does not actually contain the requested MIC information. Rather, the token/file may include the consented data indication which indicates which of the user's MIC information is authorized for release by the APS. Such consented data indication may be used by the RPS. The RPS passes the consented data indication to the APS, which exchanges the token/file for the MIC user information that is consented to be released. The APS then releases to the RPS (e.g., allows access by the RPS) the consented MIC user information.

As used herein, a UMD is not required to be mobile. It is meant to encompass stationary devices such as desktop computers and portable devices such as laptop and notebook computers as well as mobile telephones. In a specific embodiment, the requested MIC may be transmitted from the APS to a stationary intermediary device, which serves as the UMD that subsequently transmits the MIC to a user mobile telephone. This is a typical example of a request made from a remote location such as a person's home using the person's computer as the UMD.

In addition, while the above describes that the user uses the UMD to interact with the medical office system to request client access by verifying the identity of the user, other ways of verifying the identity of the user are possible. In one example, the user presents to the RPS the MIC in the form of a computer-readable storage medium such as a 6B dongle instead of a UMD. For example, the storage medium may be a removable memory from the UMD. In such a scenario, the RPS may be configured to read the MIC from the user's storage medium and, optionally, receives input from the user via a user interface consenting to access part or all of the MIC information and/or decrypting the stored data if necessary. At the end of the user verification process, when all verifications are done, the RPS provides the requested physical medical record to the user in person and/or transfers an electronic medical record to the user's storage medium. Proper procedures are followed to ensure compliance with Health Insurance Portability and Accountability Act of 1996 (HIPAA) in handling electronic protected health information.

In yet another embodiment, instead of using a UMD or a computer-readable storage medium, the user may present to the RPS, in person or remotely, an electronic key or digital code, which the RPS can use to access the user's MIC stored in a third-party storage medium, such as a cloud storage medium. At the end of the user verification process, when all verifications are done, the RPS provides the requested physical medical record to the user in person and/or transfers an electronic medical record to the patient via e-mail or the like.

Process Embodiments

The following describes examples of verifying the identity of the user. In each case, the RPS 130 requests user ID information of the user, which may include some or all of the content of the MIC. The user has the option of consenting to release selectively some or all of the requested information. The information may include age and residency information (e.g., utility bills to establish residency), and may further include citizenship information (e.g., passport or birth certificate to establish citizenship), etc. It may include information confirming the user's pre-approved status for access to a controlled point or location. If the requested user information provided appears suspicious, additional information may be required. For instance, the UMD may provide the location history and travel pattern that can be used as evidence to support the user's residency claim (consistent evidence) or refute the user's residency claim (inconsistent evidence).

Figure 5:
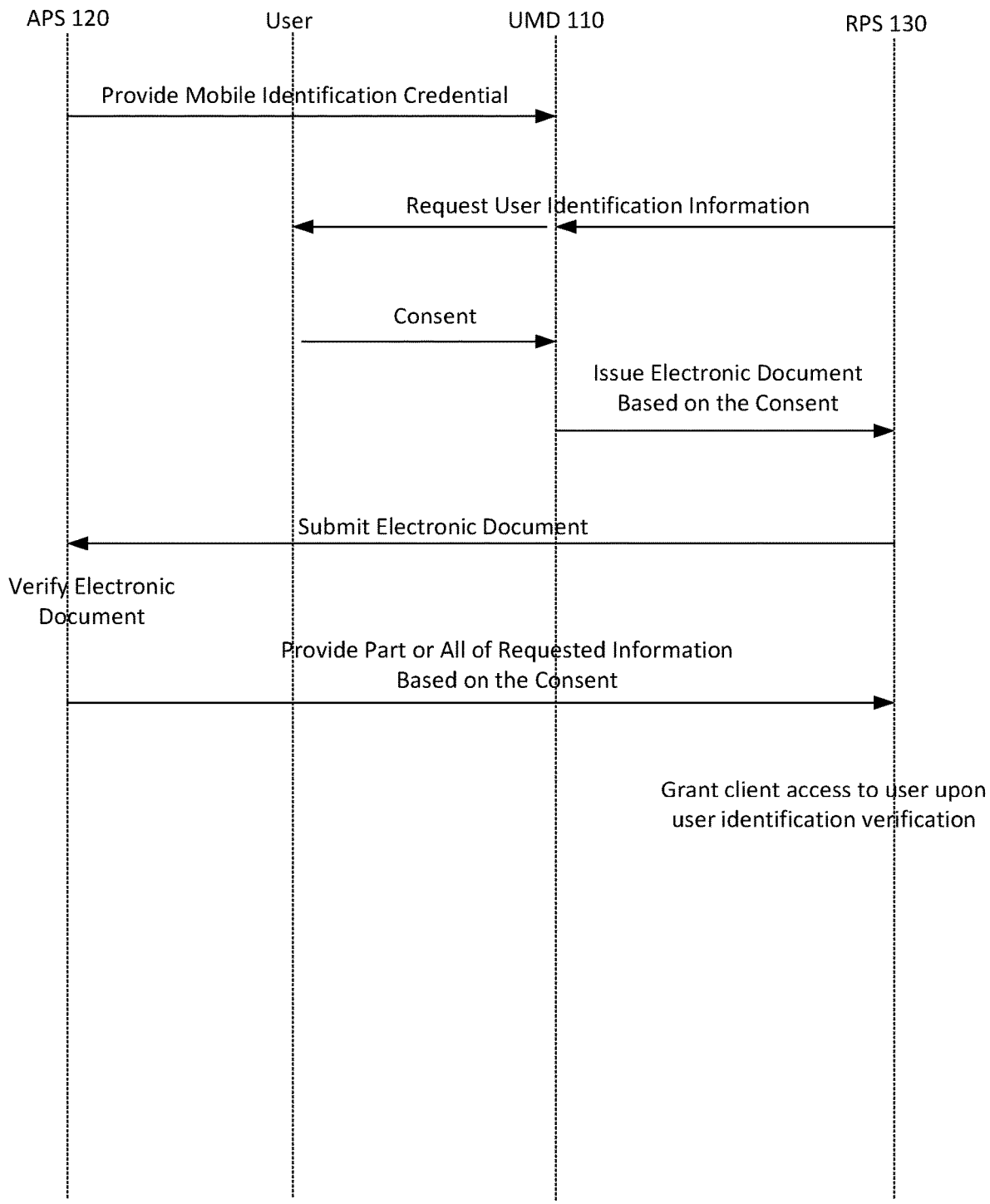
FIG. 5 illustrates verifying information of a client requesting client access using mobile identification credential (MIC) according to an embodiment.

In an embodiment illustrated in FIG. 5, the user of the UMD 110 requests user access or client access from the RPS 130. In response to a request for user identification (ID) information from the RPS 130, the UMD 110, having received the MIC from the APS 120, may issue an electronic document or a digital file such as a digital certificate or a key with consented data indication, based on the user's consent, to the RPS 130. The relying party may be the medical office or some other medical entity that can provide to the client the requested client access. The RPS 130 may submit the electronic document to the APS 120. Upon verification of the electronic document, the APS may provide some or all of the requested information which is associated with the MIC to the RPS 130, as determined by the scope of the consent. For instance, if establishing user identity is the only concern, the user may choose to release only information sufficient to establish identity and none of the other information that is not relevant (such as age, race, gender, national origin, passport, birth certificate, etc.). When the identity of the user is verified to the satisfaction of the relying party, the RPS 130 will provide the requested client access to the UMD 110 or its user. In the medical use context, physical medical record can be provided to the user in person or mailed to the user. An electronic medical record can be downloaded or otherwise transferred to the UMD 110. A similar process is employed when the request is made by the user from a remote location except that the medical record may be issued only electronically to the UMD 110. Proper procedures are followed to ensure compliance with HIPAA in handling electronic protected health information. When the received electronic document is not verified by the APS, the APS 120 sends the UMD 110 a notification to resubmit the request for user ID information.

The above steps may occur with the touchpoint RPS 130 at the reception or security checkpoint 126 of the medical office. Alternatively, part or all of the above steps may occur using pre-staging based on communications between the UMD 110 and the RPS 130 via one or more of the readers or beacons 124 prior to the client's arrival at the reception or security checkpoint. Upon arrival, the Remote-CAT system performs a comparison of the client's biometrics with the pre-staged biometrics such as pre-staged facial matching. When there is a match indicating user identity verification, the RPS 130 grants the client the requested client access. The comparison may involve a biometric matching between pre-staged information and live-captured user information or verified MIC user information.

Figure 6:
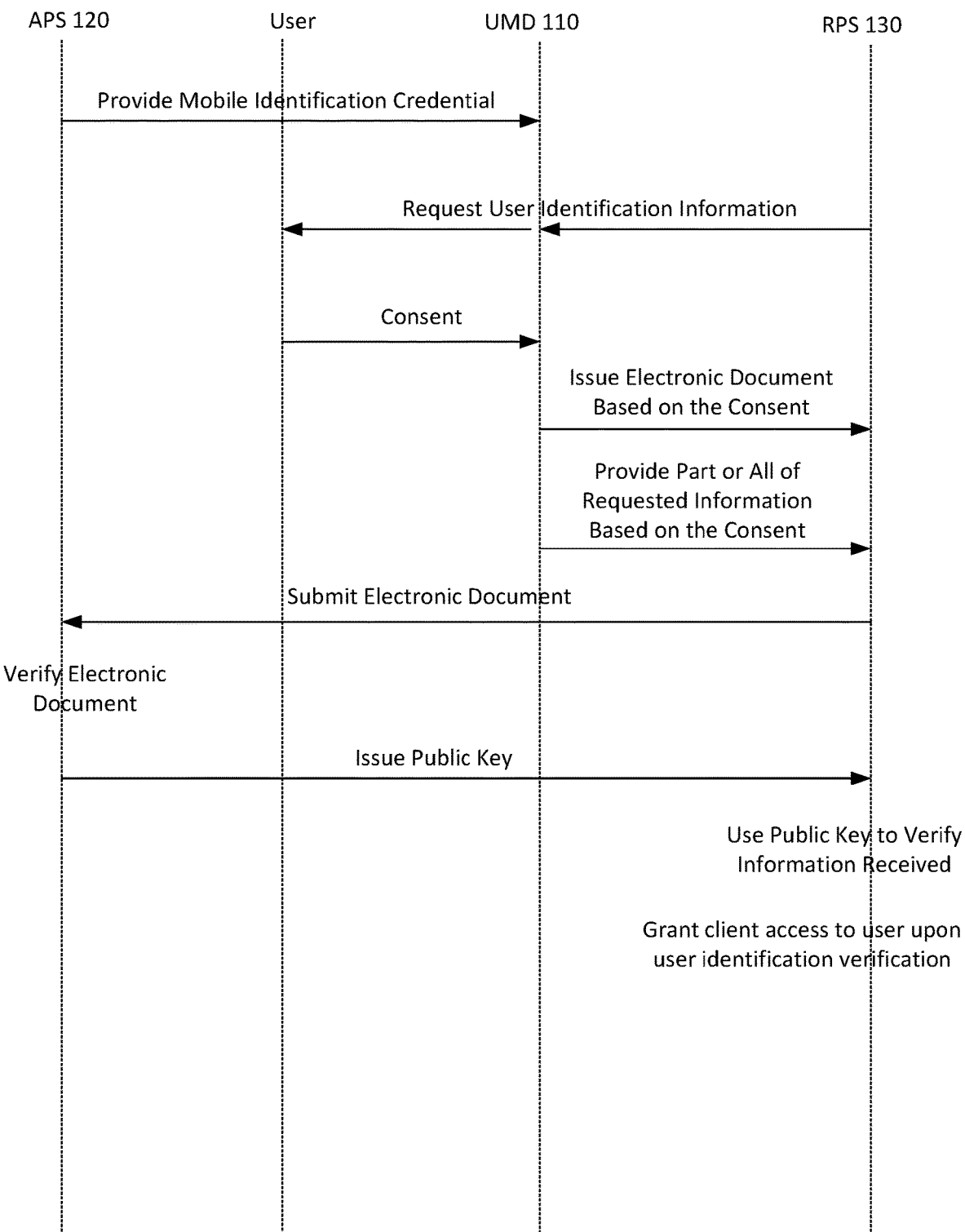
FIG. 6 illustrates verifying information of a client requesting client access using MIC according to another embodiment.

In another embodiment illustrated in FIG. 6, the UMD 110, having received the MIC from the APS 120, receives a request for user ID information from the RPS 130. In response, the UMD 110 may issue an electronic document or a digital file, based on the user's consent, to the RPS 130. In addition, the UMD 110 may provide to the RPS 130 part or all of the requested information, which is associated with the MIC, based on the consent. The RPS 130 may submit the electronic document to the APS 120. Upon verification of the electronic document, the APS 120 may issue a public key to the RPS 130. The RPS 130 may use the public key to verify the information received from the UMD 110. In specific embodiments, the information was encrypted or digitally signed using a private key and the public key is used to decrypt the encrypted information or read the digitally signed information. When the identity of the user is verified, the RPS 130 can provide the requested client access to the client or the UMD 110.

In some instances, the RPS 130 does not have to submit anything to the APS 120 to obtain the public key. In general, the only time the RPS 130 will have to go to the APS 120 is to refresh the public keys. In some cases, there may be a public key distributor (PKD). The distributor would be an agent acting on behalf of several trusted entities. This agent would hold the most up-to-date public keys and distribute to trusted relying parties.

The use of a public key to authenticate a digital signature or the like is merely an example. In other embodiments, the APS 120 may issue another electronic document or digital file or the like (e.g., referred to as an "authentication key") which the RPS 130 can use to verify that the information received from the UMD 110 can be trusted to establish the identity of the user (i.e., to verify the authenticity of the information received). In one example, the authentication key may be a public key that refreshes after a very short time, thereby prompting the RPS 130 to reach out to the APS 120 when it is time to verify the information and use the public key with a short lifespan before it expires.

When the received electronic document is not verified by the APS, the APS 120 may send the RPS 130 a notification to resubmit the request for identification information of the client/user. When the identity of the user is verified to the satisfaction of the relying party, the RPS 130 can grant the client the requested client access which can involve physical transfer, shipping, or digital transfer to the UMD 110.

The above steps may occur with the touchpoint RPS 130 at the reception or security checkpoint 126. Alternatively, part or all of the steps may occur by pre-staging prior to the client's arrival at the reception or security checkpoint. Upon arrival, the Remote-CAT system performs a comparison of the client's biometrics with the pre-staged biometrics. When there is a match indicating user identity verification, the RPS 130 grants the client the client access.

Figure 7:
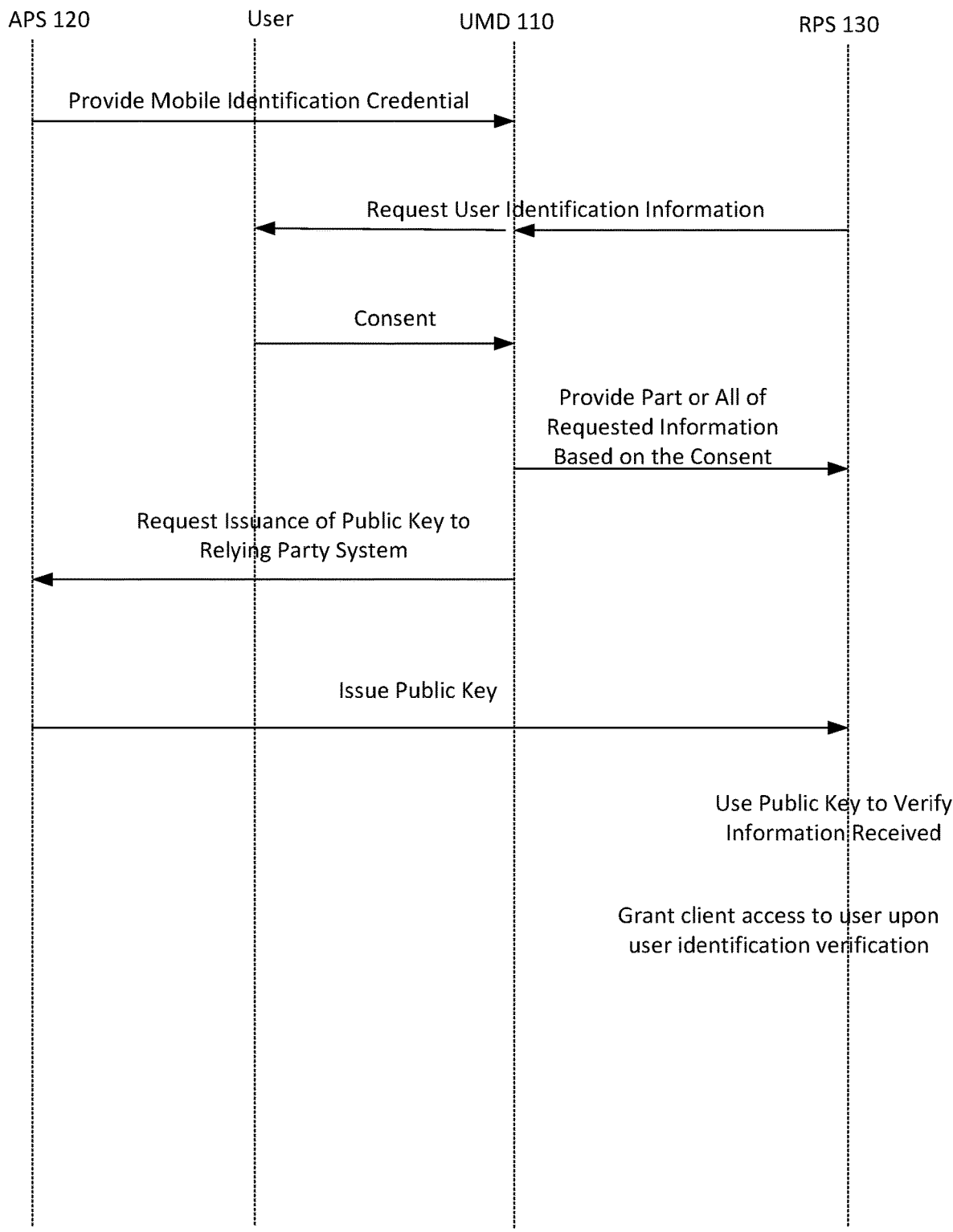
FIG. 7 illustrates verifying information of a client requesting client access using MIC according to another embodiment.

In another embodiment illustrated in FIG. 7, the UMD 110, having received the MIC from the APS 120, receives a request for user ID information from the RPS 130 and provides part or all of the requested information associated with the MIC to the RPS 130 based on the user's consent. The UMD 110 may request that the APS 120 issue a public key to the RPS 130. The APS 120 may issue the public key to the RPS 130, which uses the public key to verify the information received from the UMD 110. Again, the public key is merely an example. It can be replaced with another electronic document or digital file or the like (e.g., "authentication key") which the RPS 130 can use to verify that the information received from the UMD 110 can be trusted to establish the identity of the user. When the identity of the user is verified to the satisfaction of the relying party, the RPS 130 can grant the requested client access to the user; for medical records, this can involve physical transfer, shipping, or digital transfer to the UMD 110.

The above steps may occur with the touchpoint RPS 130 at the reception or security checkpoint 126. Alternatively, part or all of the steps may occur by pre-staging prior to the client's arrival at the reception or security checkpoint. Upon arrival, the Remote-CAT system performs a comparison of the client's biometrics with the pre-staged biometrics. When there is a match indicating user identity verification, the RPS 130 grants the client the requested client access.

Figure 8:
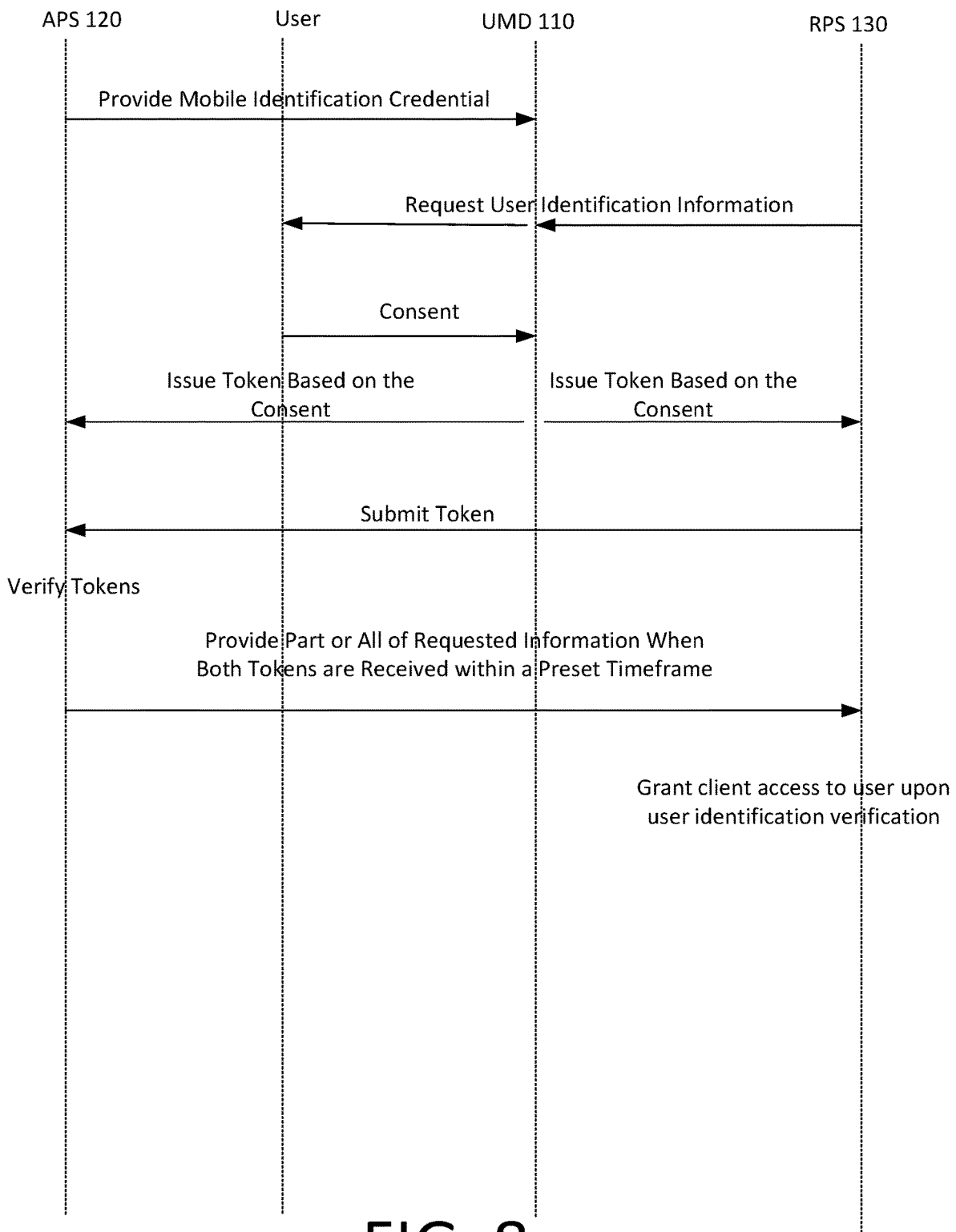
FIG. 8 illustrates verifying information of a client requesting client access using MIC according to another embodiment.

In another embodiment illustrated in FIG. 8, the UMD 110, having received the MIC from the APS 120, receives a request for user ID information from the RPS 130. In response, the UMD 110 may issue, based on the user's consent, a token to the RPS 130 and another token to the APS 120. The RPS 130 may submit the received token to the APS 120. When both tokens are received within a preset timeframe (e.g., within 30 minutes, within 10 minutes, within 3 minutes, within 1 minute, within 30 seconds, etc.) and are matched or otherwise verified by the APS, the APS 120 may provide part or all of the requested information associated with the MIC to the RPS 130. When the tokens are not received by the APS within the preset timeframe or are not verified by the APS, the APS 120 may send a notification to the RPS 130 to resubmit the request for ID information of the user. When the identity of the client is verified to the satisfaction of the relying party, the RPS 130 can grant the client the requested client access.

In an embodiment, when the user requests the item from a remote location or at an unattended kiosk, the system may incorporate a liveness check as described above. The liveness check ensures that the person making the request for client access via the UMD 110 is the proper user of the UMD 110 instead of someone else who has taken control of or gain access to the UMD 110 or instead of a bot.

The above steps may occur with the touchpoint RPS 130 at the reception or security checkpoint 126. Alternatively, part or all of the steps may occur by pre-staging prior to the client's arrival at the reception or security checkpoint. Upon arrival, the Remote-CAT system performs a comparison of the client's biometrics with the pre-staged biometrics. When there is a match indicating user identity verification, the RPS 130 grants the client the requested client access.

Figure 9:
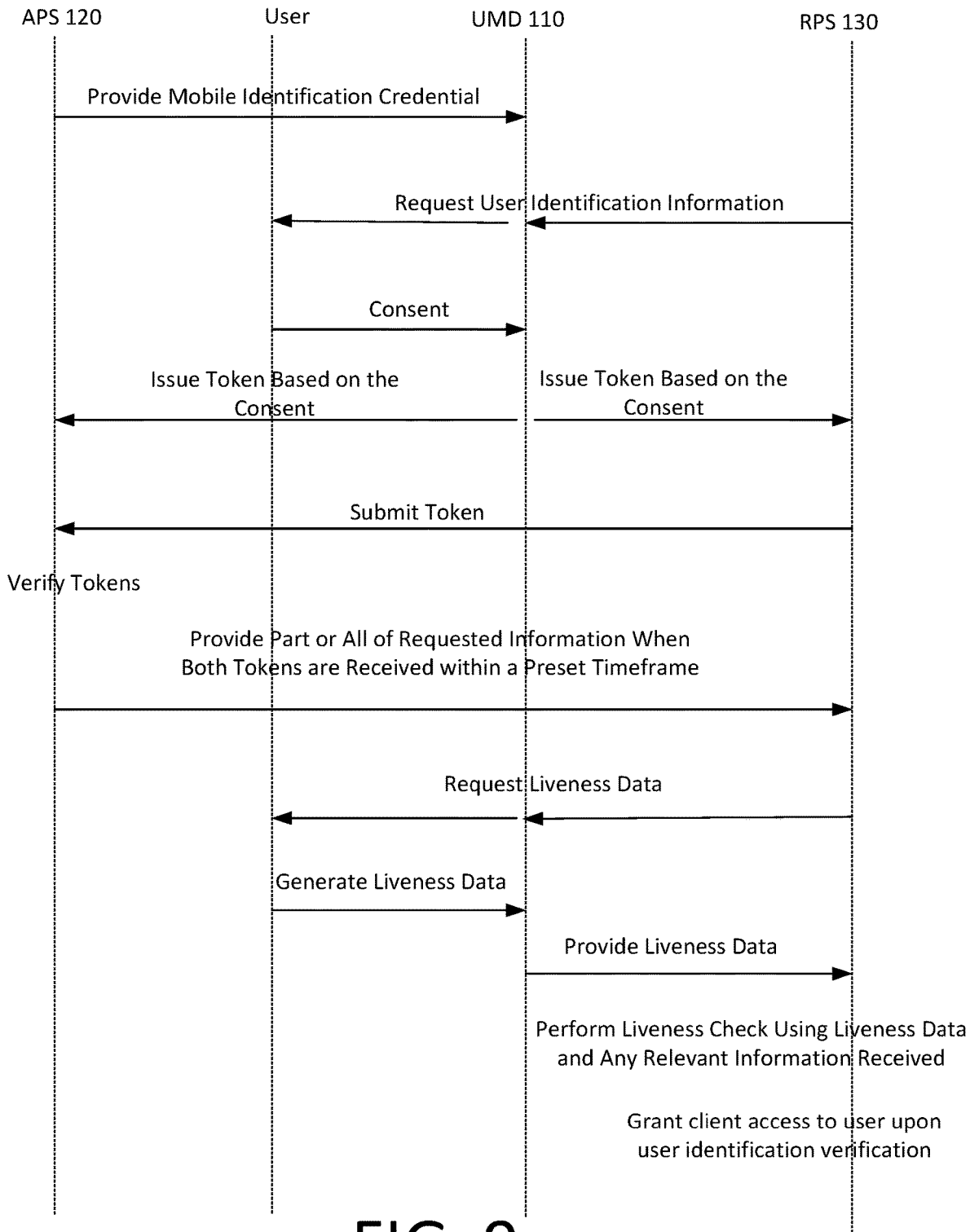
FIG. 9 illustrates performing a liveness check of a client requesting client access according to an embodiment.

In another embodiment illustrated in FIG. 9, which builds upon FIG. 8, the RPS 130 requests liveness data from the UMD 110. The user may generate the liveness data using the UMD 110, which provides the liveness data to the RPS 130. Examples of the liveness data include a live facial image, a live video, a live iris or retina scan, and a live fingerprint scan of the user taken using the UMD 110. While a liveness check that involves biometrics is generally more reliable, it does not require biometrics and can involve taking certain live actions that can be detected and verified. The RPS 130 performs the liveness check using the liveness data and any relevant information received (e.g., comparing the live image or video with a photograph of the user contained in the MIC). While the embodiment illustrated in FIG. 9 shows that the liveness check is performed after the identity verification process, the order can be reversed in other embodiments. The liveness check may occur upon the client's arrival at the reception or security checkpoint 126. The Remote-CAT system performs a comparison of the client's biometrics with the pre-staged biometrics. When there is a match indicating user identity verification, the RPS 130 grants the client the requested client access.

Figure 10:
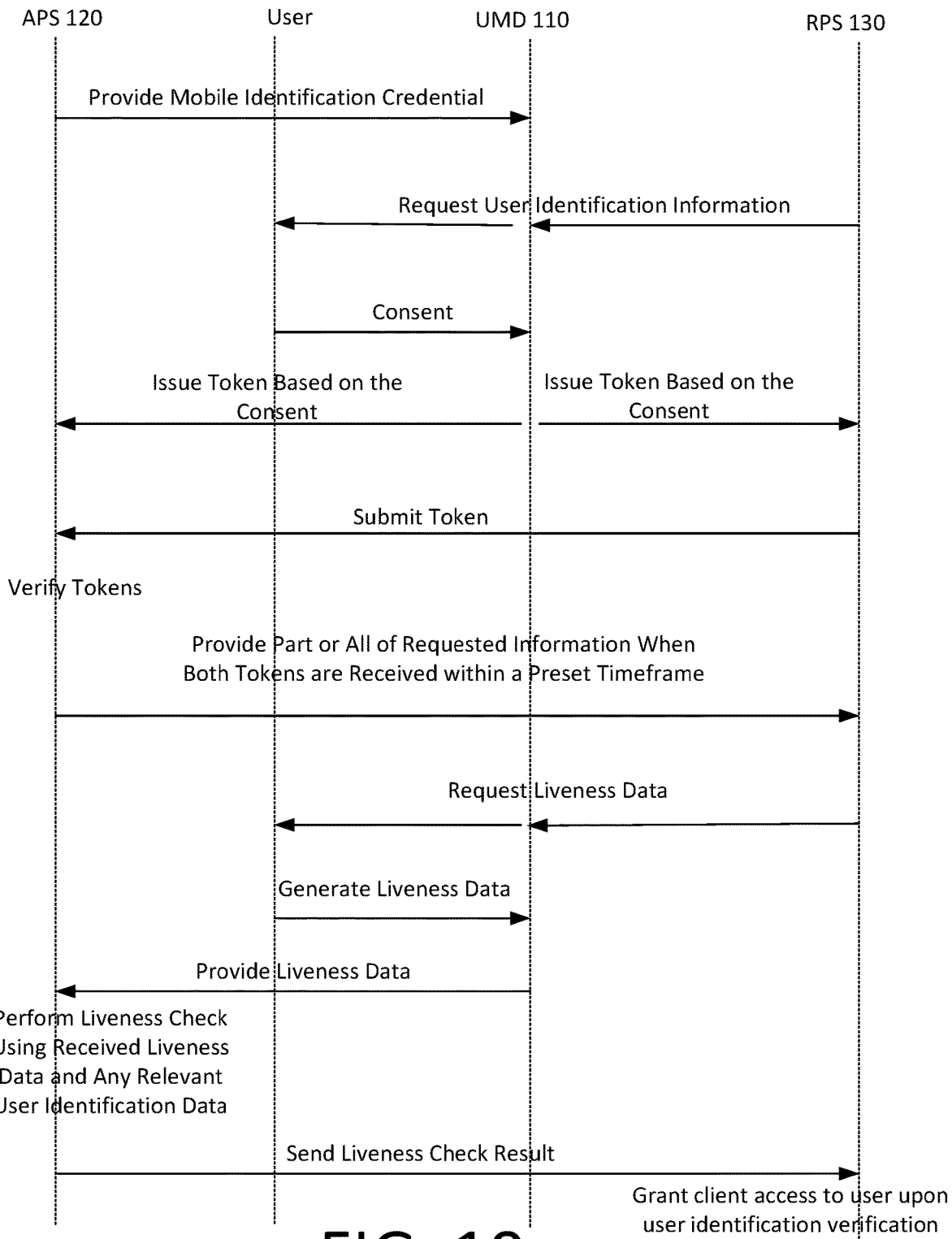
FIG. 10 illustrates performing a liveness check of a client requesting client access according to another embodiment.

In another embodiment illustrated in FIG. 10, which builds upon FIG. 8, the RPS 130 requests liveness data from the UMD 110. The user may generate the liveness data using the UMD 110, but instead of providing the liveness data to the RPS 130 as in FIG. 9, the UMD 110 provides the liveness data to the APS 120. The APS 120 may perform the liveness check using the received liveness data and any relevant user information such as stored user ID data (e.g., contained in the MIC), and sends the liveness check result (valid/matching or invalid/nonmatching) to the RPS 130. The liveness check may occur upon the client's arrival at the reception or security checkpoint 126. The Remote-CAT system performs a comparison of the client's biometrics with the pre-staged biometrics. When there is a match indicating user identity verification, the RPS 130 grants the client the requested client access.

Other embodiments of identity verification are possible. For instance, different features of the processes of FIGS. 5-10 can be combined to create new embodiments.

The embodiments in FIGS. 5-10 show devices that connect to the APS 120, e.g., via the Internet, during the request for client access. The RPS 130 can obtain, directly from the APS 120, the MIC information (FIGS. 5 and 8) or a public key or some other electronic document or digital file to verify the authenticity of the MIC information that the RPS 130 has received (FIGS. 6 and 7). Signer Certificates or the like from a Trust List can be used to validate the Base URLs of the APS 120.

When there is no connection with the APS 120 during the request for client access, local transmission links between the UMD 110 and the RPS 130 can be made through directed action by the UMD 110 such as a tap or showing a QR code to the RPS 130. The connection may then be secured by standardized key exchange and encryption of the transport of data. The RPS 130 can verify that the data received from the UMD 110 is valid and unchanged using Signer Certificates from a Trust List, or the public key of the APS which is available, or the like. The process ensures that the MIC information received by the RPS 130 from the UMD 110 was not cloned from another, different UMD.

Figure 11:
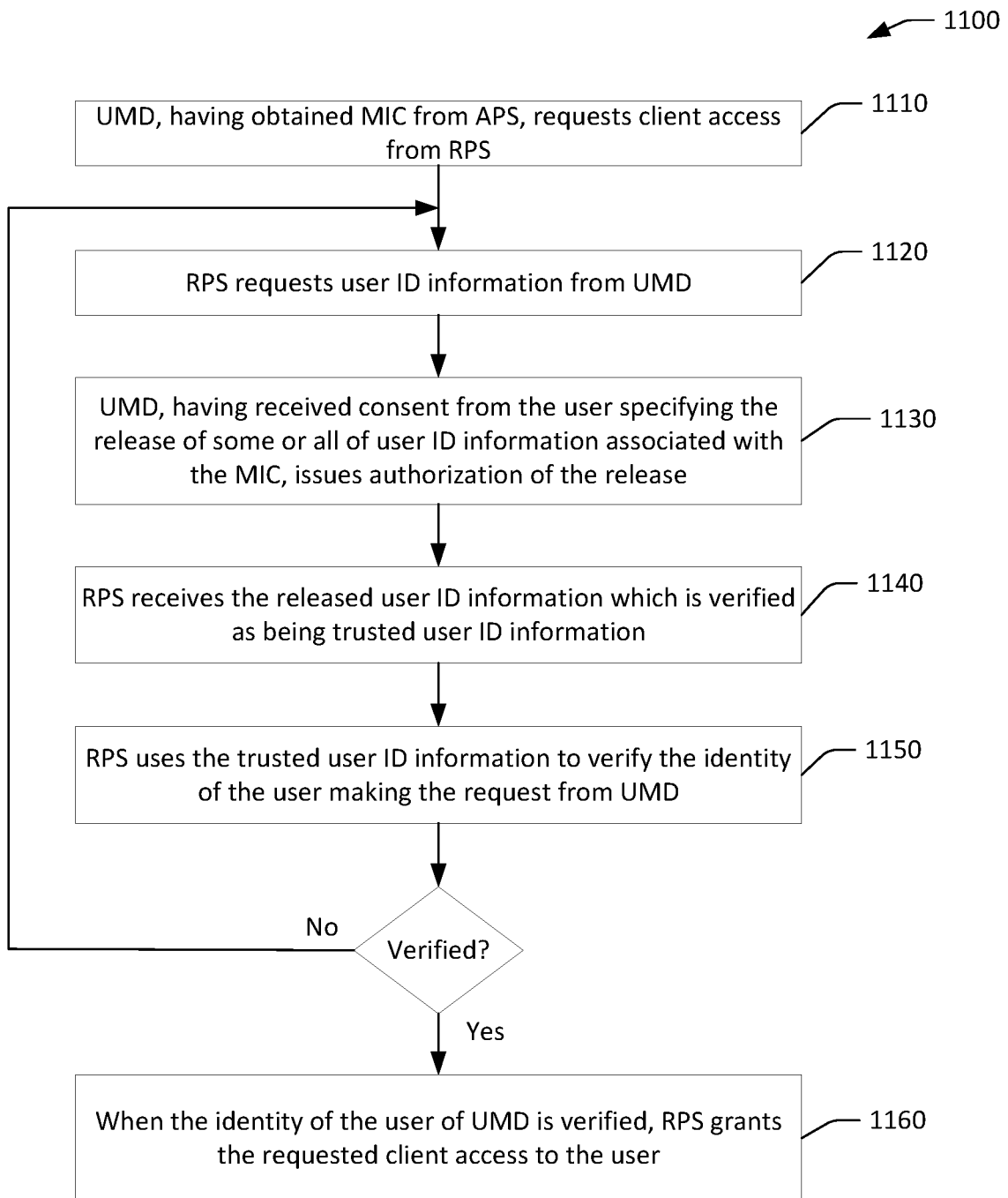
FIG. 11 is a flow diagram illustrating an embodiment of a process for a client to request client access.

FIG. 11 is a flow diagram 1100 illustrating an embodiment of a process for a client to request client access. In step 1110, the UMD (e.g., client's device), having obtained the MIC from the APS (e.g., DMV system), requests client access for the client from the RPS (e.g., medical office) using a secure connection, for instance, via a secure network. The UMD in this example is presented at the medical office or some other device (stationary or mobile) from a remote location. One way to establish a secure connection is by using session keys, as described above.

In step 1120, the RPS requests client/user ID information from the UMD in response to the request for client access. The user may be notified of the request via a display or some other user interface on the UMD, and may give consent via a user interface of the UMD to release some or all of the requested user ID information associated with the MIC. Though some user input is contemplated, in some examples a privacy profile or settings may be used based on pre-entered user preferences. In step 1130, the UMD issues authorization of the release, based on the user's consent, to the RPS or the APS in different embodiments. In some embodiments, the authorization may take the form of a token, an electronic document, a digital file, or the like issued from the UMD to the RPS and then submitted by the RPS to the APS seeking verification of the token, electronic document, digital file, or the like via the secure network. In some other embodiments, the authorization may be a direct request from the RPS to the APS or a token sent from the UMD to the APS to be matched with another token sent from the RPS to the APS.

In step 1140, the RPS receives the released user ID information which is verified as being trusted user ID information. In different embodiments, the APS may receive the authorization from the UMD (e.g., direct request in FIG. 7 or token in FIG. 8) or may examine the authorization from the RPS (e.g., electronic documents in FIGS. 5 and 6 or token in FIG. 8) for verification or nonverification. When the authorization is verified, it establishes that the user ID information received by the RPS is valid and can be trusted. In some embodiments, the RPS may receive and use a public key or some other electronic document or digital file to verify that the user ID information received from the UMD is trustworthy.

Next, the RPS uses the trusted user ID information, which may be received from the UMD or the APS, to verify the identity of the user who requests the client access using the UMD in step 1150. In some cases, the verification involves matching the user's name. In other cases, more may be required to satisfy the RPS. For instance, the verification may involve matching other biographic and/or biometric information and/or additional information. What is required may depend on the nature of the client access transaction. For an in-person request for medical access, any biographic or biometric information can be obtained live from the person at the RPS using biometric devices or readers (e.g., fingerprint matching or recognition by a fingerprint reader, iris or retina matching or recognition by iris or retina scanner, facial matching or recognition by a facial imaging device, voice matching or recognition by a voice recording device, etc.). For online request for medical record or similar medical access, such information can be obtained from a trusted source and/or a liveness check can be required to obtain the biometric information. If the identity of the user is not verified, the RPS may request resubmission of the user ID information from the UMD.

Some or all of steps 1110 to 1150 may occur during the identity verification pre-staging 184 of FIG. 1C. In step 1160, when the identity of the user from the UMD is verified to the satisfaction of the RPS, the RPS provides the requested client access to the UMD. For an in-person request for medical record, a physical medical record is given to the user. Alternatively, it may be transmitted or downloaded to the UMD.

Figure 12:
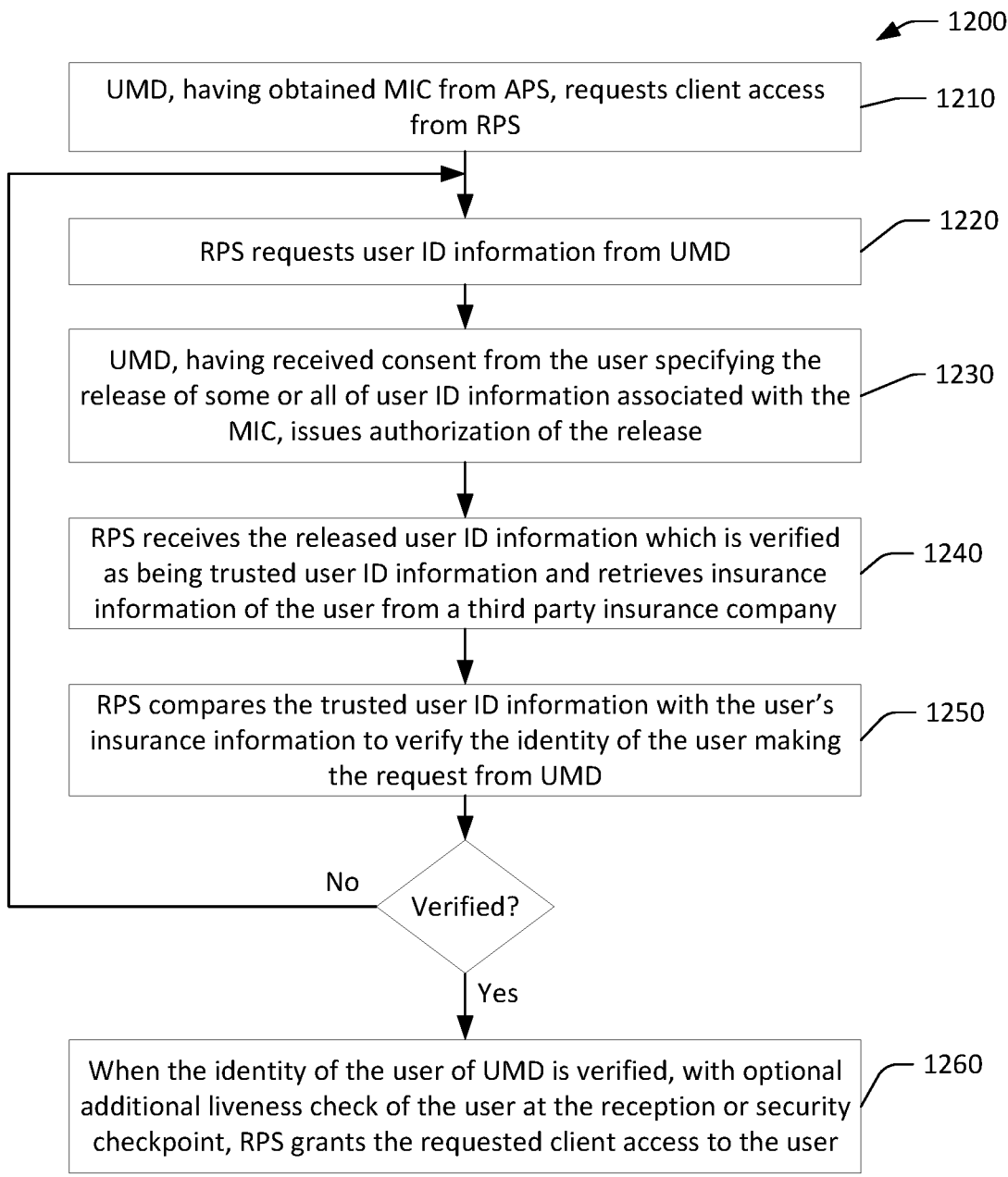
FIG. 12 is a flow diagram illustrating another embodiment of a process for a client to request client access.

FIG. 12 is a flow diagram 1200 illustrating another embodiment of a process for a client to request client access. Steps 1210 to 1230 are similar to steps 1110 to 1130. In step 1240, in addition to receiving the released user ID information which is verified as being trusted user ID information, the RPS also retrieves user information of the user from a third party, such as insurance information of the user from an insurance company. When the authorization is verified by comparing the trusted user ID information with the user's insurance information and finding a match, it establishes that the user ID information received by the RPS is valid and can be trusted. The RPS uses the trusted user ID information, which may be received from the UMD or the APS, to verify the identity of the user who requests the client access using the UMD in step 1250. In some cases, the verification involves matching the user's name. In other cases, more may be required to satisfy the RPS. For instance, the verification may involve matching other biographic and/or biometric information and/or additional information.

Some or all of steps 1210 to 1250 may occur during the identity verification pre-staging 184 of FIG. 1C. In step 1260, when the identity of the user from the UMD is verified to the satisfaction of the RPS, the RPS provides the requested client access to the UMD. An optional additional liveness check of the user at the reception or security checkpoint 126 may be performed for identity verification of the user before the RPS 130 grants the requested client access to the user 102.

In specific embodiments, the medical record obtained by the patient may be stored on a computer-readable storage medium such as a medical information card (or bracelet, chain, sleeve, etc.) or on a third-party storage medium such as a service provider storage. In emergency situations, medical personnel such as first responders can obtain the medical information of the patient quickly and reliably by reading the information from the medical information card carried by the patient or by accessing the information stored by the service provider. See, e.g., U.S. Patent Application Publication 2018/0166160, paragraphs [0024] to [0031] and FIGS. 1-8, the disclosure of which is incorporated herein by reference. The medical information can be securely accessed by medical personnel via advance authorization from the patient using an access code, key, or the like.

Figure 13:
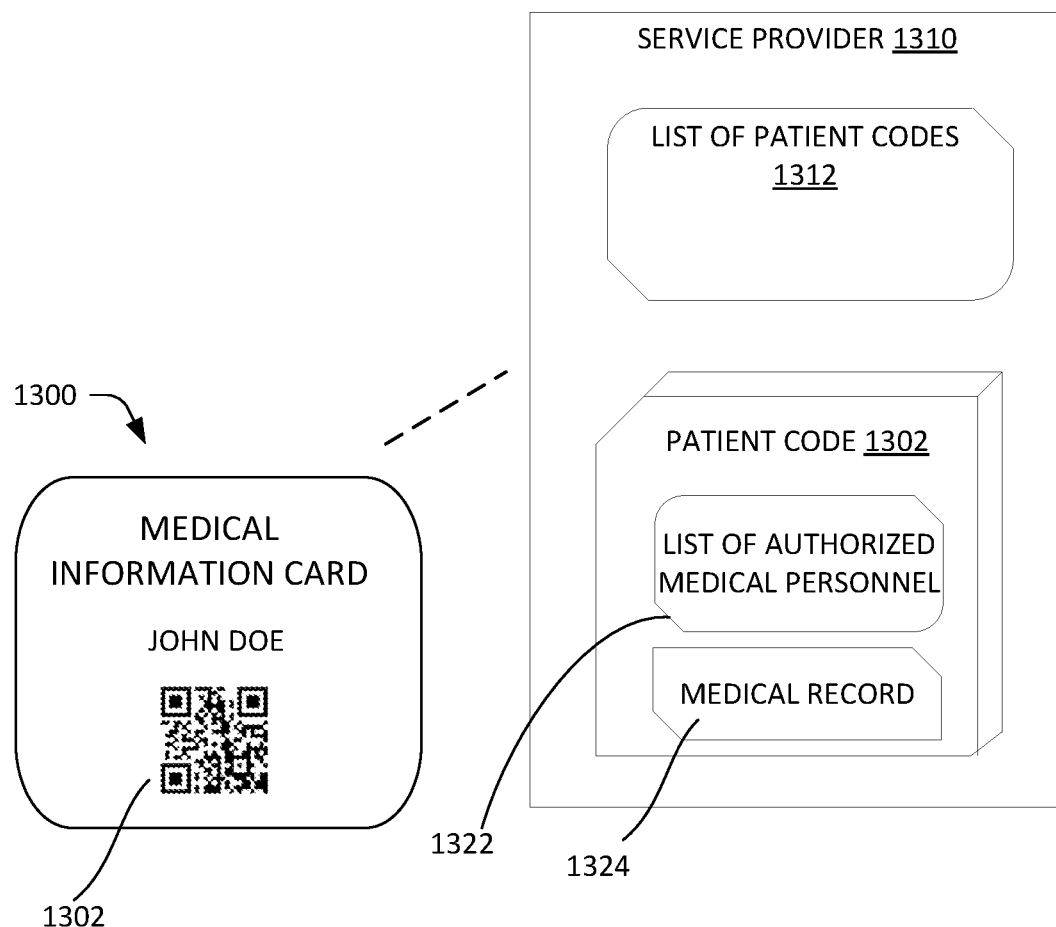
FIG. 13 shows an example of a medical information card and a service provider.

Alternatively, the medical information card may include a bar code or a QR code which uniquely identifies the patient. FIG. 13 shows an example of a medical information card 1300 having a unique patient code 1302. Also shown is a service provider 1310 storing a list of patient codes 1312 and, for each patient code, a list of authorized medical personnel 1322 and a medical record 1324.

Figure 14:
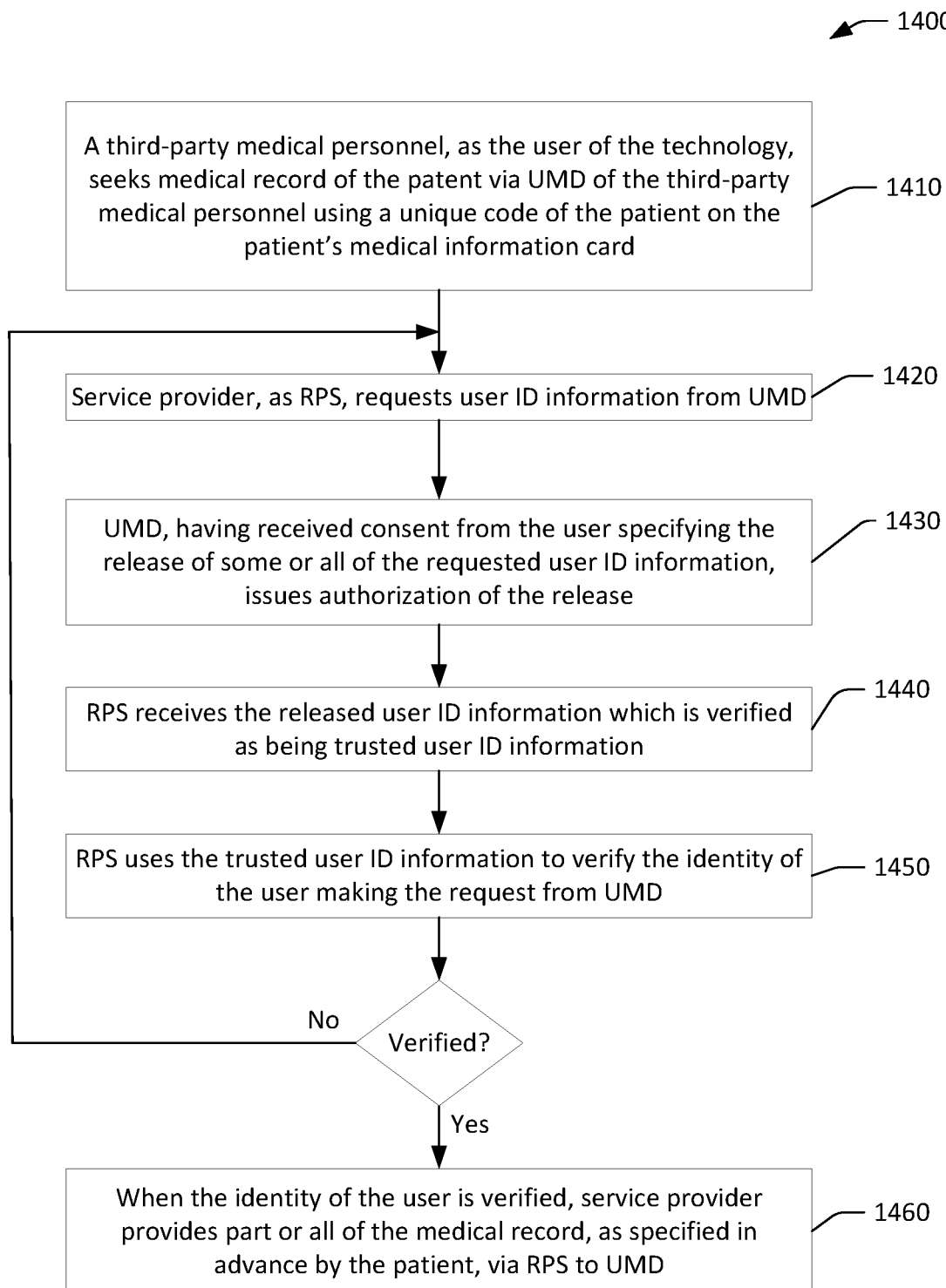
FIG. 14 is a flow diagram illustrating an embodiment of a process for medical personnel to request a patient's medical record stored by a service provider.

FIG. 14 is a flow diagram illustrating an embodiment of a process 1400 for medical personnel to request the patient's medical record stored by a service provider 1310. The medical personnel are referred to as third-party medical personnel that need not be affiliated with the medical office from which the patient obtained the medical record. A good example would be first responders. The patient can store his or her entire medical record or selectively store portions of the medical record with the service provider.

In step 1410, the third-party medical personnel may use a UMD to interact with the APS and the RPS (the service provider's system, also referred to as service provider system, service provider device, or service provider computer) and seek the medical record of the patient using the unique patient code obtained from the patient's medical information card 1300. The RPS compares the patient code 1302 received from the UMD against a list of patient codes 1312 corresponding to patients that have medical records 1324 stored at the service provider's system RPS. The process proceeds when there is a match; when there is not a match, the UMD may be notified and asked to obtain the proper patient code to proceed any further. In step 1420, the RPS requests the user ID information from the UMD. In step 1430, the UMD, having received consent from the medical personnel specifying the release of some or all of the requested user ID information, issues authorization of the release. In step 1440, the RPS receives the released user ID information which is verified as being trusted user ID information. When the authorization is verified, it establishes that the user ID information received by the RPS is valid and can be trusted. Next, the RPS uses the trusted user ID information, which may be received from the UMD or the APS, to verify the identity of the user making the request for the medical record using the UMD in step 1450. In some cases, the patient may provide in advance a list of authorized medical personnel 1322 that are authorized to access the patient's medical record stored by the service provider. The list can include specific names of individuals and medical organizations as well as general categories such as first responders. If the identity of the user is not verified, the RPS may request resubmission of the user ID information from the UMD.

Some or all of steps 1410 to 1450 may occur during the identity verification pre-staging 184 of FIG. 1C. In step 1460, when the identity of the user from the UMD is verified to the satisfaction of the RPS, the RPS may provide the entire medical record or a selectively part of the medical record to the UMD. Again, the patient can specify in advance which medical personnel have access to which portion(s) of the medical record.

In one example, the medical personnel in the scenario of FIGS. 13 and 14 may be first responders that perform initial examination of the patient and transport the patient to a hospital to seek medical service. If the patient is unconscious or otherwise unable to communicate effectively and there is nobody with power of attorney, the first responders may use a UMD to act on behalf of the patient and follow the steps of FIG. 11 or FIG. 12 to pre-stage the patient's identity verification, to verify the patient's identity at the reception or security checkpoint at the hospital for the patient to gain medical access, and optionally to provide the medical records and/or insurance information of the patient to the hospital.

Figure 15:
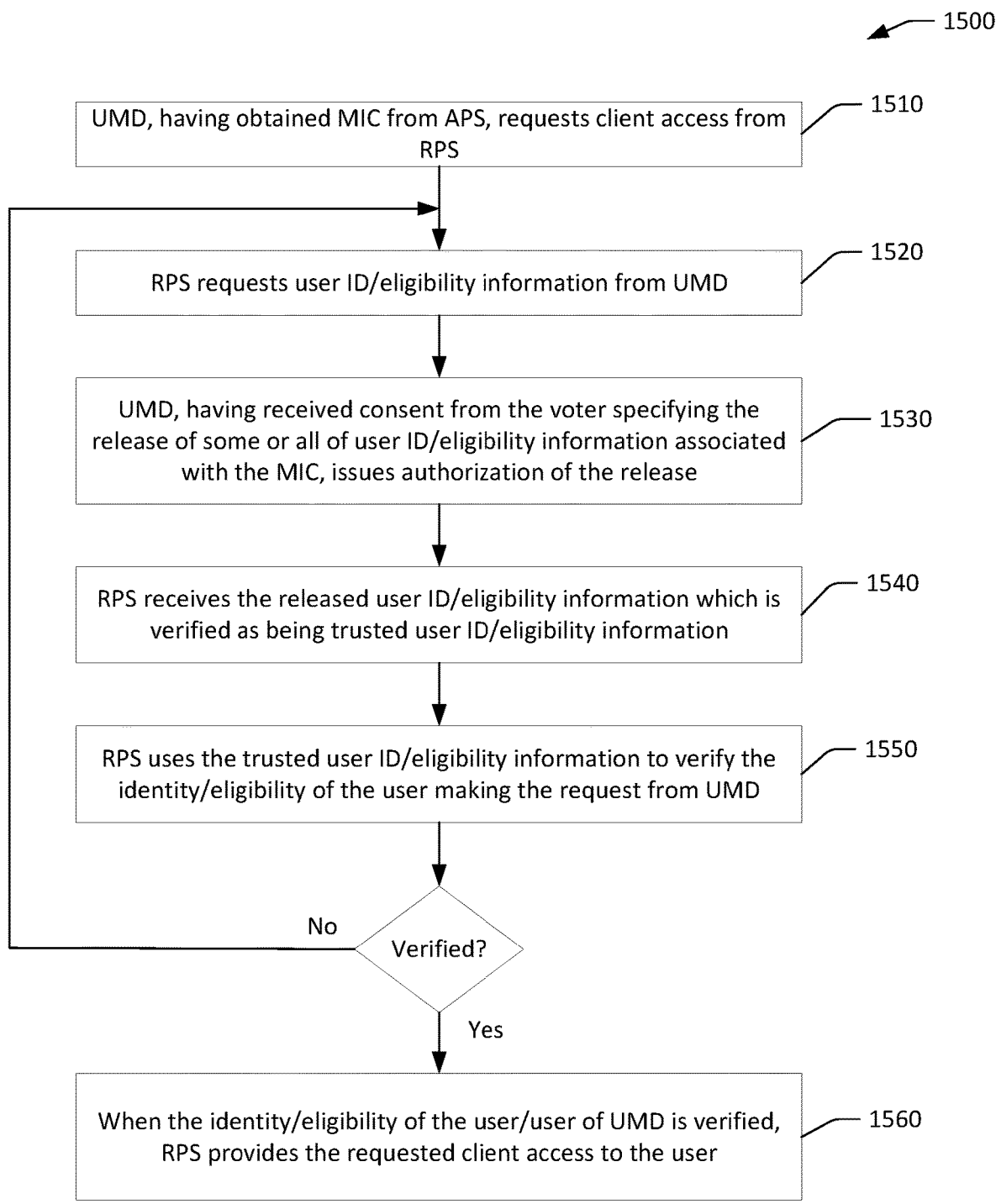
FIG. 15 is a flow diagram illustrating another embodiment of a process for a client to request client access with client eligibility requirement.

FIG. 15 is a flow diagram 1500 illustrating another embodiment of a process for a client to request client access with client eligibility requirement. Steps 1510 to 1560 are similar to steps 1110 to 1160, with the user ID information replaced by user ID/eligibility information and the identity verification replaced by user identity and eligibility verification. Medical eligibility or health services eligibility may encompass various criteria for receiving specific medical services or free healthcare services. Eligibility may depend on age, gender, residency, domicile, citizenship, income limit, medical history, medical condition, or the like.

Figure 16:
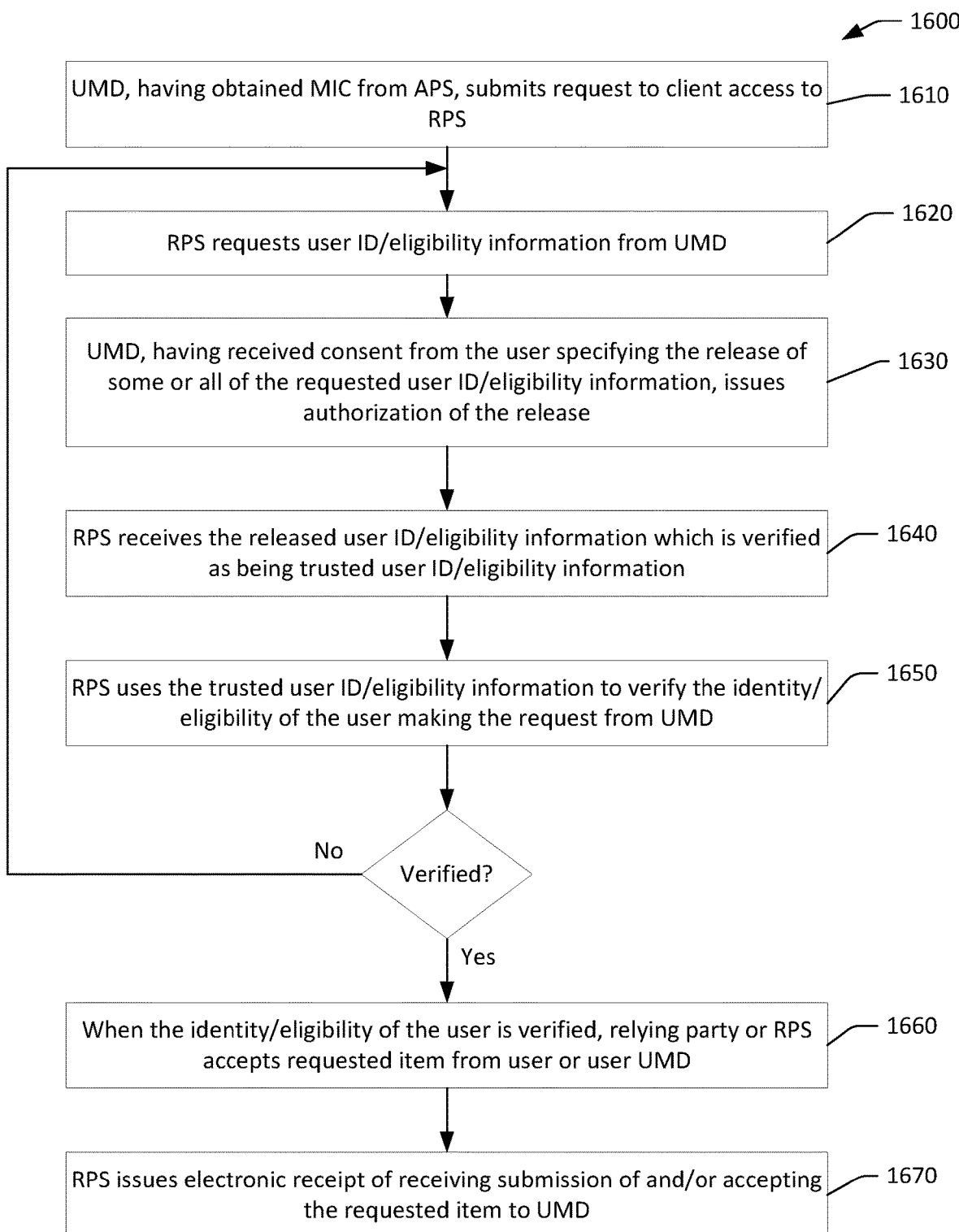
FIG. 16 is a flow diagram illustrating another embodiment of a process for a client to request client access with client eligibility requirement.

FIG. 16 is a flow diagram 1600 illustrating another embodiment of a process for a client to request client access with client eligibility requirement. Steps 1610 to 1650 are similar to steps 1510 to 1550. In step 1660, the relying party (e.g., medical office) or RPS accepts a medical item from the user or user UMD when the identity/eligibility of the user is verified. The eligibility component may be omitted in a different embodiment. Examples of the medical item include a test specimen such as the user's bodily fluids, the user's personal information, and other medical data or medical history information. In step 1670, the RPS 130 issues an electronic receipt of receiving submission of and/or accepting the medical item to the UMD 110.

Figure 17:
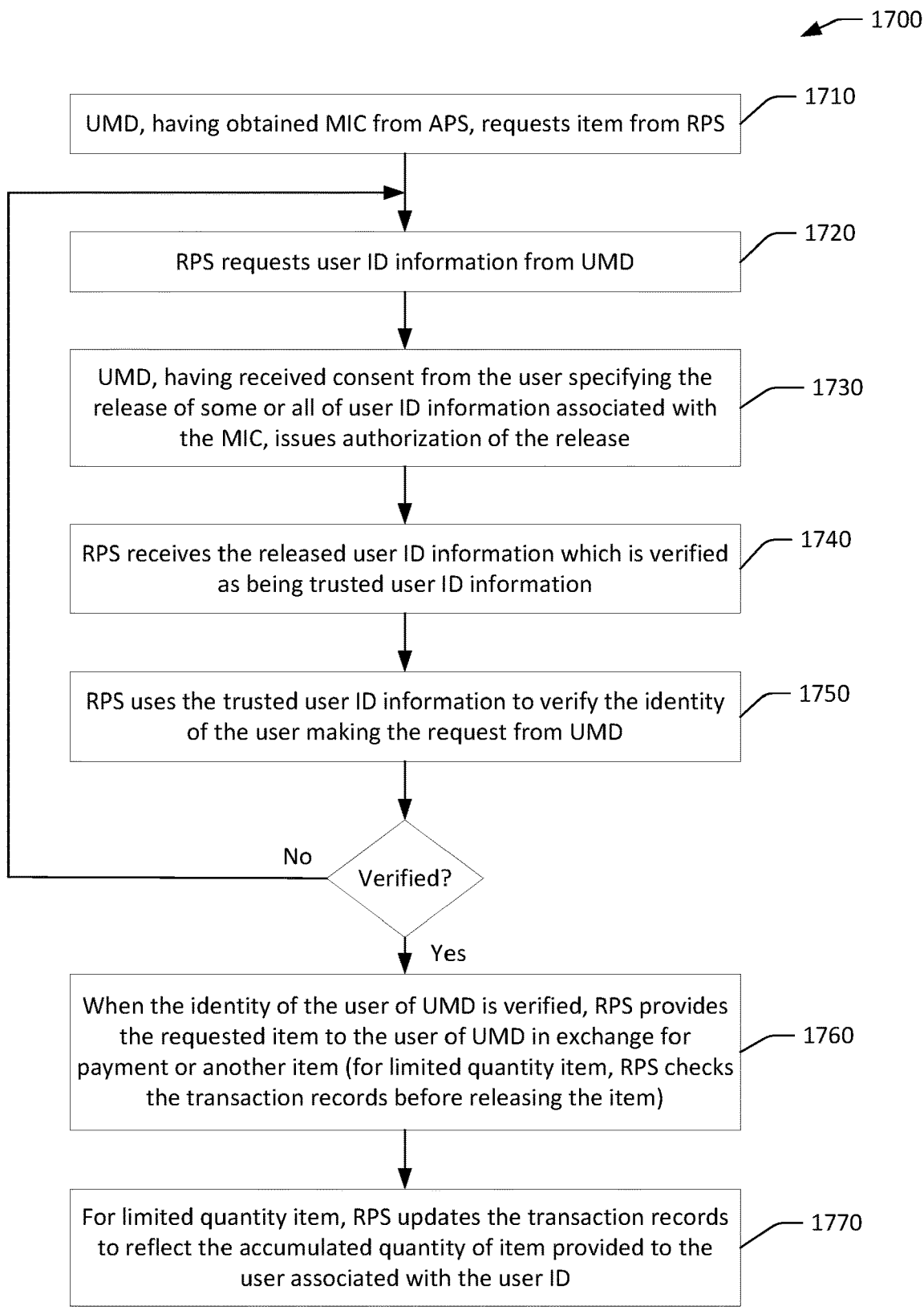
FIG. 17 is a flow diagram illustrating another embodiment of a process for a client to request an item such as medicine or medical device.

FIG. 17 is a flow diagram 1700 illustrating another embodiment of a process for a client to request an item such as medicine or medical device. Steps 1710 to 1750 are similar to steps 1110 to 1150. In step 1760, when the request from the UMD is verified to the satisfaction of the RPS, the RPS provides the requested item to the UMD in exchange for payment or for another item that the user has agreed to provide to the RPS. For a limited quantity item such as drugs including potentially addictive pain medication, however, the RPS further checks the transaction records before releasing the item so as not to exceed the quantity limit. In step 1770, for a limited quantity item, the RPS updates the transaction records to reflect the accumulated quantity of the item associated with the user ID from the latest transaction.

In general, the transaction illustrated in FIG. 17 involves a first party (patient/client) using a first party system (client UMD) and a second party (medical office) using a second party system (medical office RPS) whereby the first party agrees to transfer a first item to the second party and the second party agrees to transfer a second item to the first party. For the transfer of the second item from the second party to the first party, the first party system plays the role of the UMD and the second party system plays the role of the RPS in FIG. 17. For the transfer of the first item from the first party to the second party, the second party system plays the role of the UMD and the first party system plays the role of the RPS in FIG. 17. In a simpler embodiment, an item being transferred is cash or cash-equivalent and the transfer does not require proof of identity and the process described in FIG. 17 does not apply. If the item being transferred is a non-cash payment, the process of FIG. 17 applies if proof of identity is required; otherwise, existing payment processes can be used instead.

Figure 18:
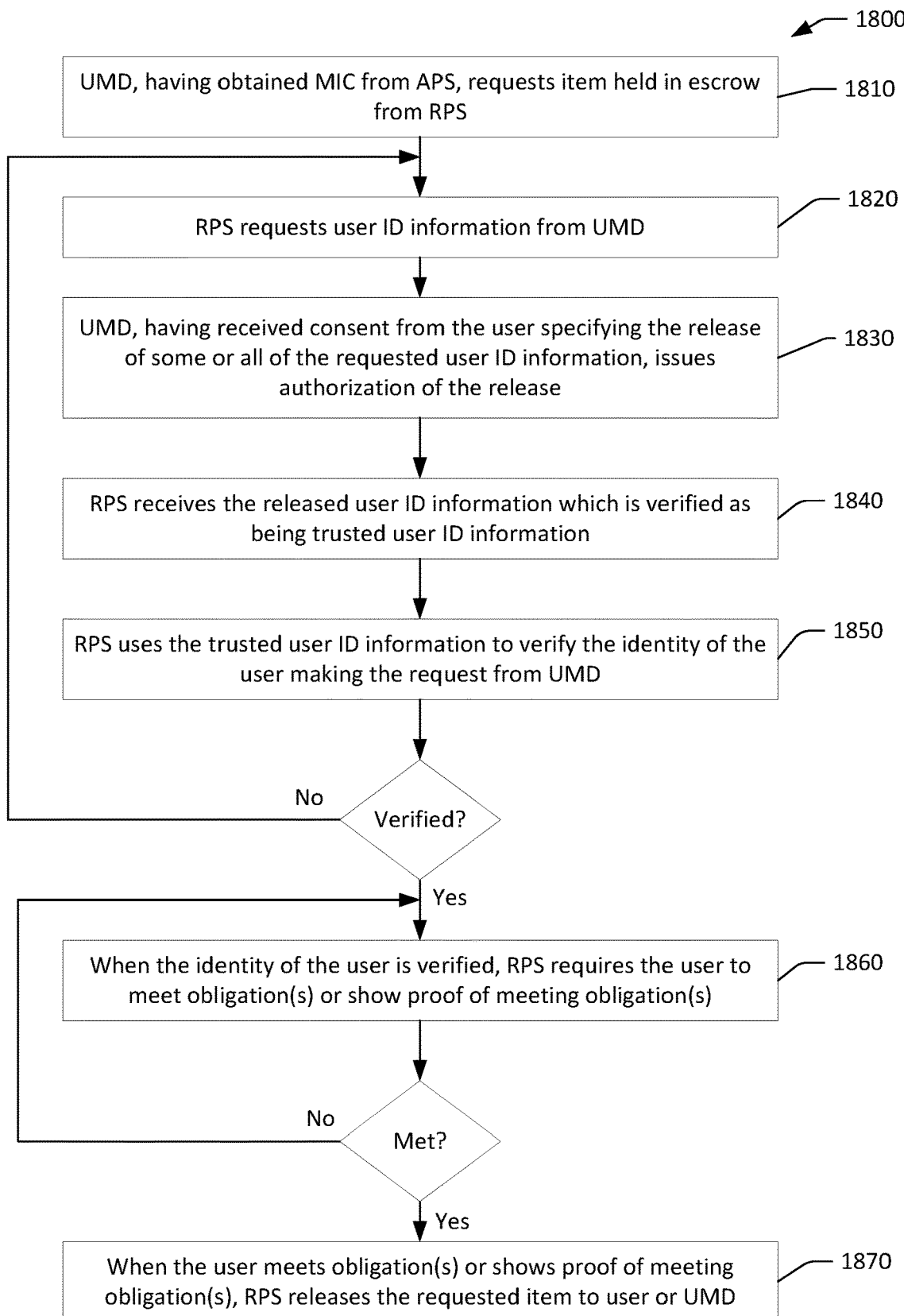
FIG. 18 is a flow diagram illustrating an embodiment of a process for client access in an escrow scenario.

FIG. 18 is a flow diagram 1800 illustrating an embodiment of a process for client access in an escrow scenario. In step 1810, a party involved in escrow (user via UMD) seeks release of an item or a service held in escrow from the RPS (escrow provider's system). In step 1820, the RPS requests user ID information from the UMD in response to the request for the item or service. The user may be notified of the request via a display or some other user interface on the UMD and may give consent to release some or all of the requested user ID information associated with the MIC via a user interface of the UMD. In step 1830, the UMD may issue authorization of the release, based on the user's consent, to the RPS or the APS in different embodiments.

In step 1840, the RPS receives the released user ID information which is verified as being trusted user ID information. When the authorization is verified, it establishes that the user ID information received by the RPS is valid and can be trusted. Next, the RPS uses the trusted user ID information, which may be received from the UMD or the APS, to verify the request for the item from the UMD in step 1850. In some cases, the verification involves matching the user's name and age. In other cases, more may be required to satisfy the RPS.

In step 1860, when the request from the UMD is verified to the satisfaction of the RPS, the RPS requires the user, via the escrow provider system (escrow RPS), to meet the obligation(s) specified in the escrow agreement before releasing the requested item. This may be done when an escrow provider system receives from the UMD part or all of the user's user escrow fulfillment information associated with an escrow MIC which the UMD received from an escrow APS, which is the first MIC issued by the first APS or another MIC issued by another APS, and the user has consented to release the part or all of the user escrow fulfillment information to the escrow provider system, and the part or all of first party escrow fulfillment information has been verified. This escrow scenario for verifying escrow fulfillment is analogous to the scenario described above in connection with FIGS. 1-10, in which the escrow provider system plays the role of the RPS and the escrow APS plays the role of the APS. Instead of or in additional to verifying the identity of the user of the UMD, the escrow provider system as the RPS requires the user to provide verified escrow fulfillment information showing that the user has met the escrow obligation(s) required in order to release the item requested by the user via the UMD.

If the escrow obligation(s) is/are not met, the RPS or the escrow provider system requires the user to meet the obligation(s) by notification via the UMD. In step 1870, when the user meets the escrow obligation(s), for instance, by placing another item in escrow or shows proof of meeting the obligation(s), the RPS releases the requested item or service held in escrow to the user (by physical transfer or shipment of item held in escrow or by performing the service at the medical office) or the UMD (by digital transfer or download of digital content or other information 134 held in escrow). Examples of items held in escrow or to be placed in escrow include money (physical or digital), legal documents such as titles, financial instruments, digital content, and other items of value.

The escrow provider system may be the medical office or hospital system and the other party to the escrow may be a third party medical officer or a medical service or medical product provider that releases the item or service held in escrow when the user satisfies his/her escrow obligation.

Figure 19:
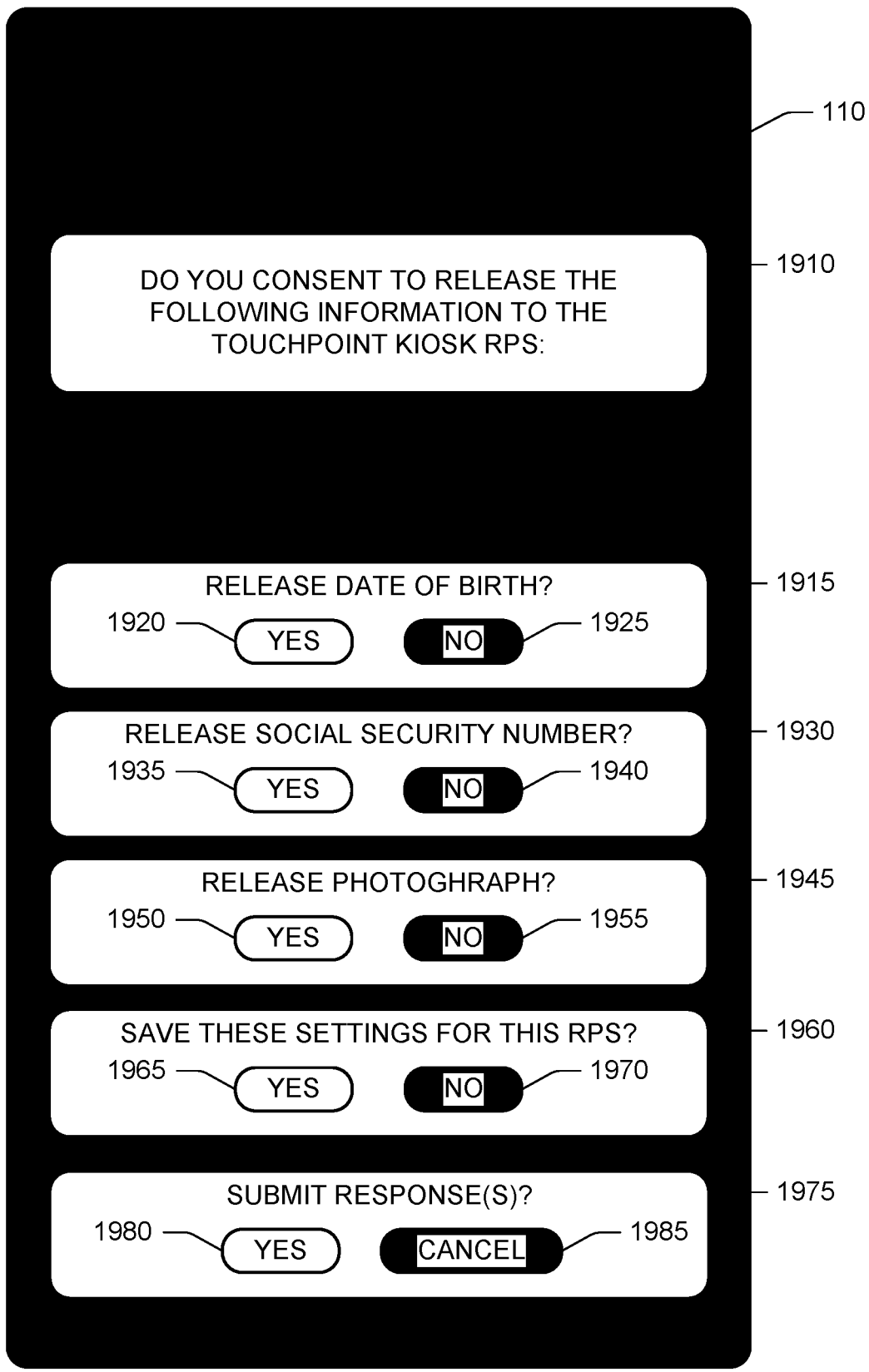
FIG. 19 illustrates a privacy dialog according to an embodiment.

FIG. 19 illustrates a privacy dialog 1900 according to an embodiment. The privacy dialog 1900 enables interaction between a user and the UMD 110, enabling the user to grant selective consent to release of MIC user information. In embodiments, the UMD 110 provides the privacy dialog 1900 via APS/RPS consent logic running on the UMD 110.

The privacy dialog 1900 includes an information prompt 1910, individual release prompts 1915, 1930, 1945, a save prompt 1960, and a submit prompt 1975. The various prompts enable the user to easily view which specific MIC information is requested by the RPS, and selectively grant consent to those prompts to which the user agrees, while selectively denying consent to those prompts to which the user disagrees. The release prompts include YES/NO radio buttons, which are illustrated in a default selection of NO to encourage a security-centric option that protects the user's MIC information from release by default. If the user agrees to release a given piece of MIC user information, the user selects the YES button in the release prompt corresponding to that MIC information. If the user prefers to save the settings for this interaction with this RPS, the user selects YES for the save prompt 1960. In another embodiment, the user is given the option whether to save the setting for individual prompts. In yet another embodiment, the user is initially given the option to establish default settings, such as whether to save the ability to always consent to requests from security checkpoint kiosk RPSs, always consent to government requests, and so on.

The multiple different prompts provide a readily appreciated interface for the user to easily understand exactly which types of MIC user information the RPS is requesting be released by the UMD 110. Furthermore, the ability to selectively provide or withhold consent to different types of requests provides the user with a sense of control and feeling of safety, that only the particular, displayed, agreed-upon portion of the user's MIC information will be released.

When the various YES/NO radio buttons are configured to the user's satisfaction, the user interacts with the submit prompt 1975 to indicate that the user is ready to release the indicated selective MIC information. As illustrated, the user presses a YES button 1980 to submit the user's selective consent as indicated in the release prompts 1915, 1930, 1945, and whether to save the settings as indicated in the save prompt 1960. As set forth above, the UMD 110 then releases the user consent response (e.g., as a token) and/or the actual MIC user information stored on the UMD 110 (e.g., in an offline embodiment). If the user does not agree to submit responses, the user presses the cancel button 1985.

Figure 20:
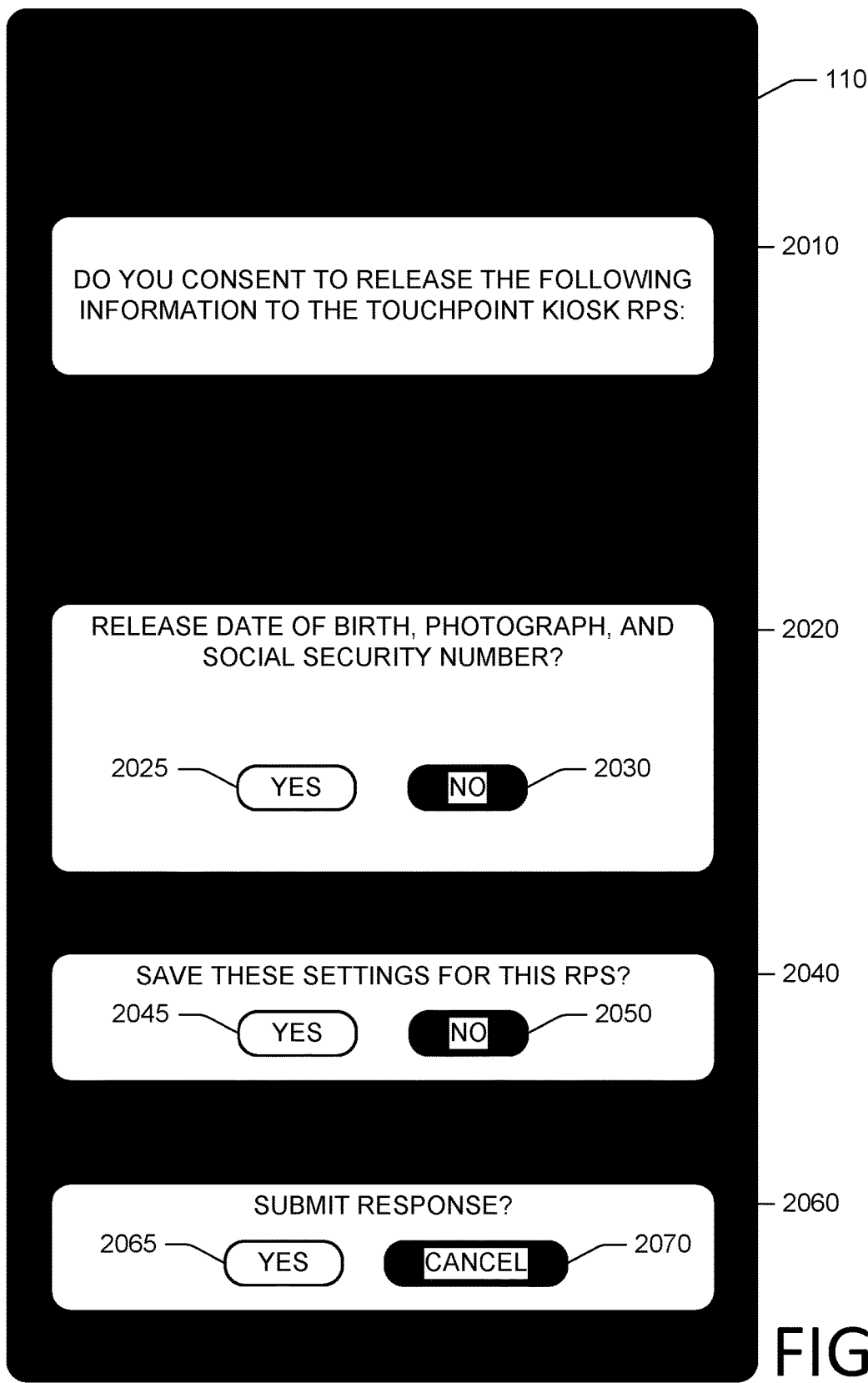
FIG. 20 illustrates a privacy dialog according to an embodiment.

FIG. 20 illustrates a privacy dialog 2000 according to an embodiment. The privacy dialog 2000 enables interaction between a user and the UMD 110, enabling the user to grant selective consent to release MIC user information. In embodiments, the UMD 110 provides the privacy dialog 2000 via APS/RPS consent logic running on the UMD 110.

The privacy dialog 2000 includes an information prompt 2010, a combination release prompt 2020, a save prompt 2040, and a submit prompt 2060. The combination release prompt 2020 enables the user to easily view which specific MIC information is requested by the RPS. Furthermore, in the illustrated embodiment, the combination release prompt 2020 serves as an indication to the user that this particular RPS requests an "all or nothing" approach to obtaining consent. In particular, the RPS is a security checkpoint kiosk that does not allow the user to proceed unless all three types of requested MIC user information are authorized/vetted. Accordingly, the combination release prompt 2020 seeks consent to release all three types of MIC user information. Such presentation saves time for the user by needing only a single consent selection, while also communicating the nature of the RPS request being of an "all or nothing" type. The combination release prompt 2020 includes a YES/NO radio button, which is illustrated in a default selection of NO to encourage a security-centric option that protects the user's MIC information from release by default. If the user agrees to release the combination of MIC information, the user selects the YES button 2025 in the combination release prompt 2020.

If the user prefers to save the settings for this interaction with this RPS, the user selects YES 2045 for the save prompt 2040. In another embodiment, the user is given the option whether to save the setting for individual prompts. In yet another embodiment, the user is initially given the option to establish default settings, such as whether to save the ability to always consent to requests from security checkpoint kiosk RPSs, always consent to government requests, and so on.

The user interacts with the submit prompt 2060 to indicate that the user is ready to release MIC user information. As illustrated, the user presses a YES button 2065 to submit the user's combination consent as indicated in the combination release prompt 2020. If the user does not agree to submit, the user presses the cancel button 2070.

Conclusion

The inventive concepts taught by way of the examples discussed above are amenable to modification, rearrangement, and embodiment in several ways. For example, the concepts are applicable beyond the example of medical or health-related records; other, regulated situations that involve providing data or information to a user or involve accepting the same from a user are included. Examples include treatment record, driving record, training record, educational record, employment record, personnel record, travel record, membership record, tax record, bankruptcy record, court record, real estate record, business record, service record, credit history record, bank record, any type of private or public activity record, and the like. All these are within the scope of the present disclosure. In terms of providers, the concepts are applicable beyond medical providers to include, for example, sports arenas, concert venues, casinos, parking establishments, retail stores, merchant and personal transactions, hotels and other lodging providers, restaurants, voting precincts and polling places, government buildings, and the like which can benefit from access control or crowd control and management of client access, flow, and queuing as well as access control and management of client data and information.

Figure 21:
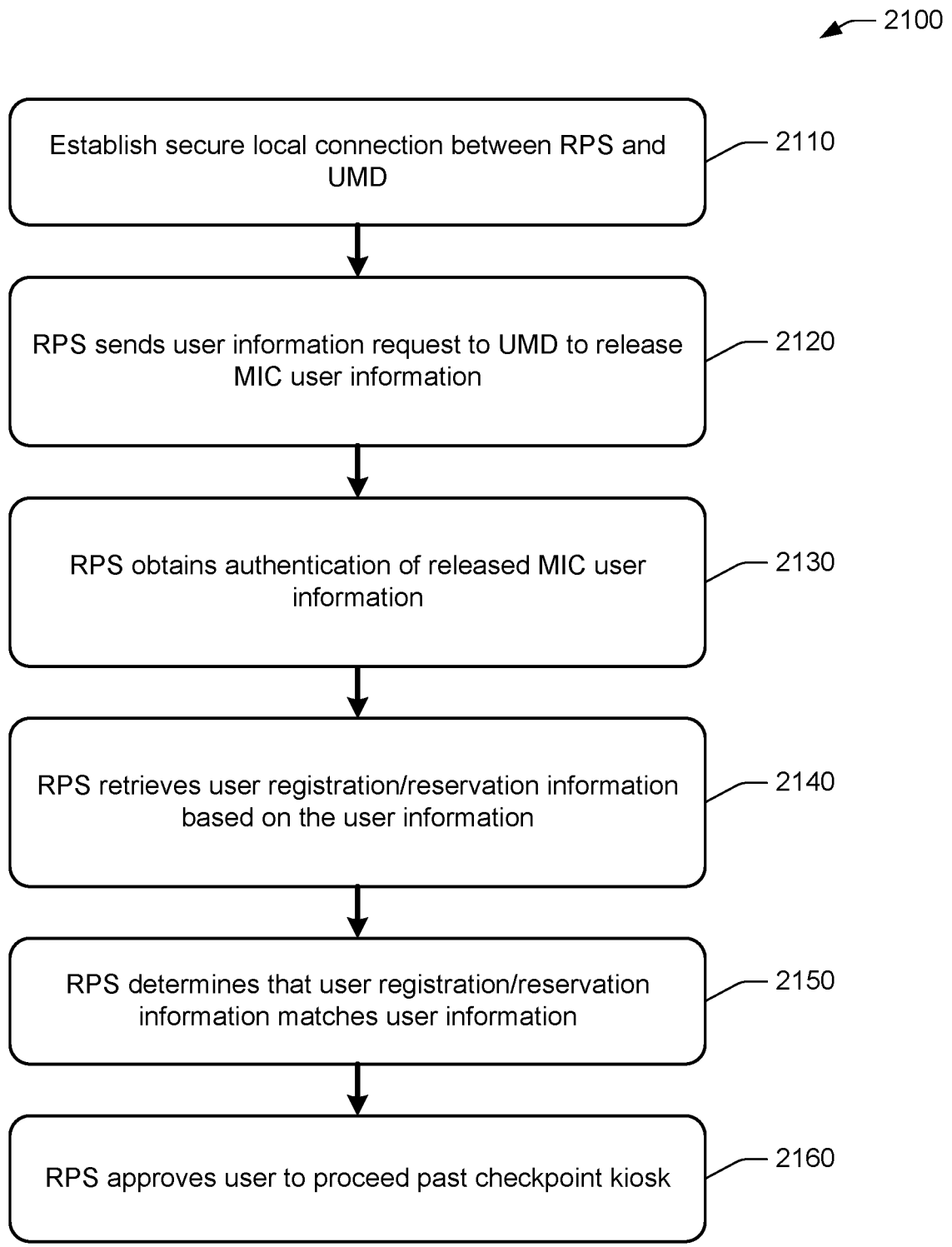
FIG. 21 is a flow diagram illustrating a process of vetting clients who are registered, have reservations, or are ticket holders to an event according to an embodiment.

FIG. 21 is a flow diagram 2100 illustrating a process of vetting clients who are registered, have reservations, or are ticket holders to an event according to an embodiment. In step 2110, the RPS (e.g., event venue system) and UMD (e.g., ticket holding client device) establish a secure local connection, as described above. In step 2120, the RPS sends a user information request to the UMD, requesting user consent to release user information corresponding to a MIC. For example, an event access touchpoint kiosk or a security checkpoint kiosk requests release of the user's name, date of birth, and photograph. In an embodiment, to obtain user consent, the UMD displays a prompt to the user including information identifying the RPS, along with the user information that the RPS is requesting. The user is prompted to approve, independently and discretely, types of information requests. The UMD uses the user consent to release the user information to the RPS, as explained above in the context of offline and online modes.

In step 2130, the RPS obtains verification of the MIC user information received in response to the user information request, as explained above. In step 2140, the RPS retrieves user reservation/registration information from a reservation/registration establishment, a ticket sales/issuing entity, or the like, based on the user information obtained through the MIC. Such user reservation/registration information can include an event manifest for event attendees for that event, event attendee profile information submitted by registered attendees, and the like. As described above, the MIC environment provides a mechanism to ensure that the user information, presented by the user at the security checkpoint kiosk interaction, perfectly matches the user information that was initially submitted to the ticket sales/issuing entity when the user registered for or purchased ticket for the event or otherwise booked the reservation. More specifically, the biographic user information, which would otherwise be entered by hand and therefore prone to error, is fully accurate and error free. Thus, the MIC environment prevents the possibility for mis-entered information, such as when a user registers for an event or books a reservation under a nickname or enters a typo in the name or other information as submitted to the ticket issuing or reservation entity when booking the reservation. Some or all of steps 2110 to 2140 may occur during the identity verification pre-staging 184 of FIG. 1C.

In step 2150, the RPS determines whether the user reservation/registration information matches the user information. Such positive matching is made more efficient by using the MIC environment, avoiding the potential for mismatches or other data entry issues. Furthermore, the transactions are made more efficient by virtue of verifying information electronically, without a need for an agent to visually verify physical tickets or documents or physical forms of ID.

In step 2160, the security checkpoint kiosk RPS approves the user to proceed past the security checkpoint kiosk or device. For example, upon successfully verifying the user's identity, the RPS provides helpful guidance to the user instructing the user to proceed past the kiosk, e.g., to a dedicated line for VIPs or attendees with certain membership privileges.

Accordingly, although the present disclosure has been described with reference to specific embodiments and examples, persons skilled in the art will recognize that changes may be made in form and detail without departing from the spirit and scope of the disclosure.

Certain attributes, functions, steps of methods, or sub-steps of methods described herein may be associated with physical structures or components, such as a module of a physical device that, in implementations in accordance with this disclosure, make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

The claims define the invention and form part of the specification. Limitations from the written description are not to be read into the claims.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation. The indication of any elements or steps as "optional" does not indicate that all other or any other elements or steps are mandatory.

What is claimed is:

1. A method for a client having a client device to request client access from a provider having a provider system, the method comprising:

establishing a secure connection between the client device and the provider system via a reader, before the client reaches an access touchpoint;

receiving, by the provider system from the client device, a request for client access before the client reaches the access touchpoint;

sending, by the provider system to the client device, a request for identification information of the client before the client reaches the access touchpoint;

receiving, by the provider system before the client reaches the access touchpoint, part or all of client information associated with a first mobile identification credential (MIC) which the client device received from a first authorizing party system (APS), the client having consented to release the part or all of client information to the provider system, and the part or all of client information having been verified by the first APS, the client information including biometric information of the client;

performing a liveness check of the client using live-captured biometric information of the client at the access touchpoint;

using, by the provider system, the verified part or all of client information associated with the first MIC to determine whether the liveness check is valid or invalid; and determining that the liveness check is valid, by the provider system, before granting the client the request for client access.

2. The method of claim 1, wherein receiving the verified part or all of client information comprises:

receiving, by the provider system from the client device before the client reaches the access touchpoint, a token specifying the part or all of client information which the client has consented to release to the provider system;

sending, by the provider system to the first APS, the received token, which is to be verified by the first APS with another token sent from the client device to the first APS;

when the tokens are received by the first APS within a preset timeframe and are verified by the first APS, receiving, by the provider system from the first APS, the verified part or all of client information; and when the tokens are not received by the first APS within the preset timeframe or are not verified by the first APS, receiving, by the provider system from the first APS, a notification to resubmit the request for identification information of the client.

3. The method of claim 1, wherein receiving the verified part or all of client information comprises:
receiving, by the provider system from the client device before the client reaches the access touchpoint, an electronic document specifying the part or all of client information which the client has consented to release to the provider system;
sending, by the provider system to the first APS, the received electronic document;
when the received electronic document is verified by the first APS, receiving, by the provider system from the first APS, the verified part or all of client information; and
when the received electronic document is not verified by the first APS, receiving, from the provider system from the first APS, a notification to resubmit the request for identification information of the client.

4. The method of claim 1, wherein receiving the verified part or all of client information comprises:
receiving, by the provider system from client device before the client reaches the access touchpoint, an electronic document and the part or all of client information which the client has consented to release to the provider system;
sending, by the provider system to the first APS, the received electronic document;
when the received electronic document is verified by the first APS, receiving, by the provider system from the first APS, an authentication key to verify the part or all of client information received from the client device; and
when the received electronic document is not verified by the first APS, receiving, by the provider system from the first APS, a notification to resubmit the request for identification information of the client.

5. The method of claim 1, wherein receiving the verified part or all of client information comprises:
receiving, by the provider system from the client device before the client reaches the access touchpoint, the part or all of client information which the client has consented to release to the provider system; and
receiving, by the provider system from the first APS, an authentication key to verify the part or all of client information received from the client device, based on a request sent from the client device to the first APS.

6. The method of claim 1, further comprising:
granting the request from the client, by the provider system, to provide the client access when the liveness check is valid; and
denying the request from the client, by the provider system, to provide the client access when the liveness check is invalid.

7. The method of claim 1, further comprising:
sending, by the provider system to the client device, a request for client eligibility information of the client;
receiving, by the provider system, part or all of client eligibility information associated with the first MIC which the client device received from the first APS or a second MIC which the client device received from a second APS, wherein the client has consented to release the part or all of client eligibility information to the provider system, and wherein the part or all of client eligibility information has been verified by the first APS or the second APS as verified part or all of client eligibility information;
using, by the provider system, the verified part or all of client eligibility information to verify or not verify client eligibility of the client;
granting the client the request for client access, by the provider system, when the identity and the client eligibility of the client are verified; and
denying the client the request for client access, by the provider system, when the identity or the client eligibility of the client is not verified.

8. The method of claim 1, further comprising:
sending, by the provider system to an escrow provider system, a request for information showing that the client has met escrow obligations to receive the client access;
receiving, by the provider system, part or all of client escrow fulfillment information associated with an escrow MIC which the client device received from an escrow APS, which is the first MIC issued by the first APS or another MIC issued by another APS, wherein the client has consented to release the part or all of client escrow fulfillment information to the provider system, and wherein the part or all of client escrow fulfillment information has been verified by the escrow APS;
using, by the provider system, the verified part or all of client escrow fulfillment information to verify or not verify escrow fulfillment of the client;
granting the request for client access, by the provider system to the escrow provider system, to provide to the client the client access when the liveness check is valid and the escrow fulfillment of the client is verified; and
denying the request for client access, by the provider system to the escrow provider system, to provide to the client the client access when at least one of the liveness check is invalid or the escrow fulfillment of the client is not verified.

9. The method of claim 1, wherein the client access is subject to a quantity limit, the method further comprising:
granting the client the request for client access, by the provider system, when the liveness check is valid and when an accumulated quantity of the client access received by the client does not exceed the quantity limit; and
denying the client the request for client access, by the provider system, when the liveness check is invalid or when the accumulated quantity of the client access received by the client exceeds the quantity limit.

10. The method of claim 1,
wherein the first APS is a separate system from the provider system; and
wherein the first APS verifies the part or all of client information before the provider system sends to the client device the request for identification information of the client.

11. A provider system for processing a request for client access at an access touchpoint from a client device of a client, the provider system comprising a computer having a memory and a processor programmed to:
establish a secure connection between the client device and the provider system via a reader, before the client reaches the access touchpoint;
receive, from the client device, a request for client access before the client reaches the access touchpoint;
send, to the client device, a request for identification information of the client before the client reaches the access touchpoint;

receive, before the client reaches the access touchpoint, part or all of client information associated with a first mobile identification credential (MIC) which the client device received from a first authorizing party system (APS), the client having consented to release the part or all of client information to the provider system, and the part or all of client information having been verified by the first APS, the client information including biometric information of the client;

perform a liveness check of the client using live-captured biometric information of the client at the access touchpoint;

use the verified part or all of client information associated with the first MIC to determine whether the liveness check is valid or invalid; and determine that the liveness check is valid before granting the client the request for the client access.

12. The provider system of claim 11, wherein receiving the verified part or all of client information comprises:

receiving, by the provider system from the client device before the client reaches the access touchpoint, a token specifying the part or all of client information which the client has consented to release to the provider system;

sending, by the provider system to the first APS, the received token, which is to be verified by the first APS with another token sent from the client device to the first APS;

when the tokens are received by the first APS within a preset timeframe and are verified by the first APS, receiving, by the provider system from the first APS, the verified part or all of client information; and when the tokens are not received by the first APS within the preset timeframe or are not verified by the first APS, receiving, by the provider system from the first APS, a notification to resubmit the request for identification information of the client.

13. The provider system of claim 11, wherein receiving the verified part or all of client information comprises:

receiving, by the provider system from the client device before the client reaches the access touchpoint, an electronic document specifying the part or all of client information which the client has consented to release to the provider system;

sending, by the provider system to the first APS, the received electronic document;

when the received electronic document is verified by the first APS, receiving, by the provider system from the first APS, the verified part or all of client information; and when the received electronic document is not verified by the first APS, receiving, from the provider system from the first APS, a notification to resubmit the request for identification information of the client.

14. The provider system of claim 11, wherein receiving the verified part or all of client information comprises:

receiving, by the provider system from client device before the client reaches the access touchpoint, an electronic document and the part or all of client information which the client has consented to release to the provider system;

sending, by the provider system to the first APS, the received electronic document;

when the received electronic document is verified by the first APS, receiving, by the provider system from the first APS, an authentication key to verify the part or all of client information received from the client device; and when the received electronic document is not verified by the first APS, receiving, by the provider system from the first APS, a notification to resubmit the request for identification information of the client.

15. The provider system of claim 11, wherein receiving the verified part or all of client information comprises:

receiving, by the provider system from the client device before the client reaches the access touchpoint, the part or all of client information which the client has consented to release to the provider system; and receiving, by the provider system from the first APS, an authentication key to verify the part or all of client information received from the client device, based on a request sent from the client device to the first APS.

16. The provider system of claim 11, wherein the computer is further programmed to:

grant the client the request for client access, by the provider system, when the liveness check is valid; and deny the client the request for client access, by the provider system, when the liveness check is invalid.

17. The provider system of claim 11, wherein the computer is further programmed to:

send, to the client device, a request for client eligibility information of the client;

receive part or all of client eligibility information associated with the first MIC which the client device received from the first APS or a second MIC which the client device received from a second APS, wherein the client has consented to release the part or all of client eligibility information to the provider system, and wherein the part or all of client eligibility information has been verified by the first APS or the second APS as verified part or all of client eligibility information;

use the verified part or all of client eligibility information to verify or not verify client eligibility of the client;

grant the client the request for client access when the liveness check is valid and the client eligibility of the client are verified; and deny the client the request for client access when the liveness check is invalid or the client eligibility of the client is not verified.

18. The provider system of claim 11, wherein the computer is further programmed to:

send, to an escrow provider system, a request for information showing that the client has met escrow obligations to receive the client access;

receive part or all of client escrow fulfillment information associated with an escrow MIC which the client device received from an escrow APS, which is the first MIC issued by the first APS or another MIC issued by another APS, wherein the client has consented to release the part or all of client escrow fulfillment information to the provider system, and wherein the part or all of client escrow fulfillment information has been verified by the escrow APS;

use the verified part or all of client escrow fulfillment information to verify or not verify escrow fulfillment of the client;

grant the request for client access to the escrow provider system, to provide to the client the client access, when the liveness check is valid and the escrow fulfillment of the client is verified; and deny the request for client access to the escrow provider system, to provide to the client the client access, when at least one of the liveness check is invalid or the escrow fulfillment of the client is not verified.

19. The provider system of claim 11, wherein the client access is subject to a quantity limit and the computer is further programmed to:
   grant the client the request for client access, when the liveness check is valid and when an accumulated quantity of the client access received by the client does not exceed the quantity limit; and
   deny the client the request for client access, when the liveness check is invalid or when the accumulated quantity of the client access received by the client exceeds the quantity limit.

20. The provider system of claim 11, wherein the first APS is a separate system from the provider system and the computer is further programmed to:
   send to the client device the request for identification information of the client after the first APS verifies the part or all of client information associated with the first MIC and sends the first MIC to the client device.

21. An access touchpoint operations method for a user having a user device to request user access at an access touchpoint, the method comprising:
   establishing, by the access touchpoint device serving as a Relying Party System (RPS), a secure connection between the RPS and a User Mobile-Identification-Credential Device (UMD) via a reader, before the user reaches the access touchpoint;
   sending, by the RPS, a user information request to the UMD, via the secure connection, seeking release of first Mobile Identification Credential (MIC) user information;
   obtaining, by the RPS before the user reaches the access touchpoint, authentication of the first MIC user information received in response to the user information request;
   performing a liveness check of the user using live-captured biometric information of the user at the access touchpoint;
   determining, by the RPS, whether the live-captured biometric information matches the first MIC user information or not; and
   when the live-captured biometric information matches the first MIC user information, providing, by the RPS, approval for the user to proceed past the access touchpoint.

22. The access touchpoint operations method of claim 21, further comprising:
   provisioning, by a first Authorizing Party System (APS), the first MIC onto the UMD before the RPS sends the user information request to the UMD.

23. The access touchpoint operations method of claim 22, wherein the provisioning comprises:
   verifying and authenticating a user identity of the user;
   collecting the first MIC information pertaining to the user;
   compiling the first MIC information into a first MIC stored in a memory of the first APS;
   authenticating the UMD; and
   copying the first MIC from the first APS to the UMD.

24. The access touchpoint operations method of claim 22, wherein obtaining authentication of the first MIC user information by the RPS comprises:
   receiving, by the RPS from the UMD before the user reaches the access touchpoint, a token specifying the first MIC user information;
   sending, by the RPS to the first APS, the received token, which is to be verified by the first APS with another token sent from the UMD to the first APS;
   when the tokens are received by the first APS within a preset timeframe and are verified by the first APS, receiving, by the RPS from the first APS, the first MIC user information; and
   when the tokens are not received by the first APS within the preset timeframe or are not verified by the first APS, receiving, by the RPS from the first APS, a notification to resubmit the user information request to the UMD seeking release of the first MIC user information.

25. The access touchpoint operations method of claim 22, wherein obtaining authentication of the first MIC user information by the RPS comprises:
   receiving, by the RPS from the UMD before the user reaches the access touchpoint, an electronic document specifying the user information which the user has consented to release to the RPS;
   sending, by the RPS to the first APS, the received electronic document;
   when the received electronic document is verified by the first APS, receiving, by the RPS from the first APS, the first MIC user information; and
   when the received electronic document is not verified by the first APS, receiving, from the RPS from the first APS, a notification to resubmit the user information request.

26. The access touchpoint operations method of claim 22, wherein obtaining authentication of the first MIC user information by the RPS comprises:
   receiving, by the RPS from UMD before the user reaches the access touchpoint, an electronic document and the user information which the user has consented to release to the RPS;
   sending, by the RPS to the first APS, the received electronic document;
   when the received electronic document is verified by the first APS, receiving, by the RPS from the first APS, an authentication key to verify the user information received from the UMD; and
   when the received electronic document is not verified by the first APS, receiving, by the RPS from the first APS, a notification to resubmit the user information request.

27. The access touchpoint operations method of claim 22, wherein obtaining authentication of the first MIC user information by the RPS comprises:
   receiving, by the RPS from the UMD before the user reaches the access touchpoint, the user information which the user has consented to release to the RPS; and
   receiving, by the RPS from the first APS, an authentication key to verify the user information received from the UMD, based on a request sent from the UMD to the first APS.

28. The access touchpoint operations method of claim 22, further comprising:
   sending, by the RPS to the UMD, a request for user eligibility information of the user;
   receiving, by the RPS, part or all of eligibility information associated with the first MIC which the UMD received from the first APS or a second MIC which the UMD received from a second APS, wherein the user has consented to release the part or all of user eligibility information to the RPS, and wherein the part or all of user eligibility information has been verified by the first APS or the second APS as verified part or all of user eligibility information;

using, by the RPS, the verified part or all of user eligibility information to verify or not verify user eligibility of the user;

granting approval for the user to proceed past the access touchpoint, by the RPS, when the live-captured biometric information matches the first MIC user information and when the user eligibility of the user is verified; and denying approval for the user to proceed past the access touchpoint, by the RPS, when the live-captured biometric information does not match the first MIC user information or when the user eligibility of the user is not verified.

29. The access touchpoint operations method of claim 22, further comprising:

sending, by the RPS to an escrow RPS, a request for information showing that the user has met escrow obligations to receive the user access;

receiving, by the RPS, part or all of user escrow fulfillment information associated with an escrow MIC which the UMD received from an escrow APS, which is the first MIC issued by the first APS or another MIC issued by another APS, wherein the user has consented to release the part or all of user escrow fulfillment information to the RPS, and wherein the part or all of user escrow fulfillment information has been verified by the escrow APS;

using, by the RPS, the verified part or all of user escrow fulfillment information to verify or not verify escrow fulfillment of the user;

granting the user access to proceed past the access touchpoint, by the RPS to the escrow RPS, to provide to the user the user access when the live-captured biometric information matches the first MIC user information and when the escrow fulfillment of the user is verified; and denying the user access to proceed past the access touchpoint, by the RPS to the escrow RPS, to provide to the user the user access when the live-captured biometric information does not match the first MIC user information or when the escrow fulfillment of the user is not verified.

* * * * *